(12) United States Patent
Sato et al.

(10) Patent No.: US 6,603,951 B2
(45) Date of Patent: Aug. 5, 2003

(54) IMAGE FORMATION APPARATUS AND IMAGE FORMATION SYSTEM

(75) Inventors: Chikara Sato, Hachioji (JP); Norifumi Miyake, Kashiwa (JP); Yasuo Fukazu, Abiko (JP); Mitsushige Murata, Abiko (JP); Masatoshi Yaginuma, Toride (JP); Kiyoshi Okamoto, Toride (JP); Manabu Yamauchi, Toride (JP); Tsuyoshi Moriyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,840

(22) Filed: Oct. 11, 2001

(65) Prior Publication Data

US 2002/0018677 A1 Feb. 14, 2002

Related U.S. Application Data

(62) Division of application No. 09/494,303, filed on Jan. 31, 2000, now Pat. No. 6,330,422.

(30) Foreign Application Priority Data

Feb. 2, 1999 (JP) .......................................... 11-024967

(51) Int. Cl.[7] .............................................. G03G 15/00
(52) U.S. Cl. ....................................................... 399/382
(58) Field of Search ................................ 399/382, 407, 399/408, 410

(56) References Cited

U.S. PATENT DOCUMENTS

| 5,272,511 A | 12/1993 | Conrad et al. | |
| 5,299,795 A | 4/1994 | Miyake | 271/9 |
| 5,390,016 A | 2/1995 | Hoshi et al. | |
| 5,452,062 A | 9/1995 | Baldwin et al. | |
| 5,455,667 A | 10/1995 | Hiroi et al. | |
| 5,839,045 A | 11/1998 | Wierszewski | 399/382 |
| 5,881,352 A | 3/1999 | Kobayashi et al. | 399/408 |
| 5,913,099 A | 6/1999 | Kamei et al. | 399/296 |
| 6,330,422 B1 * | 12/2001 | Sato et al. | 399/382 |
| 6,351,625 B1 * | 2/2002 | Sato et al. | 399/382 |

FOREIGN PATENT DOCUMENTS

| JP | 60-180894 | 9/1985 |
| JP | 60-191932 | 9/1985 |
| JP | 60-204564 | 10/1985 |

* cited by examiner

*Primary Examiner*—Robert Beatty
(74) *Attorney, Agent, or Firm*—Fitzpatrick, Cella, Harper & Scinto

(57) ABSTRACT

In an image formation system which includes a finisher with an inserter having a tray for stacking the specific sheet on which an image such as a cover image was formed, and an image formation apparatus, a series of originals composed of plural pages is read from its head page in due order, the image based on the read original is formed on the sheet, the sheet stacked on the inserter is fed, the sheet from the inserter is reversed to set its image-formed face facedown, the sheet from a printer unit is reversed to set its image-formed face facedown. The sheet, the image-formed face of which was reversed facedown, is discharged from the printer unit to the finisher and, on the finisher, the sheet from the inserter is stacked as keeping its image-formed face facedown and the sheet from the printer unit is stacked as keeping its image-formed face facedown. The top and bottom of the image formed by the image forming apparatus corresponds to the top and bottom of the insert sheet.

12 Claims, 31 Drawing Sheets

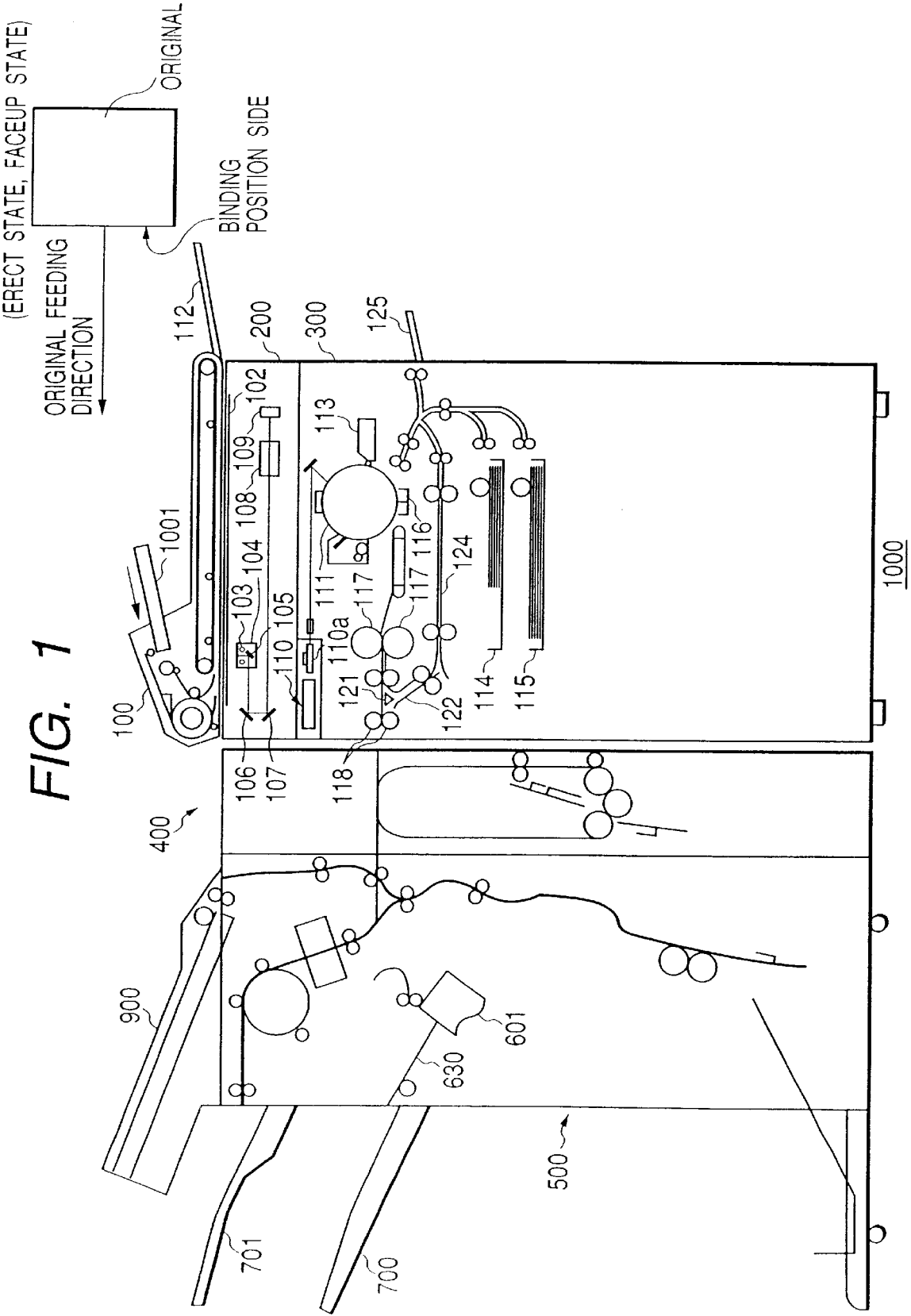

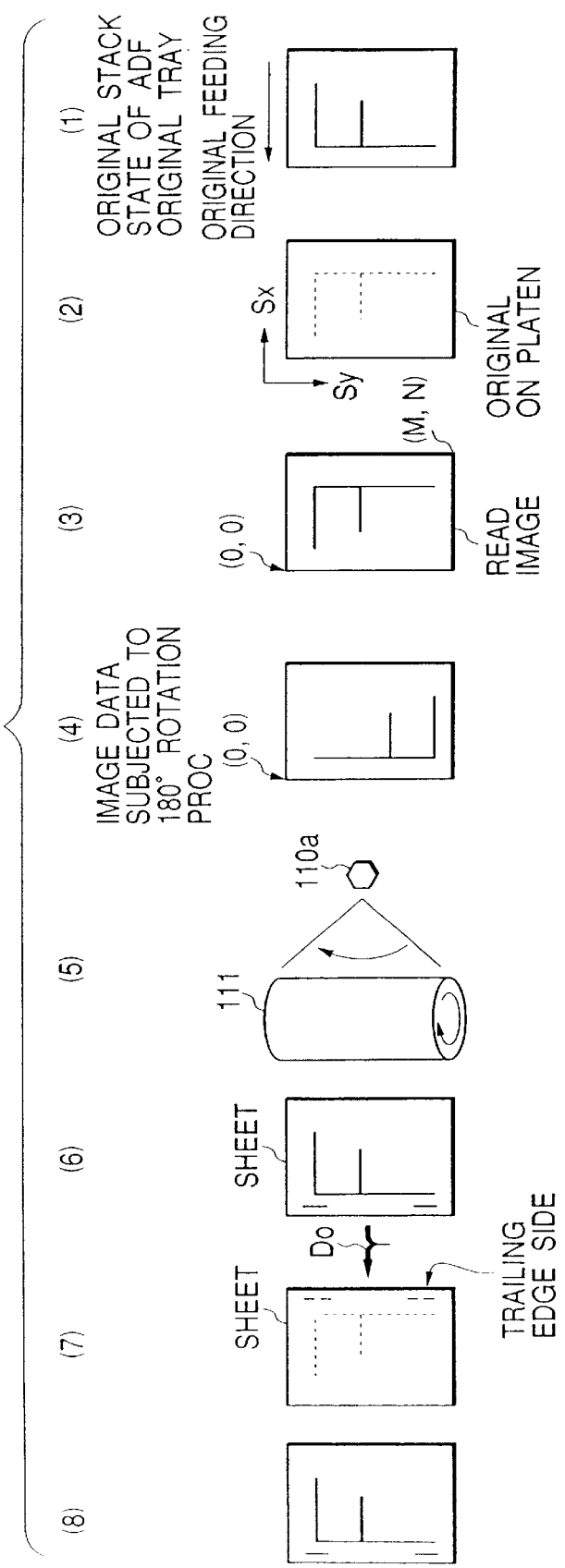

FIG. 8A (ERECT STATE, FACEUP STATE)
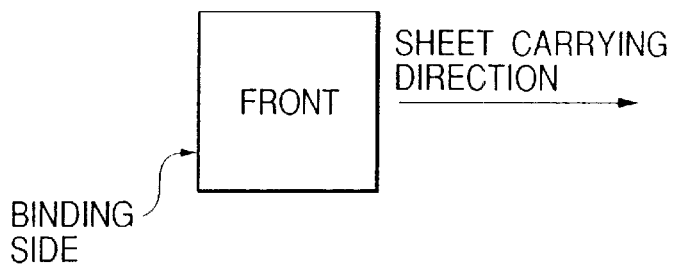
FIG. 8B
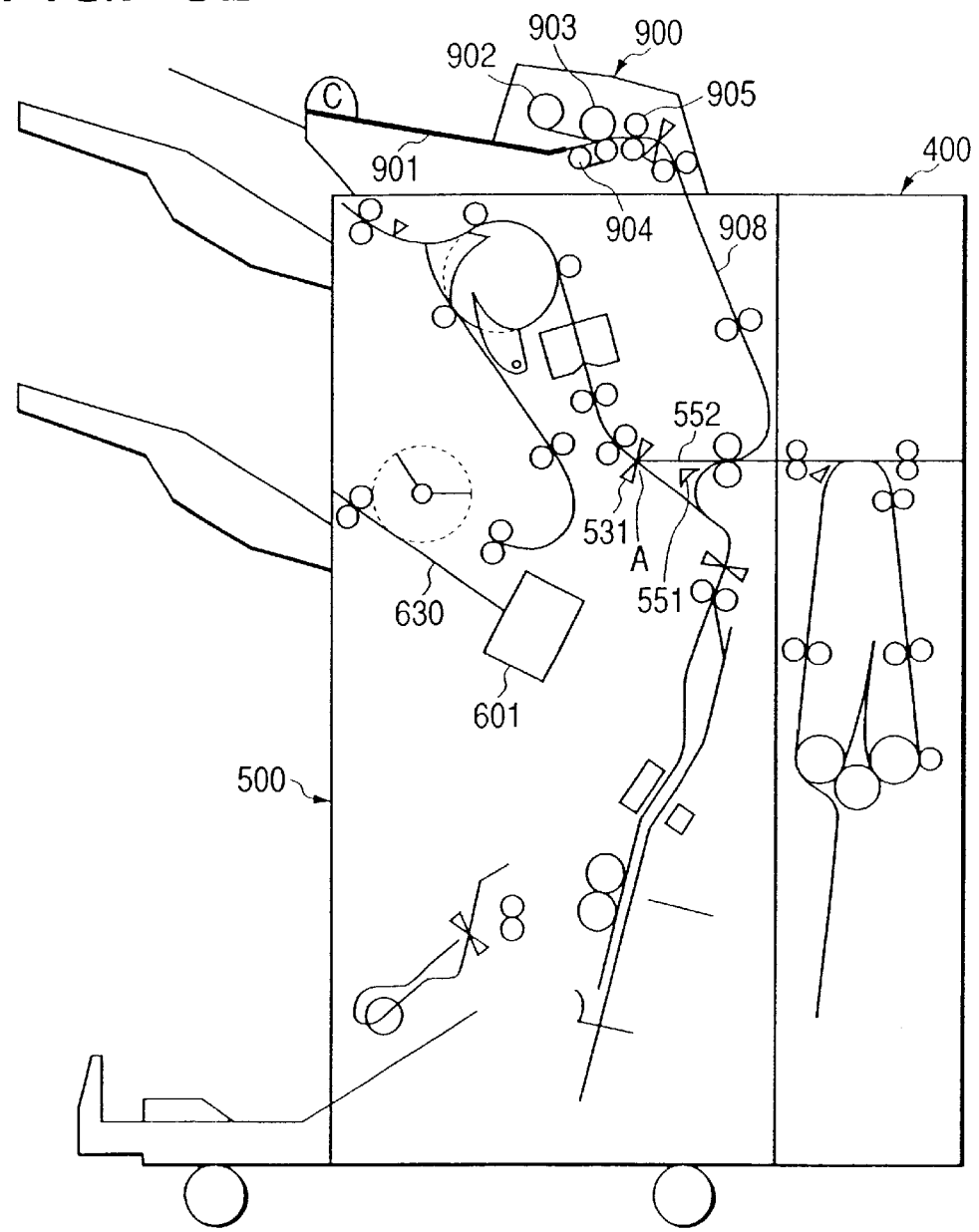

BINDING POSITION SIDE

IMAGE FORMATION APPARATUS AND IMAGE FORMATION SYSTEM

This is a divisional application of application Ser. No. 09/494,303, filed on Jan. 31, 2000, now U.S. Pat. No. 6,330,422, and allowed on Jul. 13, 2001.

BACKGROUND OF THE INVENTION

1. Field of the Invention

The present invention relates to an image formation apparatus and an image formation system which can output a sheaf of sheets composed of a specific sheet such as a cover or the like and sheets on which images were respectively formed.

2. Related Background Art

Conventionally, there has been provided an image formation apparatus such as a copying machine or the like which has a mode such as a cover mode, a slipsheet mode or the like in which a sheet (referred as a specific sheet hereinafter) different from an ordinary recording sheet is inserted in a head page, a final page or an intermediate page of the recording sheets. If such the mode is set, for example, a sheet having different color or a color copy sheet can be inserted as a cover, or a divider for dividing or partitioning an arbitrary number of sheets. Further, in a copying machine connected with a sheet processing apparatus such as a finisher or the like, a sheaf of sheets in which the specific sheets and the recording sheets mixedly exist can be subjected to stapling processing or the like for book binding.

As a specific sheet feeding method, it has been known a method which feeds the specific sheet from a special cassette provided on the side of the body of the copying apparatus. In such the method, the specific sheet is fed from the special cassette at the timing when the specific sheet is to be inserted, and the fed specific sheet is discharged outside the copying machine through the carrying path identical with the carrying path used for the sheet on which an image was formed. Namely, the specific sheet is discharged outside the machine through an image formation unit in which a fixing unit and the like are disposed.

However, when the specific sheet is fed from the cassette disposed on the side of the body of the copying machine, if a sheet such as a color-printed original or the like is used as the specific sheet, the sheet passes the fixing unit. Thus, since the sheet is effected by thermal pressure at this time, there is some fear that image quality of the sheet deteriorates. Further, in recent years, the color copy sheet has been often used as the specific sheet. Thus, if the color copy sheet is fed from the cassette provided on the side of the body of the copying machine, there is some fear that oil or the like on the face of the color copy sheet deteriorates carrying capability of a sheet feeding mechanism and thus influences sheet carrying.

On the other hand, it has been proposed a method in which a sheet feeding unit for feeding the specific sheet such as the cover or the like is disposed on the side of the sheet processing apparatus such as the finisher or the like so, and thus the specific sheet is directly fed from this sheet feeding unit. Such the method is disclosed in Japanese Patent Application (Laid-Open) Nos. 60-180894, 60-191932, 60-204564, and the like.

Thus, it has been proposed that a stacking unit for the specific sheets is provided on the image formation apparatus or on the sheet processing apparatus such as the finisher or the like, and the specific sheet fed from the stacking unit and the sheets on which the images were respectively formed by the image formation unit are sheaved as one sheaf of sheets according as the specific sheets are set to the stacking unit by a user.

However, the user himself must set the specific sheet such as the cover or the like to the stacking unit. Therefore, if the user wishes to output the sheaf of the sheets which is composed of the specific sheet and the sheets on which the images were respectively formed by the image formation unit, he must set the specific sheet to the stacking unit after he sufficiently understands the internal structure of the apparatus. In other words, if the user does not understand how the image is formed on the sheet by the image formation unit, by-what discharge method the sheet on which the image was formed is discharged from the image formation unit, how the sheet on the stacking unit is fed and discharged, and the like, there is some fear that inconvenience is caused in the output result which consists of the specific sheet and the sheets on which the images were respectively formed by the image formation unit. Concretely, there is some fear that page order becomes unconformable, or the directions of the images of the continuous pages become unconformable. In such a case, every time the inconvenience is caused, the user himself must confirm and correct such the inconvenience for each page. Further, in such a case, if the sheaf of the sheets was subjected to binding processing such as the stapling processing or the like, this sheaf of sheet is bound in the state that binding positions of the sheets are uneven, whereby the output result of this case is valueless. Thus, the user must again generates the identical data corresponding to the specific sheet used in such the output result and performs the above-described processing. Further, in the conventional proposal of the apparatus which can output the sheaf of the sheets composed of the specific sheet such as the cover or the like and the sheets on which the images were respectively formed by the image formation unit, it was not considered that the structure of the entire apparatus is prevented from enlarging, that the structure of the entire apparatus is prevented being complicated, and that productivity is improved.

SUMMARY OF THE INVENTION

An object of the present invention is to provide an image formation apparatus and an image formation system by which the above-mentioned conventional problems can be solved.

Another object of the present invention is to provide, in case of enabling to output a sheaf of sheets which is composed of a specific sheet such as a cover or the like and sheets on which images were respectively formed, an image formation apparatus and an image formation system by which an erroneous operation of a user can be prevented, operability or maneuverability for the user can be improved, productivity is improved, and a satisfactory output result can be obtained without enlarging and complicating the entire apparatus and system. In such the satisfactory output result, the page order and the image direction of the plural sheets are conformed to others, and a binding position is provided at the left of the sheets from the viewpoint of an image-formed face.

Other objects and features of the present invention will become apparent from the following detailed description and the attached drawings.

BRIEF DESCRIPTION OF THE DRAWINGS

FIG. 1 is a sectional view showing an example of a copying machine;

FIGS. 2A, 2B and 2C are views for explaining image formation processing which is performed in each of original standing reading and original running reading;

FIGS. 8A and 8B are views for explaining a flow of sheets in a case where the sheet from an inserter and the sheet from a printer unit are laid on a processing tray;

DETAILED DESCRIPTION OF THE PREFERRED EMBODIMENTS

Figure 2A:
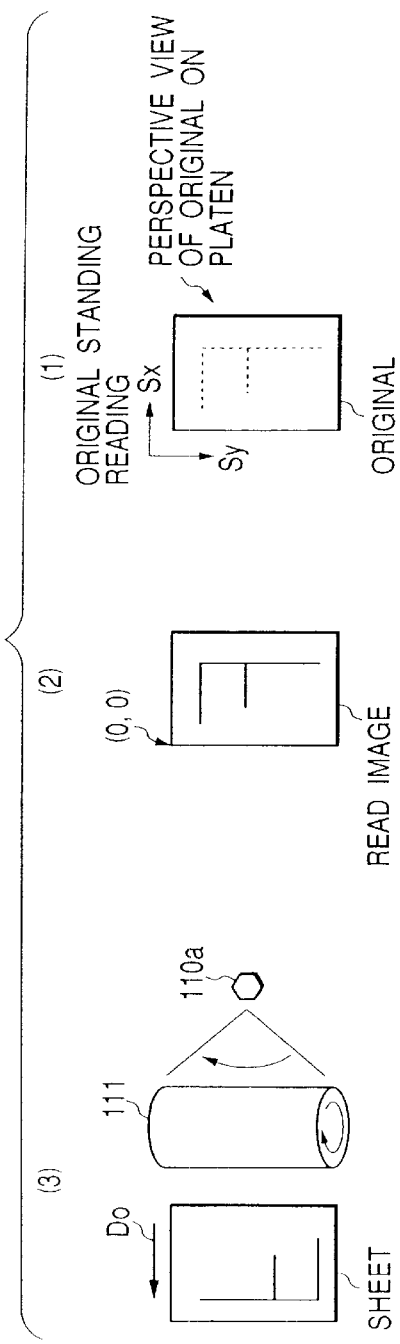

FIG. 1 is a sectional view showing the internal structure of a copying machine 1000 according to the embodiment of the present invention. The copying machine 1000 includes an original feeding unit 100, an image reader unit 200, a printer unit 300, a folding processing unit 400, a finisher 500 and an inserter 900.

In FIG. 1, it is assumed that an original is set on an original tray 1001 of the original feeding unit 100 such that the original is in an erect state and in a faceup state (i.e., the face on which an image has been formed is set faceup) from the viewpoint of a user and the head page of the original is set uppermost. Further, it is assumed that an original binding position is located at the left of the original from the viewpoint of the face on which the image has been formed. The original set on the tray 1001 is carried left (i.e., in the direction indicated by the arrow) one by one from its head page. Namely, the original is carried such that its binding position becomes the leading edge. Then, the original is reversed through a curved path, carried from the left to the right on a platen glass 102, and then discharged onto a sheet discharge tray 112. In this case, a scanner unit 104 is held at a predetermined position, and original reading processing is performed when the original is carried on the scanner unit 104 from the left to the right. The mode to perform such the original reading processing is called an original running reading mode. When the original is carried on the platen glass 102, the original is illuminated by a lamp 103 of the scanner unit 104. Then reflection light from the original is guided to an image sensor 109 through mirrors 105, 106 and 107 and a lens 108.

Thus, by carrying the original from the left to the right at the original running reading position, an original reading scan is performed in the direction (as a main scan direction) perpendicular to the original carrying direction and in the original carrying direction (as a sub scan direction). Namely, when the original passes the original running reading position, as the original image is read for each line in the main scan direction by the image sensor 109, the original is carried in the sub scan direction, whereby the image reading is performed for the entire original image. The optically read image is converted into image data and output by the image sensor 109. The image data output from the image sensor 109 is subjected to predetermined processing, and then input as a video signal to an exposure control unit 110.

Also, it is possible to perform the original reading processing by once stopping the original carried by the original feeding unit 100 on the platen glass 102 and then moving the scanner unit 104 from the left to the right in this state. The mode to perform such the original reading processing is called an original standing reading mode. If the original is read without using the original feeding unit 100, the user lifts the original feeding unit 100 and directly sets the original onto the platen glass 102. Also, in this case, the original standing reading is performed.

In a case where image formation processing is performed in the original running reading mode, it is possible to further improve productivity as compared with a case where the image formation processing is performed in the original standing reading mode. On the other hand, in the case where image formation processing is performed in the original standing reading mode, it is possible to further improve image quality as compared with the case where the image formation processing is performed in the original running reading mode. Thus, in the present embodiment, the user can select desired one of these two modes such that the user's will can be reflected and he can perform the processing in either mode.

The image data of the original read by the image sensor 109 is subjected to the predetermined image processing, and the processed data is transferred to the exposure control unit 110. The exposure control unit 110 outputs a laser beam in response to the transferred image data. The output laser beam is irradiated onto a photosensitive drum 111 through a polygonal mirror 110a to scan the drum 111, whereby an electrostatic latent image according to the scanning laser beam is formed on the drum 111.

The electrostatic latent image formed on the photosensitive drum 111 is developed by a development unit 113 and thus visualized as a toner image. On the other hand, a recording sheet is carried to a transfer unit 116 from either a cassette 114, a cassette 115, a manual sheet feeding unit 125 or a double-faced sheet carrying path 124. The visualized toner image is transferred to the recording sheet by the transfer unit 116, and then the recording sheet is subjected to fixing processing by a pair of fixing units (simply referred as a fixing unit) 117.

The recording sheet passed the fixing unit 117 is once guided to a path 122 by a flapper 121. After the trailing edge of the recording sheet passed the flapper 121, the sheet is returned and carried to a pair of sheet discharge rollers (simply referred as a sheet discharge roller) 118 by the flapper 121. Thus, the recording sheet is discharged from the printer unit 300 by the sheet discharge roller 118, whereby it is possible to discharge the sheet from the printer unit 300 in the state that its face on which the toner image was formed is facedown. This is called reverse sheet discharge.

As described above, the recording sheet is discharged facedown outside the apparatus. Therefore, if the image formation processing is performed from the head page or the original in due order, it is possible to set the page order, e.g., when the image formation processing is performed by using the original feeding unit 100, or the image formation processing is performed to image data from a computer. Thus, if a multifunctional image formation apparatus which includes a copying function, a printing function, a facsimile function and the like is provided, it is possible to perform the image formation processing from the head page in any function.

If the image formation processing is performed to a hard sheet such as an OHP (overhead projector) sheet carried from the manual sheet feeding unit 125, the sheet is not guided to the path 122 but is discharged from the printer unit 300 by the sheet discharge roller 118 such that the face on which the toner image was formed is set faceup.

Moreover, if the image formation processing is performed to both the faces of the sheet, the sheet is directly guided from the fixing unit 117 to the sheet discharge roller 118. Immediately after the trailing edge of the sheet passed the flapper 121, the sheet is returned and guided to the double-faced sheet carrying path 124 by the flapper 121.

Figure 7A:
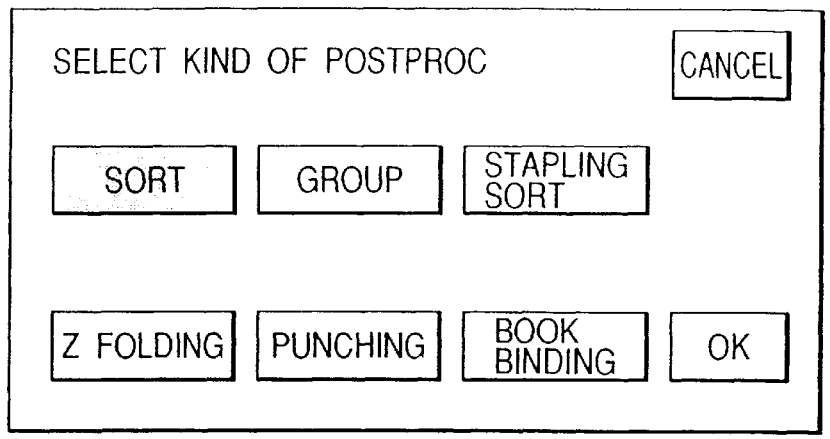
FIGS. 7A, 7B and 7C are views showing contents of an display panel of an operation unit.
Figure 7B:
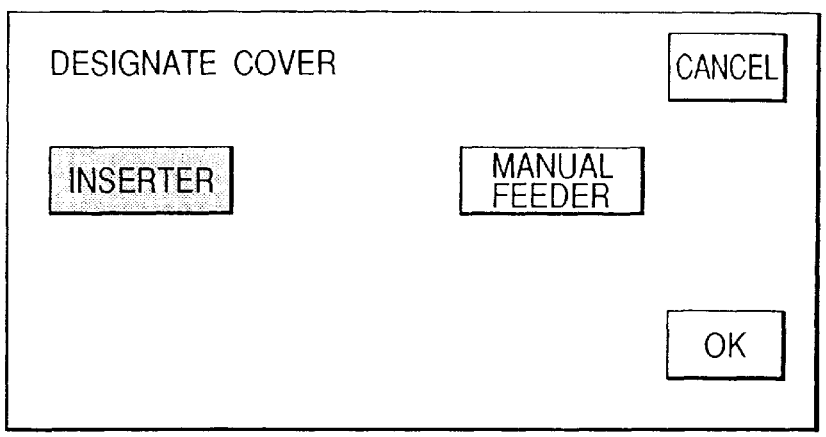
Figure 7C:
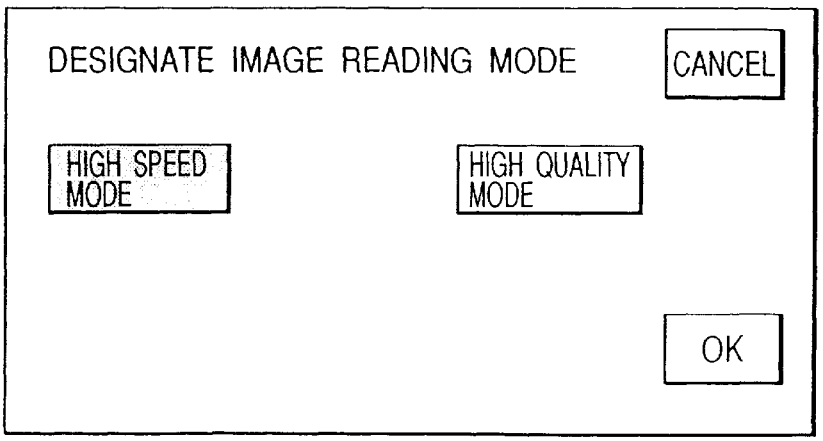

Next, the image formation processing which is performed in each of the original standing reading and the original running reading will be explained with reference to FIGS. 2A, 2B and 2C. The user can select desired one of the original fixing reading mode and the original running reading mode through a display panel of an operation unit 1 (FIG. 3). FIG. 7C shows a reading mode designation menu screen which is displayed on the display panel of the operation unit 1. The image formation apparatus performs the processing in the original running reading mode according as the "high speed mode" key is selected on this screen by the user. On the other hand, the image formation apparatus performs the processing in the original standing reading mode according as the "high quality mode" key is selected. It should be noted that the original set on the original tray 1001 of the original feeding unit 100 is ordinarily processed in the original running reading mode if there is no instruction from the user.

The processing in the original standing reading will be explained with reference to FIG. 2A. First, in states (1) and (2) of FIG. 2A, the original image is scanned by carrying the scanner unit 104 from the left to the right. Namely, the reading scan is performed to the original image in a main scan direction Sy and a sub scan direction Sx, and the original image is read by the image sensor 109. In a state (3) of FIG. 2A, as to the image which is read by the image sensor 109, the image read in the main scan direction Sy is sequentially converted into the laser beam by the exposure control unit 110, and the laser beam is scanned in the direction indicated by the arrow by the polygonal mirror 110a, whereby the electrostatic latent image is formed on the photosensitive drum 111. The electrostatic latent image thus formed is visualized as the toner image, and the toner image is formed on the sheet. Thus, a right image (i.e., a non-mirror image) which is not a mirror image is formed on the sheet. It should be noted that, in the original standing reading, the image of which direction is different from that of the original by 180° is formed on the sheet. Symbol Do denotes a carrying direction of the sheet on which the image was formed.

Next, the processing in the original running reading will be explained with reference to FIG. 2B. A state (1) of FIG. 2B is the original setting state for the original tray 1001. The user sets a sheaf of originals to the original tray 1001 of the original feeding unit 100 such that the face (i.e., the reading face) of the original to be read is set faceup and the head page of the original is set uppermost. Symbol Df denotes an original feeding direction. The original set on the original tray 1001 is carried left one by one from its head page by the original feeding unit 100, the fed original is reversed through the curved path, and the reversed original is carried from the left to the right on the platen glass 102.

Figure 2B:
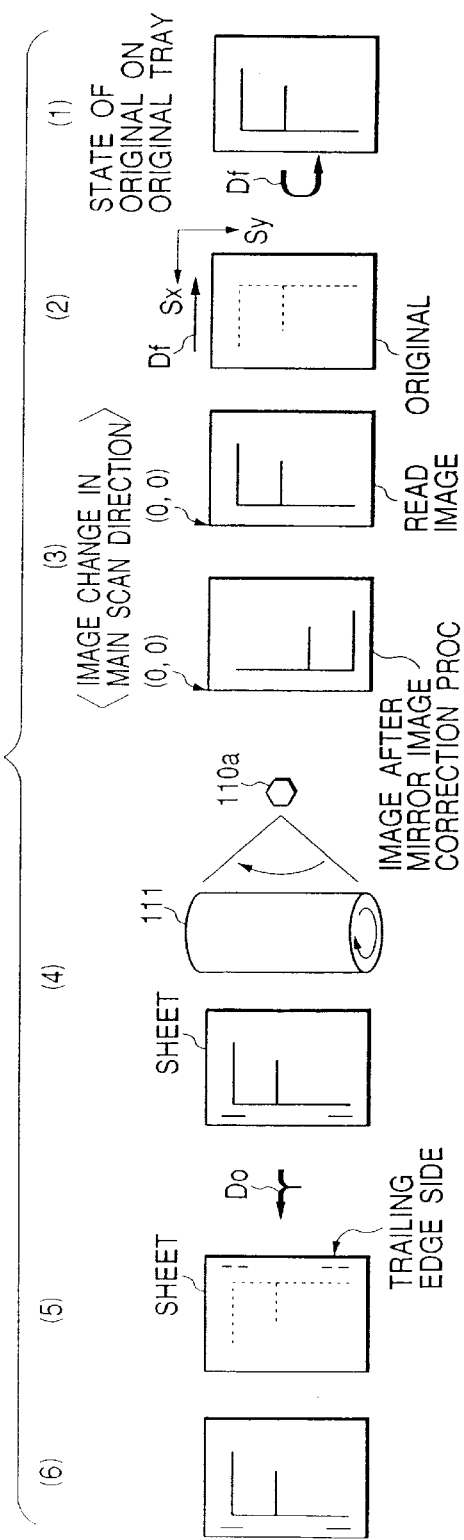
Figure 3:
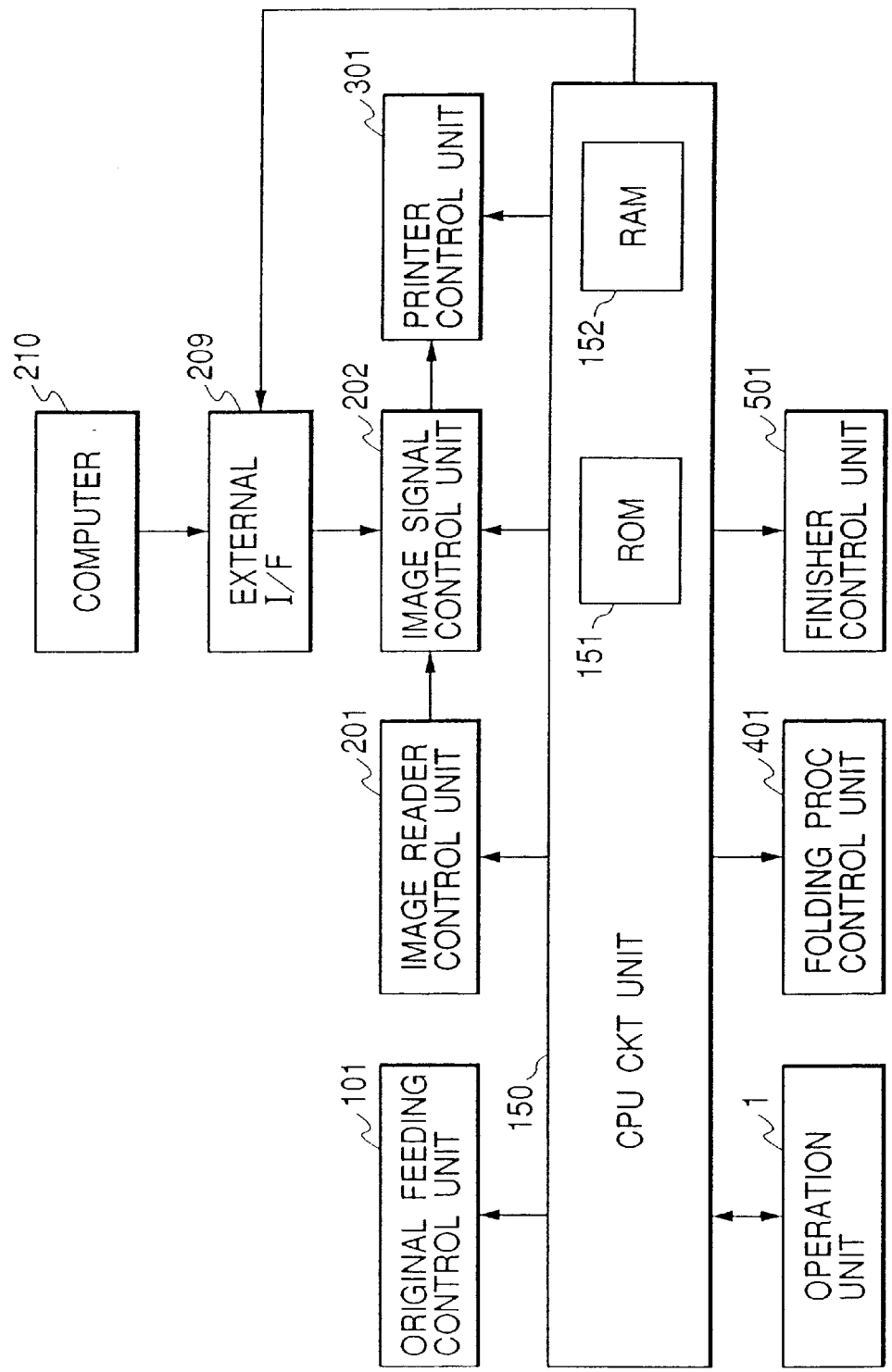
FIG. 3 is a block diagram showing the copying machine.

In a state (2) of FIG. 2B, the reading face of the original faces the upper face of the platen glass 102, and the original is carried in the original feeding direction Df. When the original passes the running reading position, the image on the reading face of the original is read in the main scan direction Sy by the scanner unit (i.e., the image sensor 109) disposed at the running reading position. Then, as the image on the reading face of the original is read in the main scan direction Sy, the original is carried in the original feeding direction Df, whereby the original reading in the sub scan direction Sx is performed. Thus, the reading scan is performed to the original image in the main scan direction Sy and the sub scan direction Sx, and the original image is read by the image sensor 109. In the original running reading, since the original is carried from the left to the right, the sub scan direction is opposite to that in the original standing reading. Therefore, since the image read by the image sensor 109 is a mirror image to the original image, it is necessary to correct such the mirror image to the right image (i.e., the non-mirror image). Thus, in the original running reading, mirror image correction processing which is to correct the image read by the image sensor 109 to the right image is performed. In the mirror image correction processing, the image which is read in one direction along the main scan direction is reversed toward the direction opposite to such the one direction along the main scan direction, thereby reversing the main scan direction (a state (3) of FIG. 2B).

As shown in FIG. 2B, the mirror image correction processing in the present embodiment is to change the image data in the main scan direction which was read in the original running reading mode, for the image data in the opposite direction. In other words, the mirror image correction processing is to output the image which can be obtained by rotating the print output image in the original standing reading mode by 180°.

In the processing which is to change the read image data in the main scan direction, the image data which was stored in a memory is read in the order opposite to the data-stored order as to the main scan direction and read in the order identical with the data-stored order as to the sub scan direction. Further, the direction of the image which is formed on the sheet in the original standing reading mode is different by 180° from the direction of the image which is formed on the sheet in the original running direction (the state (3) of FIG. 2A and a state (4) of FIG. 2B). In the original running reading mode, the image the direction of which is identical with the image on the original set on the original tray 1001 is formed on the sheet (the states (1) and (4) of FIG. 2B).

The image read by the image sensor 109 is converted into the right image in the above mirror image correction processing, and the electrostatic latent image subjected to the mirror image correction processing is formed on the photosensitive drum 111. The electrostatic latent image thus formed is visualized as the toner image, and the toner image is formed on the sheet. Thus, the right image which is not the mirror image is formed on the sheet (the state (4) of FIG. 2B). Further, by reversing and discharging the sheet on which the image was formed (i.e., the reverse sheet discharge processing), it is possible to discharge the sheet outside the apparatus (i.e., the printer unit 300) in the state that its face on which the toner image was formed is facedown. Then, if the trailing edge side of the sheets discharged in the above reverse sheet discharge is bound by a stapler 601 of the later-described finisher 500 (a state (5) of FIG. 2B), it is possible to locate the binding position at the left of the sheets from the viewpoint of the image-formed face (a state (6) of FIG. 2B).

Also, it is possible to perform the mirror image correction processing by changing the sub scan direction for the opposite direction. However, in this case, the mirror image correction processing can not be performed if the image reading processing for one page of the original does not end. Further, if it is considered to bind the left end side of the sheet to the image when the trailing edge is bound after the reverse sheet discharge (i.e., if the productivity and alignment of the sheets are considered), it is preferable to perform the mirror image correction processing by changing the main scan direction instead of the sub scan direction.

In FIG. 1, in the printer unit 300, the image is formed to the sheet which is fed from the right, i.e., the sheet feeding unit (the cassette 114, the cassette 115, the manual sheet feeding unit 125 or the like). Then the sheet on which the image was formed is carried to the left, and the front and rear faces of the sheet are reversed in the path 122 to set the image-formed face facedown, and the sheet is discharged from the body of the printer unit 300 by the sheet discharge roller 118 in the state that the image-formed face is set facedown.

The sheet which was discharged from the printer unit 300 by the sheet discharge roller 118 is then carried to the folding processing unit 400. The folding processing unit 400 performs folding processing to fold the sheet into a Z shape. For example, if the sheet the size of which is A3 or B4 and the folding processing is instructed by the operation unit, the sheet discharged from the printer unit 300 is subjected to the folding processing. In other cases, the sheet discharged from the printer unit 300 is not subjected to the folding processing but is carried to the finisher 500 as it is.

The inserter 900 is disposed on the finisher 500. The inserter 900 is to insert the sheet different from the ordinary recording sheet in the head page, the final page or the intermediate page of the recording sheets. Concretely, the inserter 900 is to insert a slipsheet or the sheet for a cover between the adjacent sheets on which the images were respectively formed by the printer unit 300. The body of the finisher 500 performs bookbinding processing, binding processing, punching processing and the like to a sheaf of sheets composed of the sheets carried from the printer unit 300 and the sheet from the inserter 900.

FIG. 3 is a block diagram showing the copying machine 1000. In FIG. 3, a CPU circuit unit 150 which includes a CPU (not shown) controls an original feeding control unit 101, an image reader control unit 201, an image signal control unit 202, a printer control unit 301, a folding processing control unit 401, a finisher control unit 501 and an external interface (I/F) 209, in accordance with a control program stored in a ROM 151 and the setting by the operation unit 1. The original feeding control unit 101 controls the original feeding unit 100, the image reader control unit 201 controls the image reader unit 200, the printer control unit 301 controls the printer unit 300, the folding processing control unit 401 controls the folding processing unit 400, and the finisher control unit 501 controls the finisher 500. The operation unit 1 includes plural keys for setting various functions as to the image formation, a display unit for displaying setting states, and the like. The operation unit 1 outputs a key signal corresponding to a key operation by the user to the CPU circuit unit 150, and also displays the corresponding information on the basis of a signal from the CPU circuit unit 150.

A RAM 152 is used as an area for temporarily holding the control data and a working area for calculation in the control. The external I/F 209 is the interface between the copying machine 1000 and an external computer 210. Concretely, the external I/F 209 expands print data from the computer 210 to a bit map image, and then outputs the bit map image as image data to the image signal control unit 202. Also, the original image read by the image sensor 109 is output as image data from the image reader control unit 201 to the image signal control unit 202. The image data from the image signal control unit 202 is output to the exposure control unit 110 by the printer control unit 301.

Figure 4:
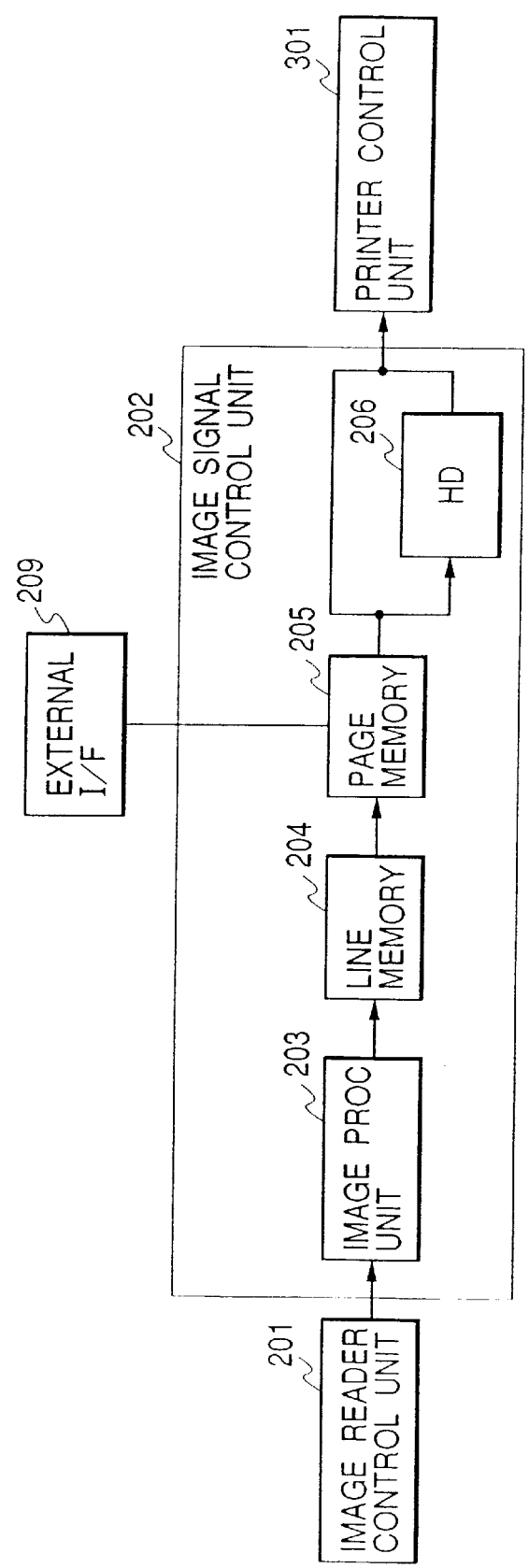
FIG. 4 is a block diagram for explaining an image signal control unit in detail.

FIG. 4 is a block diagram for explaining the image signal control unit 202 in detail. The image signal control unit 202 includes an image processing unit 203 for converting an analog image signal from the image reader control unit 201 into a digital signal and performing various processing to the converted digital signal. Namely, the image processing unit 203 performs the various processing such as a shading correction, a density correction, editing processing (i.e., magnification changing processing to enlarge or reduce an image size, etc.) based on the setting by the operation unit 1. The signal subjected to the various processing is stored as video data in a line memory 204. If a bookbinding mode is selected, image allocation processing is performed to the sheet on which the image is to be formed, on the basis of the number of read originals and the number of image data input through the external I/F 209.

The line memory 204 is used to perform the above mirror image correction processing (i.e., the processing to change the data in the main scan direction). In the original running reading mode, the video data of one line which is read in one direction along the main scan direction is reversed toward the direction opposite to such the one direction of the main scan direction. Then the video data output from the line memory 204 is stored in a page memory 205.

The page memory 205 has a storage capacity corresponding to one page of a predetermined-sized original. The video data is stored in the page memory 205 in the order output from the line memory 204. In the original standing reading mode, the stored video data is read in the data-stored order. Also, the data input from the computer 210 through the external I/F 209 is stored in the page memory 205.

The video data read from the page memory 205 is directly transferred to the printer control unit 301. If necessary, the read video data is once stored in a hard disk (HD) 206 and then transferred to the printer control unit 301. The HD 206 is used in page order changing processing such as electronic sort or the like. The printer unit 300 forms, on the sheet, the image based on the image data input to the printer control unit 301.

In the present embodiment, in the original running reading mode, the image data which represents the image read in the main scan direction is stored in the memory in due order, and the image data is then read as to the main scan direction in the order opposite to the data-stored order, thereby performing the mirror image correction processing. Namely, the image which is read in one direction along the main scan direction is reversed toward the direction opposite to such the one direction along the main scan direction, thereby performing the mirror image correction processing.

Hereinafter, it will be explained the case where the mirror image correction processing is performed on the page memory 205. The image data is stored in the page memory 205 in the order that the data is read in the original image reading scan. In the original standing reading mode, the image data stored in the page memory 205 is read therefrom in the data-stored order. Conversely, in the original running reading mode, the image data stored in the page memory 205 is read in the main scan direction in the order opposite to the data-stored order and in the sub scan direction in the data-stored order.

It is needless to say that the mirror image correction processing can be realized by previously reversing the main scan direction at the data storing time, and then reading the stored data always in the predetermined direction at the data reading time.

Figure 5:
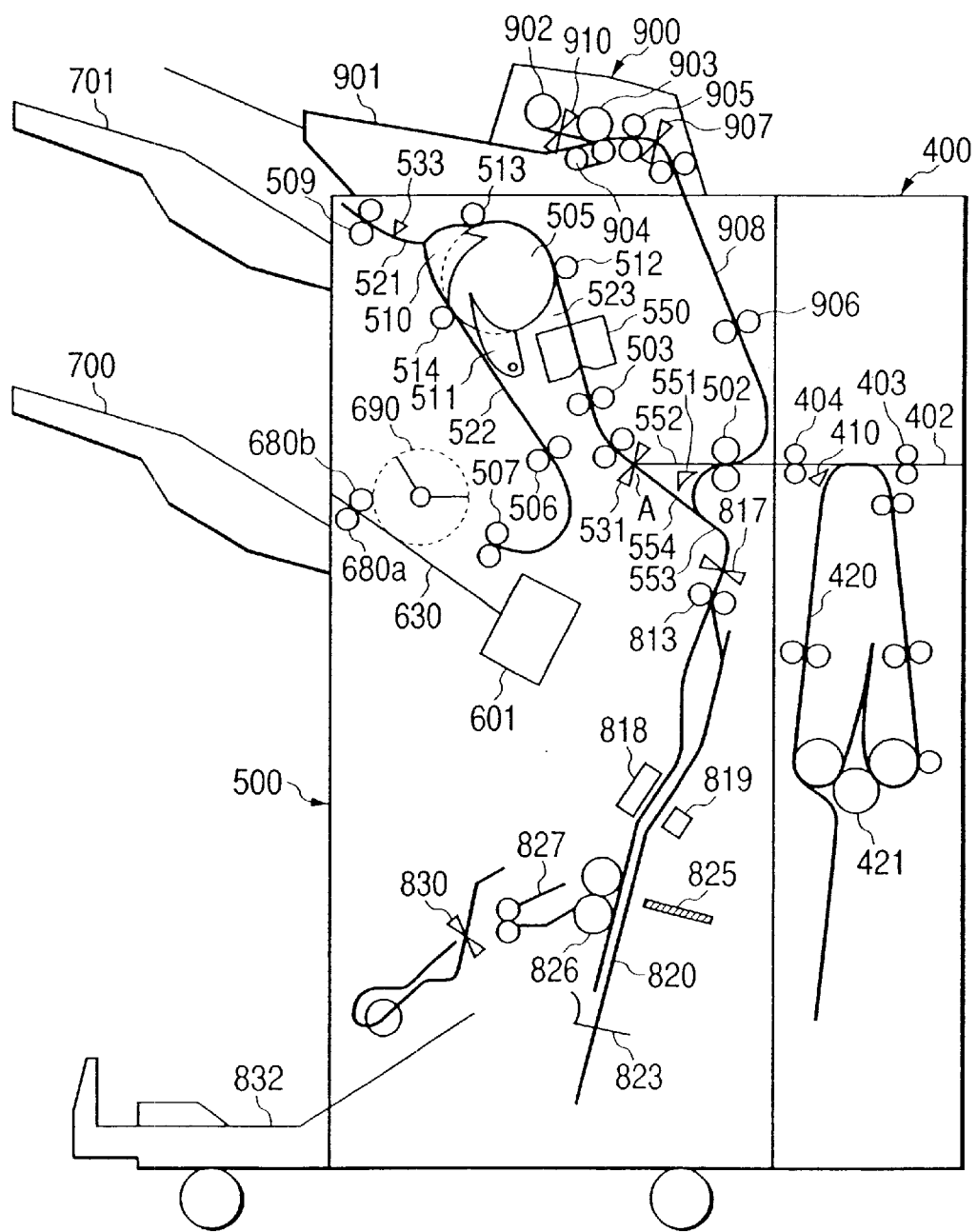
FIG. 5 is a sectional view showing structures of a folding processing unit and a finisher.

Next, the structures of the folding processing unit 400 and the finisher 500 will be explained with reference to FIG. 5. FIG. 5 is the sectional view showing the structures of the folding processing unit 400 and the finisher 500 both shown in FIG. 1.

The folding processing unit 400 includes a carrying path 402 which accepts the sheet discharged from the printer unit 300 and guides the accepted sheet to the side of the finisher 500. A pair of carrying rollers (simply referred as a carrying roller) 403 and a pair of carrying rollers (simply referred as a carrying roller) 404 are disposed on the carrying path 402. A change flapper 410 is disposed in the vicinity of the carrying roller 404 to guide the sheet carried by the carrying roller 403 to either the side of a folding path 420 or the side of the finisher 500.

In the folding processing, the change flapper 410 is changed to the side of the folding path 420, whereby the sheet is guided to the folding path 420. The sheet guided to the folding path 420 is carried to a folding roller 421 and folded into the Z shape. Conversely, if the folding processing is not performed, the change flapper 410 is changed to the side of the finisher 500 to directly carry the sheet discharged from the printer unit 500 to the finisher 500 through the carrying path 402.

The structure of the finisher 500 will be explained. The finisher 500 accepts the sheets carried from the printer unit 300 through the folding processing unit 400 in due order. Then the finisher 500 performs sheet working processing (referred as sheet postprocessing hereinafter) which includes processing to align the accepted sheets and sheave the aligned sheets as one sheaf, stapling processing (or binding processing) to staple the trailing edge side of the sheaf, punching processing to punch at the trailing edge and its vicinities of the sheet, sort processing, nonsort processing, bookbinding processing and the like, on the basis of the operation mode set by the operation unit 1 of the image formation apparatus.

As shown in FIG. 5, the finisher 500 includes a pair of inlet rollers (simply referred as an inlet roller) 502 to enter the sheet carried from the printer unit 300 through the folding processing unit 400 into the finisher 500. A change flapper 551 which guides the sheet to either a finisher path 552 or a first bookbinding path 553, at the downstream side of the inlet roller 502.

The sheet guided to the finisher path 552 is carried toward a buffer roller 505 through a pair of carrying rollers (simply referred as a carrying roller) 503. It should be noted that the carrying roller 503 and the buffer roller 505 are structured to be able to rotate forwardly and reversely.

An inlet sensor 531 is disposed between the inlet roller 502 and the carrying roller 503. A second bookbinding path 554 is branched off from the finisher path 552 at the upstream side and in the vicinity of the inlet sensor 531. Hereinafter, such a branch point is called a branch point A.

The branch point A on the carrying path acts as the branch point to carry the sheet from the side of the inlet roller 502 to the side of the carrying roller 503. However, when the carrying roller 503 rotates reversely to carry the sheet from the side of the carrying roller 503 to the side of the inlet sensor 531, the branch point A acts as the branch point having a one-way mechanism to carry the sheet only to the side of the second bookbinding path 554.

A punch unit 550 is disposed between the carrying roller 503 and the buffer roller 505 to perform the punching processing at the trailing edge and its vicinities of the sheet carried through the carrying roller 503 if necessary.

The sheet of a predetermined number carried through the carrying roller 503 can be wound around the buffer roller 505. During rotation of the buffer roller 505, the sheet is wound by push rollers 512, 513 and 514. The sheet wound around the buffer roller 505 is carried in the rotational direction of the roller 505.

A change flapper 510 is disposed between the push rollers 513 and 514, and a change flapper 511 is disposed at the downstream side of the push roller 514. The change flapper 510 separates the wound sheet from the buffer roller 505 and guides the separated sheet to either a nonsort path 521 or a sort path 522.

The change flapper 511 separates the wound sheet from the buffer roller 505 and guides the separated sheet to the sort path 522. The change flapper 511 also guides the sheet wound around the buffer roller 505, to a buffer path 523 as it is.

The sheet guided to the nonsort path 521 by the change flapper 510 is discharged onto a sample tray 701 through a pair of sheet discharge rollers (simply referred as a sheet discharge roller) 509. A sheet discharge sensor 533 is disposed on the way of the nonsort path 521 to detect sheet jam and the like.

On the other hand, the sheet guided to the sort path 522 by the change flapper 510 is stacked or laid on an intermediate tray (referred as a processing tray hereinafter) 630 through a pair of carrying rollers (simply referred as a carrying roller) 506 and a pair of carrying rollers (simply referred as a carrying roller) 507. The sheets which are stacked or laid on the processing tray 630 in the form of a sheaf are subjected to the aligning processing and the stapling processing in accordance with the setting from the operation unit 1. Then the sheaf of the sheets is discharged onto a stacking tray 700 by sheet discharge rollers 680a and 680b. It is structured that the stacking tray 700 can be up-and-down.

The above stapling processing is performed by a stapler 601. As described above, the sheet on which the image was formed by the printer unit 300 is discharged from the body of the image formation apparatus with its image-formed face facedown, guided into the finisher 500, and stacked or laid as it is on the processing tray 630 which is inclined upward in the sheet discharge direction. Then the stapler 601 performs the binding processing on the trailing edge side of the sheets which are stacked on the processing tray 630 and the image-formed faces of which are set facedown. Thus, it is possible to handle the sheaf of the sheets from its head page. Also, it is possible to obtain the output result in which the page order and the image direction were adjusted (or conformed) and the binding position is located at the left of the sheets from the viewpoint of the image-formed face. Moreover, since the trailing edge side of the sheet can be bound, it is possible to dispose the stapler on the side of the body of the image formation apparatus, thereby preventing enlargement and complication of the finisher 500.

The sheet carried from the first bookbinding path 553 or the second bookbinding path 554 passes a bookbinding inlet sensor 817, and the sheet is held in a holding guide 820 through a pair of carrying rollers (simply referred as a carrying roller) 813. The sheet is carried by the carrying roller 813 until its leading edge comes into contact with a movable sheet positioning member 823. The bookbinding inlet sensor 817 is disposed at the upstream side of the carrying roller 813, two pairs of staplers (simply referred as a stapler) 818 is disposed at the downstream side of the carrying roller 813, i.e., on the way of the holding guide 820, and an anvil 819 is opposed to the stapler 818. Thus, the stapler 818 cooperates with the anvil 819 to bind the sheaf of the sheets.

A pair of folding rollers (simply referred as a folding roller) 826 is disposed at the downstream side of the stapler 818, and an extrusion member 825 is opposed to the folding roller 826. If the extrusion member 825 is extruded toward the sheaf of the sheets held in the holding guide 820, the sheaf is protruded between the two rollers 826. Thus, the sheaf of the sheets is folded by the folding roller 826, and the folded sheaf is discharged onto a sheet discharge tray 832 through a sheet discharge roller 827. A bookbinding sheet discharge sensor 830 is disposed at the downstream side of the sheet discharge roller 827.

In a case where the sheaf of the sheets bound by the stapler 818 is folded, after the sheaf of the sheets is subjected to the stapling processing, the sheet positioning member 823 is lowered from the stapling-processing position by a predetermined distance such that the stapling position of the sheaf of sheet reaches the central position (i.e., a nip point) of the folding roller 826. Thus, the sheaf of the sheets can be folded along the position (i.e., the line) at which the stapling processing was performed.

Next, the inserter 900 which is provided on the finisher 500 will be explained. The inserter 900 is used to feed the sheet set on a tray 901 to either the sample tray 701, the stacking tray 700 or the sheet discharge tray 832 without passing the sheet through the printer unit 300.

In such the conventional method as feeding the specific sheet from the cassette disposed on the side of the body of the copying machine, if a sheet such as a color-printed original or the like is used as the specific sheet, the sheet passes the fixing unit. Thus, since the sheet is effected by thermal pressure at this time, there is some fear that image quality of the sheet deteriorates. Further, if a color copy sheet is used as the specific sheet, there is some fear that oil or the like on the face of the color copy sheet deteriorates carrying capability of the sheet feeding mechanism and thus influences sheet carrying. However, according to the present embodiment, it is possible to prevent such conventional problems.

In the present embodiment, it is assumed that the sheet for the cover (or the slipsheet) is set faceup on the tray 901 of the inserter 900 by the user. The sheaf of the sheets stacked or laid on the tray 901 by the user is sequentially separated one by one from the uppermost sheet in the sheaf, and the separated sheet is carried to the finisher path 552 or the first bookbinding path 553. Hereinafter, the structure of the inserter 900 will be explained.

The sheaf of the sheets stacked on the tray 901 is carried by a sheet feeding roller 902 to a separation unit composed of a carrying roller 903 and a separation belt 904. Thus, the sheet is sequentially separated one by one from the uppermost one by the carrying roller 903 and the separation belt 904. Then the separated sheet is carried to a carrying path 908 by a pair of extraction rollers (simply referred as an extraction roller) 905 disposed in the vicinity of the separation unit, and then the sheet is carried to the inlet roller 502 through a pair of carrying rollers (simply referred as a carrying roller) 906.

A sheet setting sensor 910 is disposed between the sheet feeding roller 902 and the carrying roller 903 to detect whether or not the sheet is set. A sheet feeding sensor 907 is disposed in the vicinity of the extraction roller 905 to detect whether or not the sheet is carried by the extraction roller 905. The carrying path 908 for carrying the sheet from the inserter 900 is interflowed to the carrying path 402 for carrying the sheet from the printer unit 300, at the upstream side and in the vicinity of the inlet roller 502.

Figure 6:
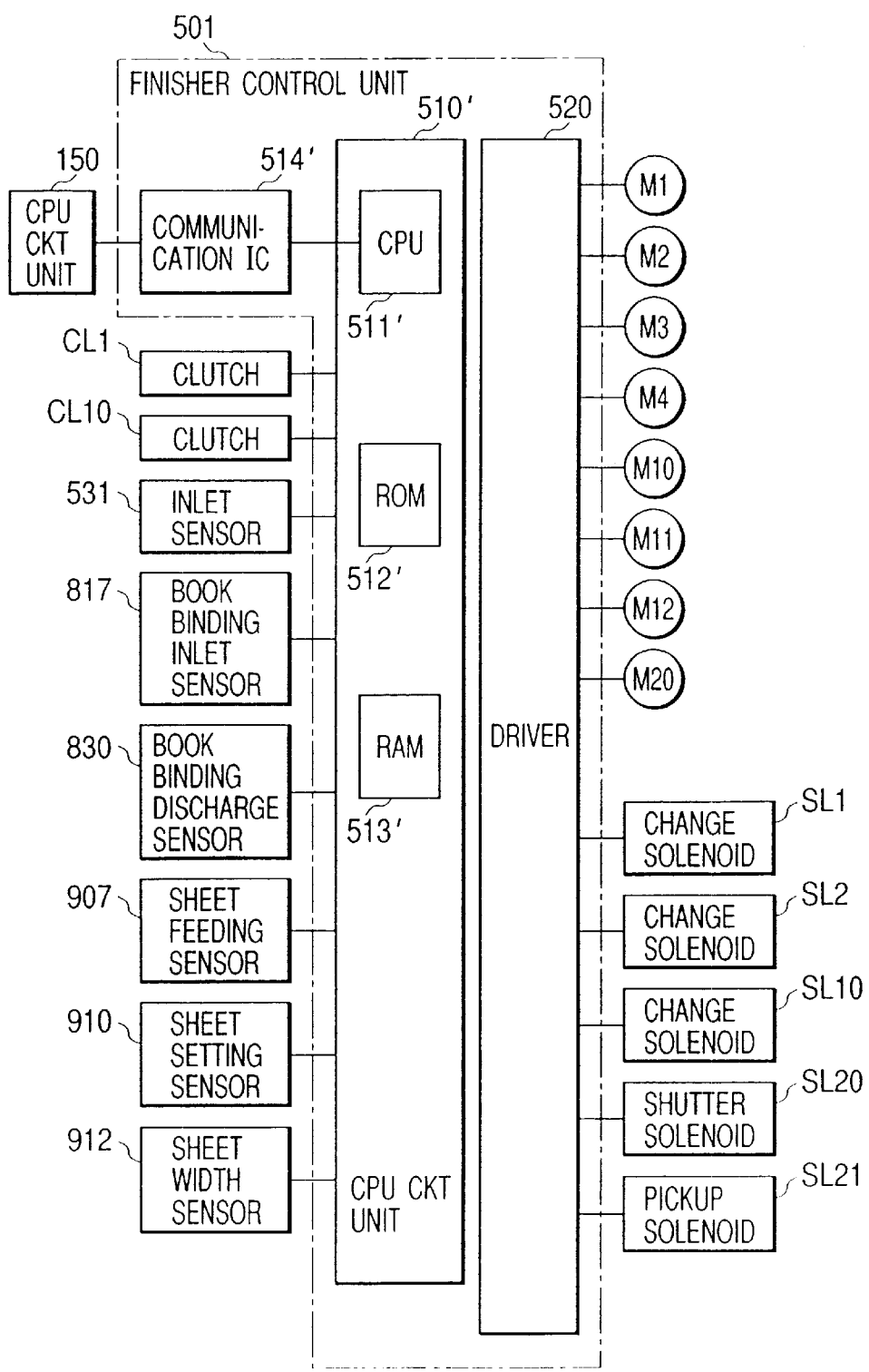
FIG. 6 is a block diagram showing a structure of a finisher control unit.

Next, the structure of the finisher control unit 501 which driving-controls the finisher 500 will be explained with reference to FIG. 6. FIG. 6 is the block diagram showing the structure of the finisher control unit 501 shown in FIG. 3.

As shown in FIG. 6, the finisher control unit 501 includes a CPU circuit unit 510' composed of a CPU 511', a ROM 512', a RAM 513' and the like. The CPU circuit unit 510' communicates with the CPU circuit unit 150 on the side of the body of the copying machine through a communication IC 514' for data conversion. Thus, the CPU circuit unit 510' executes various programs (including programs to perform processing in later-described flow charts of FIGS. 23, 24, 25, 26, 27, 28, 29 and 30) which have been stored in the ROM 512', on the basis of instructions from the CPU circuit unit 150, and thus driving-controls the finisher 500.

In case of driving-controlling the finisher 500, detection signals are input from various sensors to the CPU circuit unit 150. As the various sensors, there are the inlet sensor 531, the bookbinding inlet sensor 817, the bookbinding sheet discharge sensor 830, the sheet feeding sensor 907, the sheet setting sensor 910 (FIG. 5), a sheet width sensor 912 and the like. The sheet setting sensor 910 is the sensor to detect whether or not the sheet such as the cover or the like is set on the tray 901 of the inserter 900.

A driver 520 is connected to the CPU circuit unit 5101. Thus, the driver 520 drives motors, solenoids and clutches on the basis of the signal from the CPU circuit unit 510'. In addition, a signal from a not-shown sensor is supplied to the CPU circuit unit 510'. However, explanation of such an operation will be omitted.

As various motors, there are an inlet motor M1 which is the driving source of the inlet roller 502, the carrying roller 503 and the carrying roller 906, a buffer motor M2 which is the driving source of the buffer roller 505, a sheet discharge motor M3 which is the driving source of the carrying roller 506, the carrying roller 507 and the sheet discharge roller 509, a sheaf discharge motor M4 which is the driving source of the sheet discharge rollers 680a and 680b, a carrying motor M10 which is the driving source of the carrying roller 813, a positioning motor M11 which is the driving source of the sheet positioning member 823, a folding motor M12 which is the driving source of the extrusion member 825, the folding roller 826 and the sheet discharge roller 827, and a sheet feeding motor M20 which is the driving source of the sheet feeding roller 902, the carrying roller 902, the separation belt 904 and the extraction roller 905. In addition, the driver 520 drives not-shown motors and solenoids. However, explanation of such operations will be omitted.

Each of the inlet motor M1, the buffer motor M2 and the sheet discharge motor M3 is made of a stepping motor. It is possible by controlling an excitation pulse rate to rotate the pair of the rollers driven by the motor, at an uniform speed or different (or independent) speeds. Further, it is possible by the driver 520 to rotate each of the inlet motor M1 and the buffer motor M2 forwardly and reversely.

Each of the carrying motor M10 and the positioning motor M11 is made of a stepping motor, and the folding motor M12 is made of a DC motor. It is possible to synchronize the carrying motor M10 and the inlet motor M1 to carry the sheet.

The sheet feeding motor M20 is made of a stepping motor. It is possible to synchronize the sheet feeding motor M20 and the inlet motor M1 to carry the sheet.

As the solenoids, there are a solenoid SL1 which changes the change flapper 510, a solenoid SL2 which changes the change flapper 511, a solenoid SL10 which changes the change flapper 551, a solenoid SL20 which drives a sheet feeding shutter (not shown) of the inserter 900, and a solenoid SL21 which vertically drives the sheet feeding roller 902 of the inserter 900.

As the clutches, there are a clutch CL1 which transmits driving of the folding motor M12 to the extrusion member 825, and a clutch CL10 which transmits driving of the sheet feeding motor M20 to the sheet feeding roller 902.

Next, an example that the sheet postprocessing is selected by using the operation unit 1 will be explained with reference to FIGS. 7A, 7B and 7C. FIGS. 7A to 7C are the views showing examples of a screen concerning the sheet post-processing selection of the operation unit 1 of the image formation apparatus.

In the image formation apparatus according to the present embodiment, as the postprocessing mode, it is possible to select a nonsort mode, a sort mode, a stapling sort mode (a binding mode), a bookbinding mode, an inserter mode (or a manual sheet feeding mode), or the like. The inserter mode is to insert the specific sheet (a color sheet, a cardboard or the like) in the sheets on which the images were respectively formed by the printer unit 300, as the cover or the like. Thus, the user can select the desired operation mode from the operation unit 1.

First, the method to set the operation mode will be explained with reference to FIGS. 7A to 7C. FIGS. 7A to 7C show the contents of the display panel of the operation unit 1 of the body of the copying machine 1000. Since the display panel is a touch panel, a function is executed if the box displayed on the display panel and representing such the function is touched.

For example, when the postprocessing is set, the postprocessing selection menu screen shown in FIG. 7A is displayed on the operation unit 1. Thus, the user can select the desired operation mode such as the nonsort mode, the sort mode, the stapling sort mode (the binding mode), the bookbinding mode or the like.

Further, for example, when the cover insertion is set, the cover designation menu screen shown in FIG. 7B is displayed on the operation unit 1. By using the "inserter" key or the "manual feeder" key on the screen, the user can set whether the cover is to be inserted from the inserter 900 or the manual sheet feeding unit 125. When the sheet is fed from the inserter 900, such the sheet was subjected to the image formation processing. Incidentally, in addition to such a cover mode as above, a slipsheet mode may be set on the screen. Thus, from the inserter 900 or the manual sheet feeding unit 125, it is possible to insert the sheet for the cover or the slipsheet in the head page, the final page or the intermediate page of the recording sheets.

FIG. 7C shows the reading mode designation menu screen which is displayed on the display panel of the operation unit 1 in accordance with an instruction from the user, in a case where the image formation apparatus can perform the image formation processing in the original standing reading mode besides the original running reading mode. On this screen, the image formation apparatus operates in the original running reading mode according as the "high speed mode" key is selected by the user. Conversely, the image formation apparatus operates in the original standing reading mode according as the "high quality mode" key is selected by the user. Ordinarily, if there is no instruction from the user, the original set on the original tray 1001 of the original feeding unit 100 is read in the original running reading mode.

Next, the sheet carrying from the inserter 900 and the printer unit 300 to the processing tray 630 within the finisher 500 will be explained with reference to FIGS. 8A, 8B, 9, 10, 11, 12, 13A and 13B. FIGS. 8A to 13B are the views for explaining the flow of the sheets when the sheet from the inserter 900 and the sheet from the printer unit 300 are carried and then laid on the processing tray 630 of the finisher 500.

In the present embodiment, it is assumed that the sheet carried from the inserter 900 is the sheet for the cover, and the three sheets composed of the one sheet from the inserter 900 and the two sheets from the printer unit 300 are laid on the processing tray 630.

When the sheet of a sheaf C is inserted in the sheets on which the images were respectively formed by the printer unit 300, as shown in FIG. 8B, the sheaf C is first set on the tray 901 of the inserter 900 by the user. At this time, the sheaf C is set on the tray 901 in the state that the face on which the image was formed is set faceup and the binding position is set left, i.e., in an erect state (FIG. 8A). The sheet set on the tray 901 is carried in the direction (rightward) indicated by the arrow of FIG. 8A. Namely, as shown in FIGS. 8A and 8B, the sheet on the tray 901 of the inserter 900 is fed in the direction opposite to the feeding direction (leftward) of the original set on the original tray 1001. Incidentally, it should be noted that the image direction of the original on the original tray 1001 is identical with the original direction of the sheet on the tray 901 of the inserter 900.

The original on the original tray 1001 and the sheet on the tray 901 of the inserter 900 are respectively fed toward the center side of the image formation system which is composed of the body of the image formation apparatus, the finisher 500 and the like, whereby the entire system can be made compact Further, the original setting direction for the original tray 1001 and the sheet setting direction for the tray 901 of the inserter 900 can be unified. Thus, the user can set the original on the original tray 1001 and the sheet for the cover (or the slipsheet) on the tray 901, such that the image-formed face (i.e., the face on which the image was formed) is set faceup, the head page is set uppermost, and the binding position is located at the left of the sheet from the viewpoint of the image-formed face, thereby enabling to improve operability for the user and prevent a user's erroneous operation.

Figure 9:
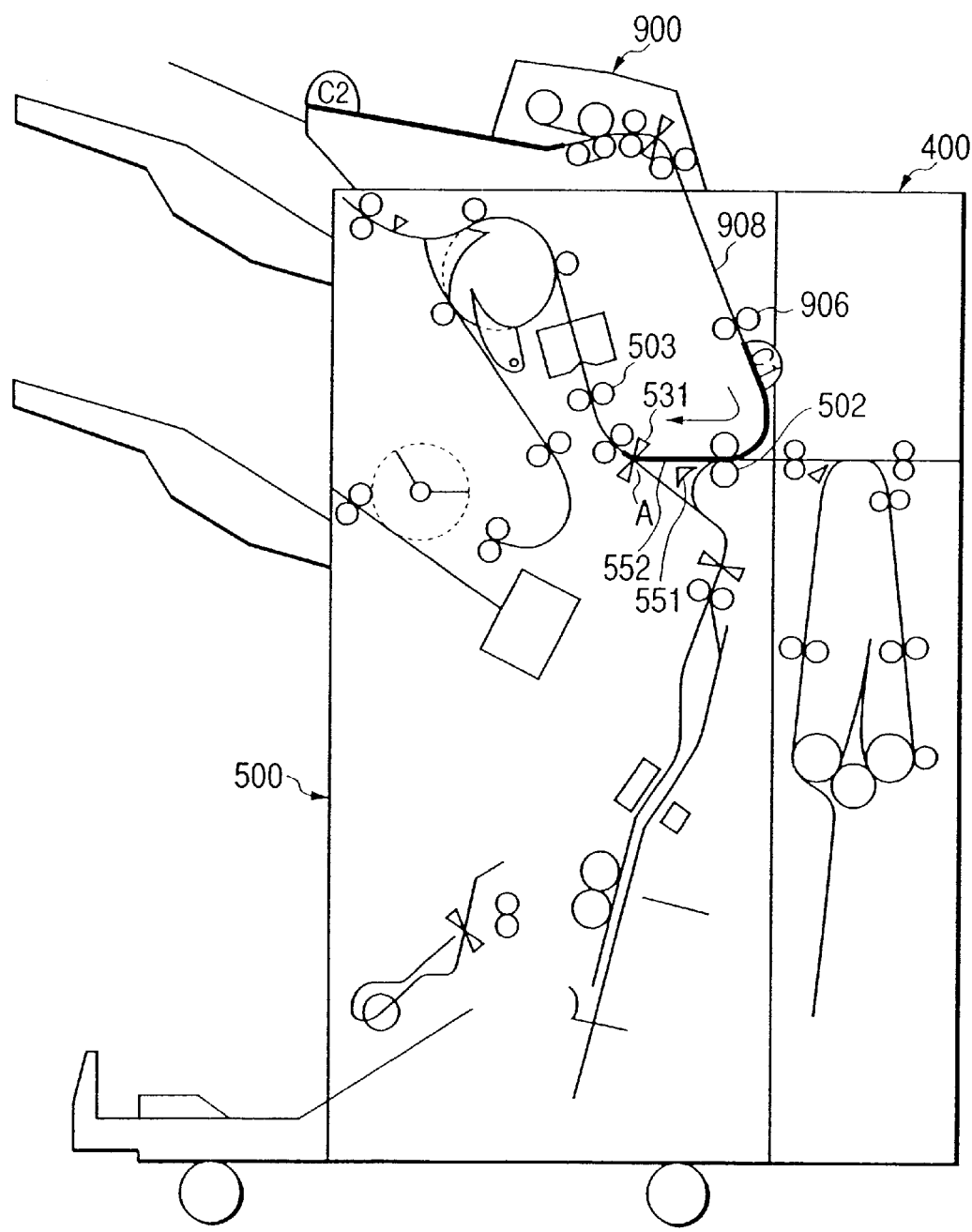
FIG. 9 is a view for explaining the flow of the sheets in the case where the sheet from the inserter and the sheet from the printer unit are laid on the processing tray.

If the user selects the "inserter" key on the display panel of the operation unit 1, sets the sheaf C of sheets on the tray 901, and depresses a start key (not shown) on the operation unit 1, then, as shown in FIG. 9, the uppermost sheet (called a sheet C1 hereinafter) of the sheaf C and the following sheets are sequentially separated by the separation unit (the carrying roller 903 and the separation belt 904) of the inserter 900, and the separated sheets are carried to the carrying path 908. At this time, the change flapper 551 has been changed to the side of the finisher path 552, as shown in FIG. 9.

The uppermost sheet C1 of the sheaf C carried to the carrying path 908 is further carried to the side of the buffer roller 505. As shown in FIG. 9, the sheet C1 is carried to the roller 505 with its image-formed face (the face on which the image was formed) facedown.

If the leading edge of the sheet C1 carried from the carrying path 906 through the inlet roller 502 passes the inlet sensor 531, the sheet carrying from the printer unit 300 to the inside of the finisher 500 starts. It is assumed that the sheets carried from the printer unit 300 to the inside of the finisher 500 are sheets P1 and P2 (FIGS. 10 to 13B), and that the sheet P1 is carried and the sheet P2 is subsequently carried.

Figure 10:
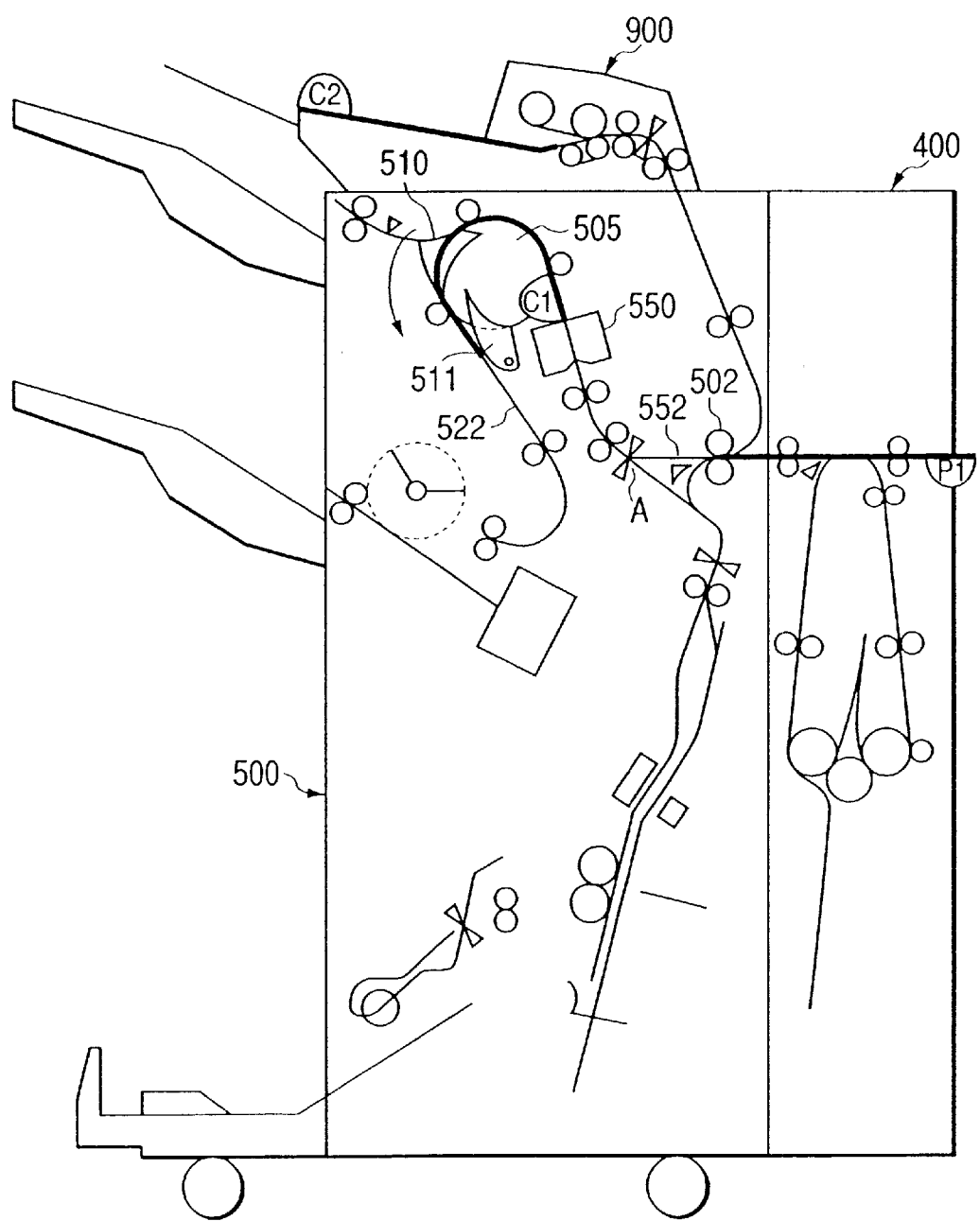
FIG. 10 is a view for explaining the flow of the sheets in the case where the sheet from the inserter and the sheet from the printer unit are laid on the processing tray.

Next, as shown in FIG. 10, since both the change flappers 510 and 511 have been changed to the side of the sort path 522, the sheet C1 carried by the buffer roller 505 is guided to the sort path 522. At this time, subsequent to the sheet C1, the sheet P1 from the printer unit 300 is carried to the inside of the finisher 500. Further, as shown in FIG. 10, the sheet P1 is guided to the finisher 500 with its image-formed face facedown. Hereinafter, the details about this flow will be explained in detail.

In the present embodiment, the original set to the original feeding unit 100 is subjected to the reading processing by the image reader unit 200, the image of the read original is subjected to the image formation processing by the printer unit 300, and the processed image is formed on the sheet. In this operation, the original is read in the original running reading.

As described above, in the original running reading, the read image is subjected to the mirror image correction processing (i.e., the processing to change the data of the main scan direction in the read image data) such that the right image is formed on the sheet, and the processed image is formed on the sheet. When the image-formed sheet is discharged from the printer unit 300, the sheet is reversed to set the image-formed face facedown, and the reversed sheet is discharged. Therefore, as shown in FIGS. 10 to 13B, the sheets P1 and P2 from the printer unit 300 are carried to the finisher unit 500 with their image-formed faces facedown.

Figure 11:
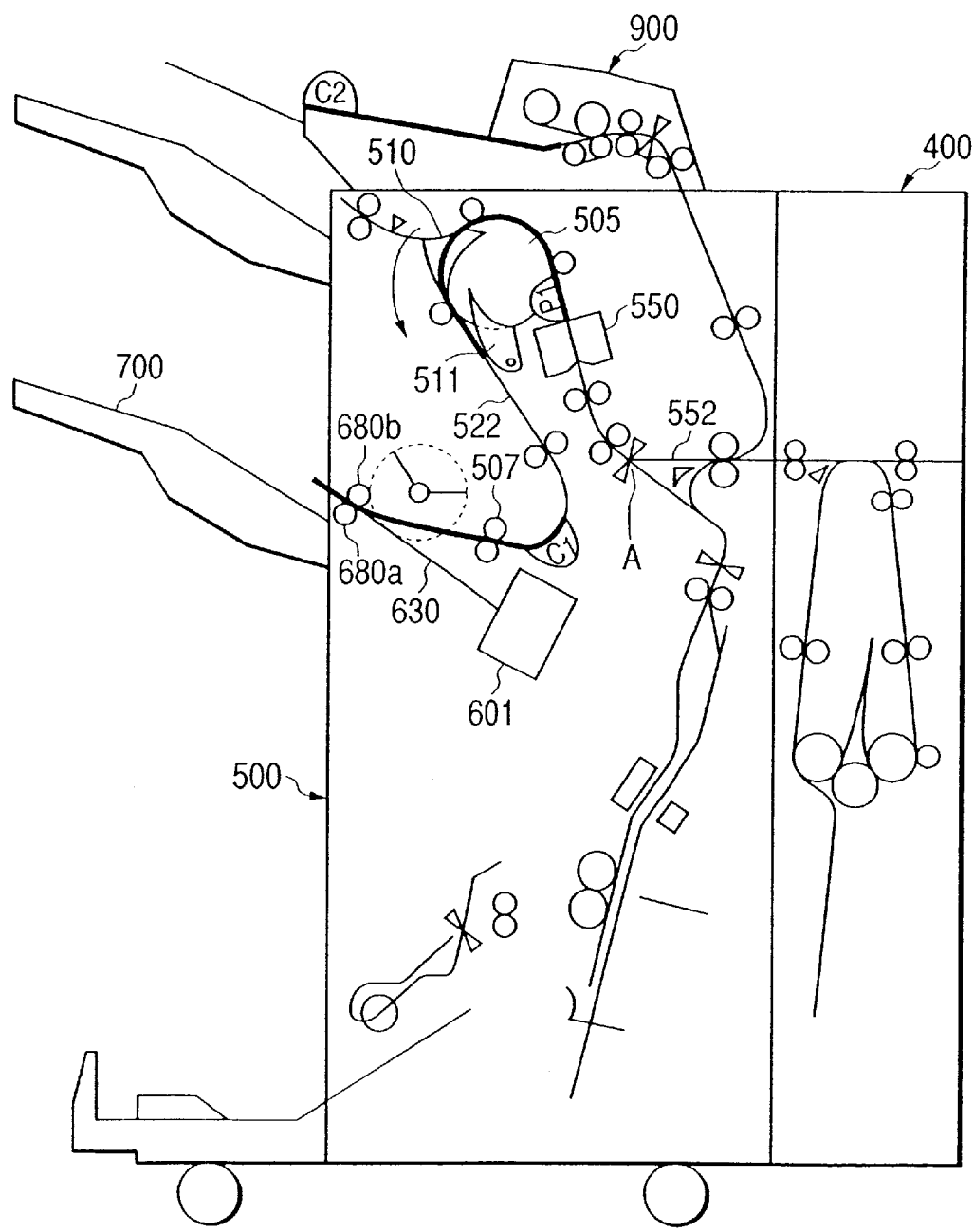
FIG. 11 is a view for explaining the flow of the sheets in the case where the sheet from the inserter and the sheet from the printer unit are laid on the processing tray.

As shown in FIG. 11, the sheet C1 carried to the sort path 522 is further carried to the processing tray 630. Conversely, the sheet P1 subsequent to the sheet C1 is carried to the buffer roller 505 through the finisher path 552, and then guided to the sort path 522. At this time, subsequent to the sheet P1, the carrying of the sheet P2 from the printer unit 300 to the inside of the finisher 500 starts. When the second copy is output, the separation unit of the inserter 900 starts at this time to separate the sheet (i.e., a sheet C2 in this case) subsequent to the sheet C1 stacked or laid on the tray 901.

Figure 12:
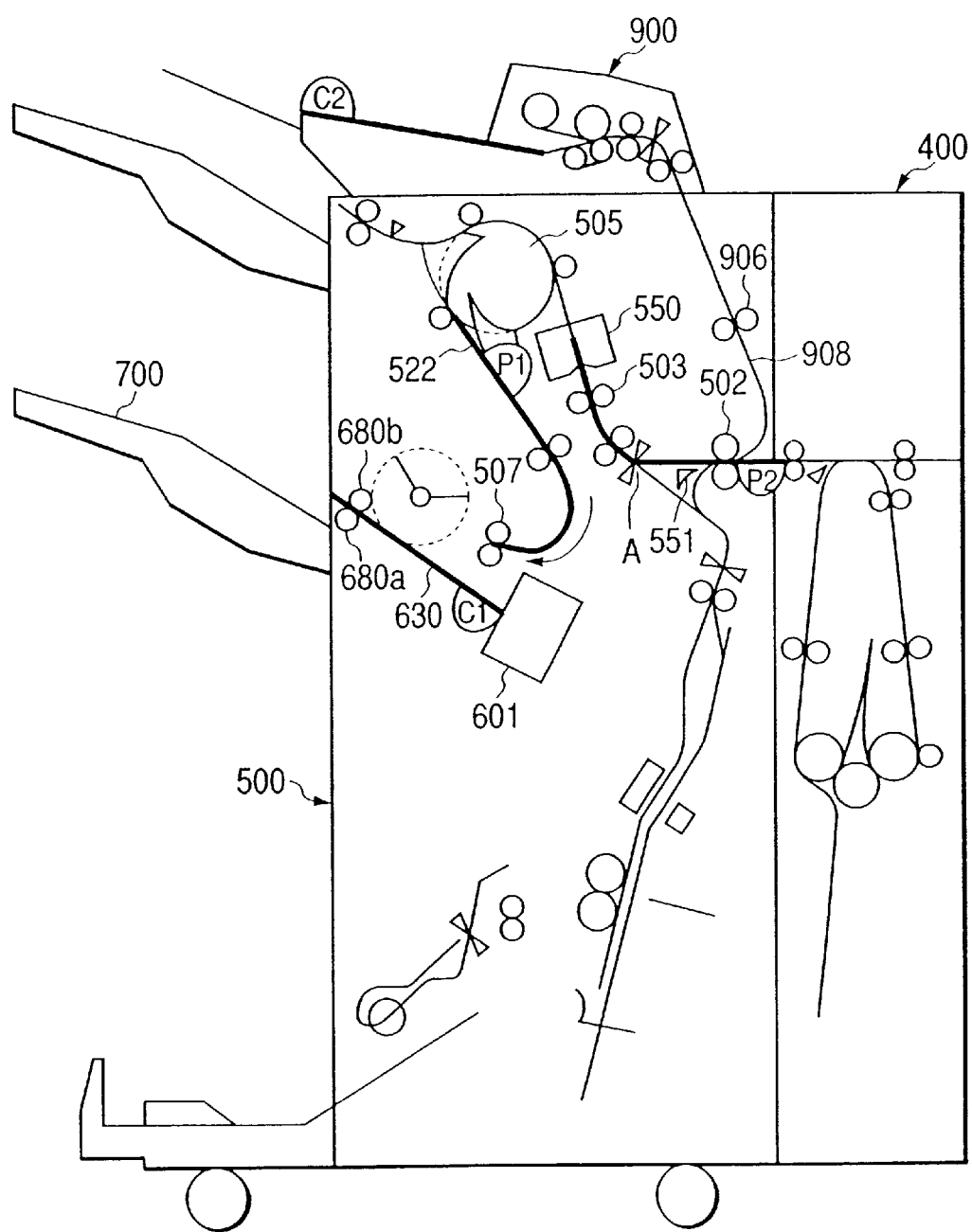
FIG. 12 is a view for explaining the flow of the sheets in the case where the sheet from the inserter and the sheet from the printer unit are laid on the processing tray.

Next, as shown in FIG. 12, the sheet C1 is stacked or laid on the processing tray 630 in the state that its image-formed face is set facedown and its binding position is set on the side of the stapler 601. Like the sheet C1, the sheet P1 subsequent to the sheet C1 is carried toward the processing tray 630. Further, the sheet P2 subsequent to the sheet P1 is guided to the body of the finisher 500, and carried toward the buffer roller 505. The sheets P1 and P2 are sequentially carried to and laid on the processing tray 630.

When the second copy is output, subsequent to the sheet P2, the sheet C2 for the cover of the second copy is carried to the carrying path 908. While the sheet P2 is being carried to the processing tray 630, the sheet C2 is once stopped at the front of and in the vicinity of the carrying roller 908. Thus, according as the preceding sheet P2 of the first copy is laid on the processing tray 630, the carrying of the sheet C2 restarts. Thus, since the sheet (i.e., the sheet C2) for the cover which is used in the job subsequent to currently processed job is previously fed from the inserter 900 and the fed sheet is then on standby in the path of the finisher 500, it is possible to improve productivity in case of outputting the plural copies.

Figure 13A:
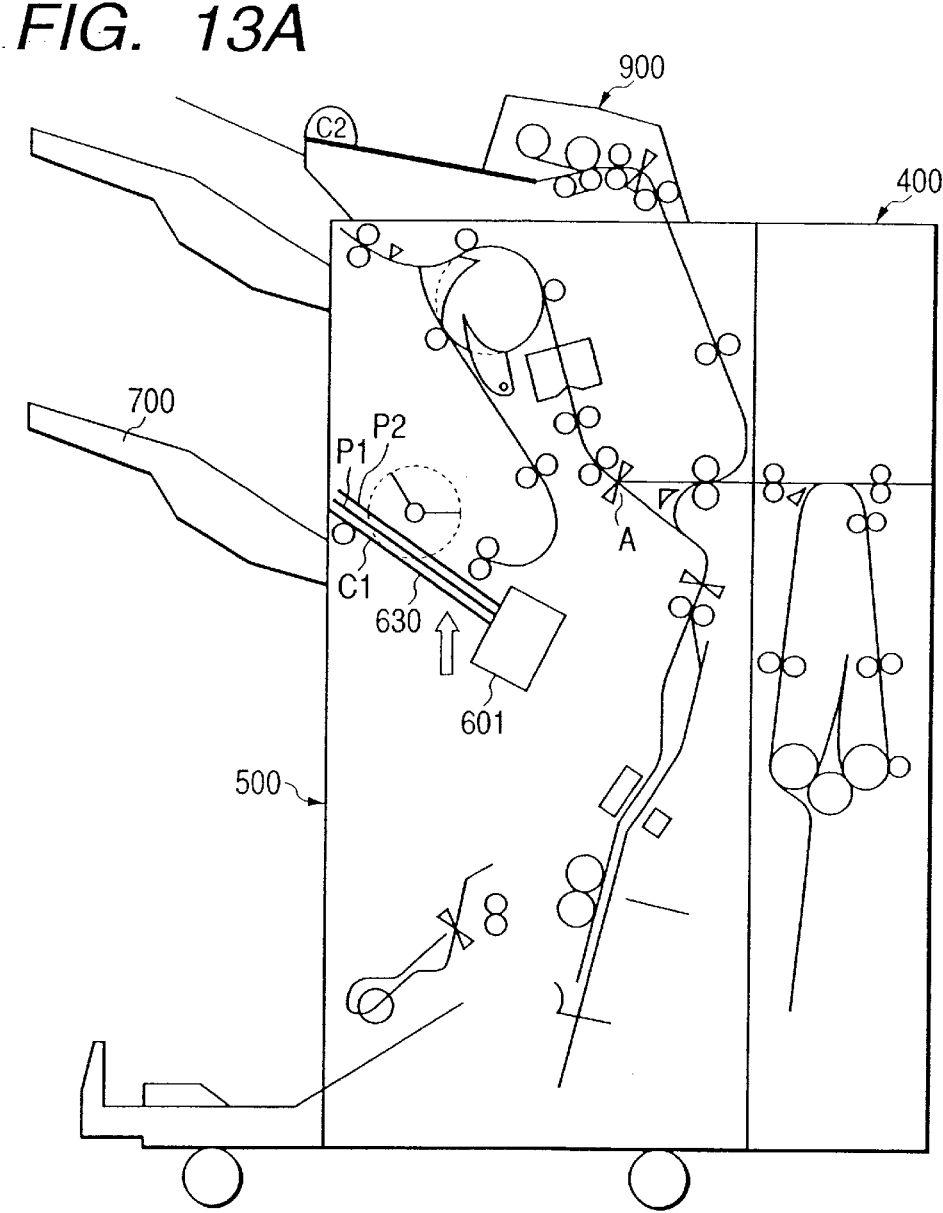
FIGS. 13A and 13B are views for explaining the flow of the sheets in the case where the sheet from the inserter and the sheet from the printer unit are laid on the processing tray.
Figure 13B:
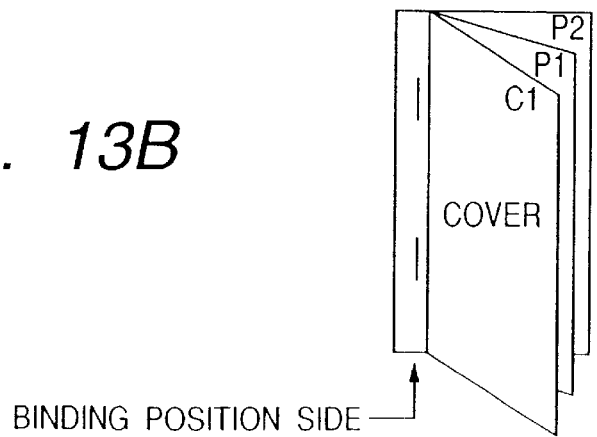

Next, as shown in FIGS. 13A and 13B, the sheet P1 is stacked on the sheet C1 previously laid on the processing tray 630, as keeping its image-formed face facedown. Then the sheet P2 subsequent to the sheet P1 is stacked on the sheet P1, as keeping its image-formed face facedown (FIG. 13A). It should be noted that the images of the sheets P1 and P2 were subjected to the mirror image correction processing to become the right images. When the sheet is carried from the printer unit 300 to the finisher 500, this sheet is reversed on the side of the printer unit 300 and then discharged therefrom. Therefore, like the sheet C1, the sheets P1 and P2 are stacked on the processing tray 630 in the state that their image-formed faces are set facedown and their binding positions are located on the side of the stapler 601.

When the binding processing is performed to the sheaf of these plural sheets as the postprocessing, according as the sheet P2 (i.e., the final-page sheet of the sheaf of one job) is laid on the processing tray 630, the binding processing is performed by the stapler 601. For example, as shown in FIG. 13A, the stapler 601 performs the binding processing to the trailing edge side of the sheaf composed of the sheets C1, P1 and P2 stacked on the processing tray 630 with their image-formed faces facedown. If the sheaf of the sheets subjected to the binding processing by the stapler 601 is viewed from the direction indicated by the white arrow of FIG. 13A, the state of FIG. 13B is visible. As above, when the stapling process is performed to the sheaf composed of the sheets carried from the inserter 900 and the sheets subjected to the image formation by the printer unit 300, it is possible to adjust the page order, and conform the image directions and the binding positions of the plural sheets to others. Thus, it is possible to obtain the output result in which the binding position is located at the left of the sheet from the viewpoint of the image-formed face. Therefore, when the sheets carried from the inserter 900 and the sheets subjected to the image formation by the printer unit 300 are mixedly stacked, it is possible to satisfactorily perform both the head-page processing and the postprocessing. Further, when the image formation apparatus has the facsimile function and the printing function besides the copying function, it is possible to perform the processing from the head page in any function and perform the postprocessing (e.g., the stapling processing) in the state that the sheet from the inserter 900 was inserted. Further, it is possible to prevent that the structure of the body of the image formation apparatus becomes complicated because the device (e.g., the finisher) having the inserter 900 is usable. Thus, the inserter 900 can be used while maximumly using the structure, the function and the like of the body of the image formation apparatus to advantage.

As explained above, in the present embodiment, the mirror image correction processing is performed to the input image as the processing to conform the image direction of the sheet set on the tray 901 of the inserter 900 to the direction of the image input from the image reader unit 200, the image subjected to the mirror image correction processing is formed on the sheet, and the sheet from the inserter 900 and the sheet on which the image was formed are stacked on the processing tray 630 (or the holding guide 820).

Thus, when the sheets from the inserter 900 and the printer unit 300 are mixedly stacked on the processing tray 630 (or the holding guide 820), it is possible to conform the image direction on the sheet from the inserter 900 to the image direction on the sheet from the printer unit 300. Therefore, since the positions of the sheets can be easily conformed to others in the postprocessing, it is possible to prevent the disadvantage which is caused when the postprocessing is performed to the sheaf of the sheets mixedly composed of the sheets from the inserter 900 and the sheets from the printer unit 300.

When the sheet is carried to the processing tray 630, the sheet set to the inserter 900 is once reversed and then carried to the tray 630, and similarly the sheet on which the image was formed by the printer unit 300 is reversed and then carried to the tray 630. In this operation, the sheet is carried from the inserter 900 before the sheet is carried from the printer unit 300. Thus, when the sheets from the inserter 900 and the sheets on which the images were respectively formed by the printer unit 300 are mixedly stacked, it is possible to satisfactorily perform both the head-page processing and the postprocessing. For example, when the stapler 601 performs the stapling processing to the sheaf composed of such the plural sheets stacked on the processing tray 630, as shown in FIG. 13B, it is possible to conform the image directions and the binding positions of the respective sheets to others.

Further, the setting direction of the original to be set on the original tray 1001 of the original feeding unit 100 (i.e., the original stacking direction for the original tray 1001) is identical with the setting direction of the sheet to be set on the tray 901 of the inserter 900 (i.e., the sheet stacking direction for the tray 901) (FIGS. 1, 8A and 8B). Further, the user can set the original and the sheet to the respective trays in the erect state and in the state that their image-formed faces are set faceup. Therefore, when the cover mode and the slipsheet mode are used, it is possible to prevent the erroneous operation by the user and to improve the operability for the user.

Further, in the present embodiment, as shown in FIG. 1, the feeding direction (from the right to the left) of the original stacked on the original tray 1001 of the original feeding unit 100 is opposite to the feeding direction (from the left to the right) of the sheet stacked on the tray 901 of the inserter 900, and each tray faces outside of the apparatus. Thus, it is possible to downsize the apparatus and improve sheet setting condition for the inserter 900.

As described above, in case of enabling to output the sheaf of the sheets which is composed of the specific sheet such as the cover or the like and the sheets on which the images were respectively formed, the objects of the present embodiment are to prevent the erroneous operation by the user and increase the operability for the user. In order to realize such the objects, in the present embodiment, the original setting direction for the original tray 1001 and the sheet setting direction for the tray 901 of the inserter 900 can be unified, and the original and the sheet can be set to the respective trays in the state that their image-formed faces are set faceup, in the state that their head pages are set uppermost, and in the state that the binding position is located at the left of the sheet from the viewpoint of the image-formed face. Further, in order to downsize the entire image formation system including the image formation apparatus, the device (e.g., the finisher 500) having the inserter 900, and the like, it is structured that each of the original tray 1001 and the tray 901 of the inserter 900 faces outside of the apparatus (FIG. 1), and that the original on the original tray 1001 and the sheet on the tray 901 are fed toward the center side of the image formation system (FIGS. 1, 8A and 8B). Further, the sheet from the inserter and the sheet from the original formation apparatus can be bound into one sheaf, whereby it is possible to obtain the output result in which the page order and the image directions are conformed to others and the binding position is located at the left of the sheet from the viewpoint of the image-formed face, without enlarging and complicating the entire system. Further, in order to improve the productivity and maximumly use the structure, the function and the like of the body of the image formation apparatus to advantage, the sheet carrying from the inserter is started before the sheet carrying from the side of the body of the image formation apparatus to the finisher 500, the sheet from the inserter 900 is reversed such that its image-formed face is set facedown (FIG. 9), and such the sheet from the inserter 900 is stacked or laid on the processing tray 630 as keeping its image-formed face facedown (FIG. 12, etc.). On the other hand, on the side of the image formation apparatus, the reading processing is performed from the uppermost original (i.e., the head page) of the sheaf set on the original tray 1001 in due order, the reading processing is performed in the original reading such that the original image becomes the mirror image, the mirror image correction is performed by reversing the main scan direction as to the read original image, the image subjected to the mirror image correction is formed on the sheet fed from the right side of the body of the image formation apparatus, the image-formed sheet is fed leftward, the face of the fed sheet is reversed by the path 122 of the body of the apparatus such that the image-formed face (i.e., the front or first face of the sheet in this case) is turned facedown, and the sheet the image-formed face of which is set facedown is discharged from the body of the image formation apparatus (FIGS. 1 and 2B). Then, the sheet to which the image was formed by the image formation apparatus and which is guided into the finisher 500 is stacked or laid on the processing tray 630 on which the sheet from the inserter has been stacked or laid, as keeping its image-formed face facedown (FIG. 12, etc.). Next, the binding processing is performed to the trailing edge side of the sheaf of the serial sheets which sheaf is stacked on the processing tray 630 with its image-formed face facedown and composed of the sheet from the inserter and the sheet from the body of the image formation apparatus, by the stapler 601 disposed on the sheet outlet side of the body of the image formation apparatus (FIGS. 13A and 13B). Next, the sheaf of sheet subjected to the binding processing is discharged onto the stacking tray 700 provided at the most downstream side of the sheet carrying direction (i.e., the left side of the processing tray 630).

In the present embodiment, the case where the original image is input from the image reader unit 200 was explained. However, as shown in FIG. 3, the present invention is also applicable to a case where the image data is input from an external apparatus such as the computer 210 or the like. Even in this case, the image direction and the binding position of the sheet set on the tray 901 is of the inserter 900 is considered, the mirror image correction processing and the rotation processing are performed to the image input from the computer 210 if necessary, the processed image is formed on the sheet, the front and rear faces of this sheet are reversed, and the reversed sheet is discharged to the finisher 500. Thus, when the sheet from the inserter 900 and the sheet from the printer unit 300 are mixedly stacked, it is possible to satisfactorily perform both the processing from the head page and the postprocessing (e.g., the stapling processing) in the state that the sheet from the inserter 900 was inserted, in any function such as the copying function, the printing function or the like. Further, when the postprocessing such as the stapling processing is performed to the sheaf of the plural sheets which are stacked or laid on the processing tray 630 and which sheaf is composed of the sheets from the inserter 900 and the sheets on which the images were respectively formed by the printer unit 300, it is possible to obtain the output result in which the page order and the image directions of the respective sheets are conformed to others and the binding position is located at the left of the sheet from the viewpoint of the image-formed face.

Further, in FIGS. 8 to 13B, the case where the sheet from the inserter 900 is inserted in the head page of the sheets from the printer unit 300 was explained as the explanation of the cover mode. However, the present invention is also applicable to the slipsheet mode in which the sheet from the inserter 900 is inserted as the slipsheet in the sheets from the printer unit 300.

Next, the bookbinding processing will be explained with reference to FIGS. 14A, 14B, 14C and 14D. The bookbinding processing is performed when the user sets bookbinding mode as the operation mode on the display panel (FIG. 7A) of the operation unit 1. FIGS. 14A to 14D are the views for explaining the image formation processing of the copying machine 1000 (FIG. 1) in the bookbinding mode.

According as the bookbinding mode is designated and the not-shown start key of the operation unit 1 is depressed, the originals set on the original tray 1001 of the original feeding unit 100 are sequentially read from the head page, the images of the read originals are sequentially stored in the HD 206 of the image signal control unit 202 through the line memory 204 and the page memory 205, and the number of read originals is counted. After the original reading processing ends, the read original images are classified according to the following equation (1) to determine image formation order and image formation positions.

$$M = n \times 4 - k \qquad (1)$$

where M represents the number of originals, n which is an integer equal to or larger than "1" represents the number of sheets on which the read original images are to be formed, and k is either "0", "1", "2" or "3".

Figure 14A:
FIGS. 14A, 14B, 14C and 14D are views for explaining bookbinding processing.

The image formation processing in the bookbinding mode will be explained with reference to a case where, for example, the number of read originals is eight. As shown in FIG. 14A, original image data (R1, R2, R3, R4, R5, R6, R7, R8) of the eight pages are sequentially stored in the HD 206 in the order identical with the original reading order.

Figure 14B:
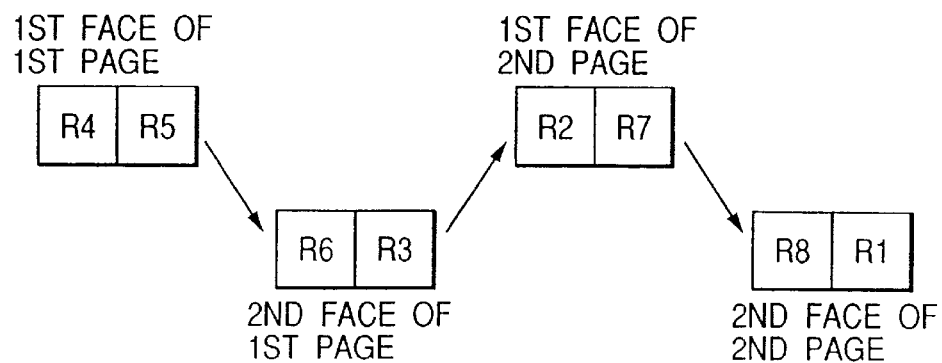

Then the image formation order and the image formation position are determined for each image data. Thus, as shown in FIG. 14B, the image of the image data R4 is formed in the left half of the first face (or the front face) of the first sheet P1, and the image of the image data R5 is formed in the right half thereof. As previously described, it should be noted that the image to be formed on the sheet was subjected to the mirror image correction processing.

The sheet P1 on which the images of the image data R4 and R5 were formed is again fed to the transfer unit 116 through the double-faced sheet carrying path 124. Next, the image of the image data R6 is formed in the left half of the second face (or the rear face) of the first sheet P1, and the image of the image data R3 is formed in the right half thereof. The sheet P1 the both faces of which are formed with the images is discharged from the printer unit 300 as it is (i.e., in the state that the second face is set faceup), and the discharged sheet P1 is carried to the first bookbinding path 553 of the finisher 500.

Figure 14C:
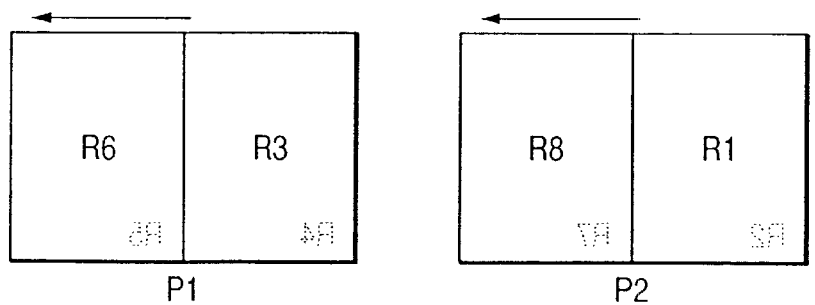

When the sheet P1 is carried from the printer unit 300 to the finisher 500, as shown in FIG. 14C, the sheet P1 is carried in the direction (leftward) indicated by the arrow in the state that the second face on which the images of the image data R6 and R3 were formed is set faceup and the image of the image data R6 leads. Further, as shown in FIG. 14C, the image of the image data R5 is formed to the other side part of the sheet P1 corresponding to the part where the image of the image data R6 is formed, and the image of the image data R4 is formed to the other side part corresponding to the part where the image of the image data R3 is formed.

Subsequent to the above processing, the image of the image data R2 is formed in the left half of the first face (or the front face) of the second sheet P2, and the image of the image data R7 is formed in the right half thereof (FIG. 14B). Also, it should be noted that the image to be formed on the sheet was subjected to the mirror image correction processing.

The sheet P2 on which the images of the image data R2 and R7 were formed is again fed to the transfer unit 116 through the double-faced sheet carrying path 124 Next, the image of the image data R8 is formed in the left half of the second face (or the rear face) of the second sheet P2, and the image of the image data R1 is formed in the right half thereof. The sheet P2 the both faces of which are formed with the images is discharged from the printer unit 300 as it is (i.e., in the state that the second face is set faceup), and the discharged sheet P2 is carried to the first bookbinding path 553 of the finisher 500.

When the sheet P2 is carried from the printer unit 300 to the finisher 500, as shown in FIG. 14C, the sheet P2 is carried in the direction (leftward) indicated by the arrow in the state that the second face on which the images of the image data R8 and R1 were formed is set faceup and the image of the image data R8 leads. Further, as shown in FIG. 14C, the image of the image data R7 is formed to the other side part of the sheet P2 corresponding to the part where the image of the image data R8 is formed, and the image of the image data R2 is formed to the other side part corresponding to the part where the image of the image data R1 is formed.

Figure 14D:
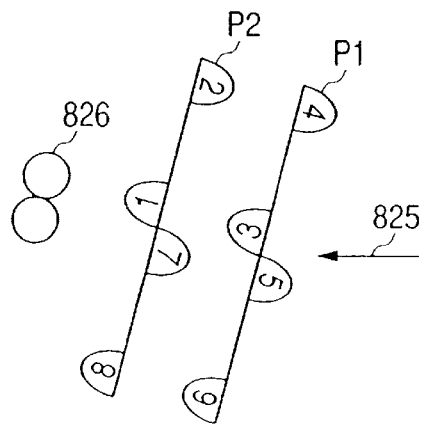

The sheets P1 and P2 are sequentially guided and held in the holding guide 820 through the first bookbinding path 553 of the finisher 500. In the holding guide 820, as shown in FIG. 14D, the sheet P1 is located on the side of the extrusion member 825, the sheet P2 subsequent to the sheet P1 is located on the side of the folding roller 826, and the first faces (the front faces) of the sheets P1 and P2 are turned toward the extrusion member 825. It should be noted that, in the holding guide 820, the sheets P1 and P2 are located by the sheet positioning member 823.

Figure 21:
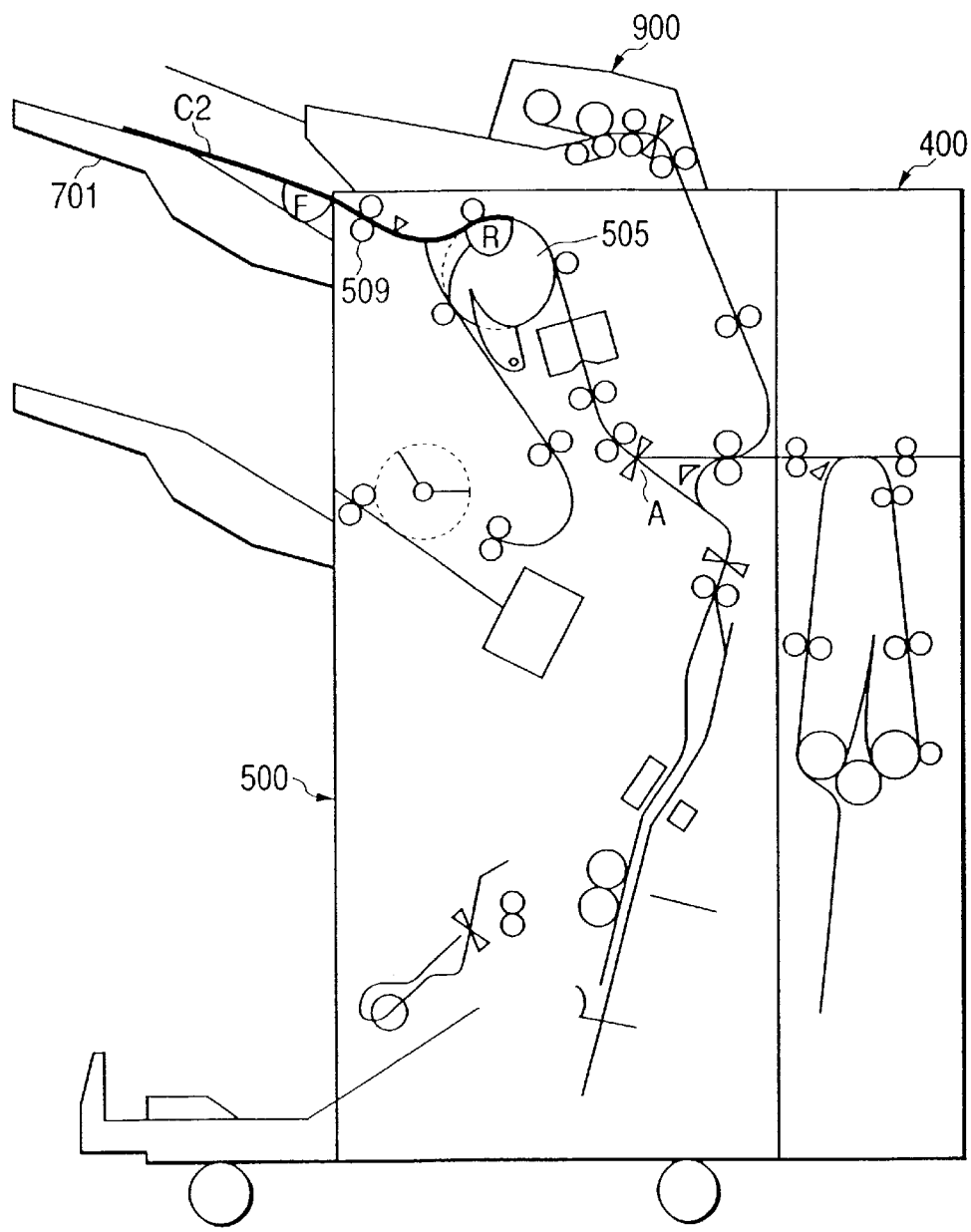
FIG. 21 is a view for explaining the flow of the sheets from the inserter and the printer unit to the holding guide within the finisher.
Figure 22A:
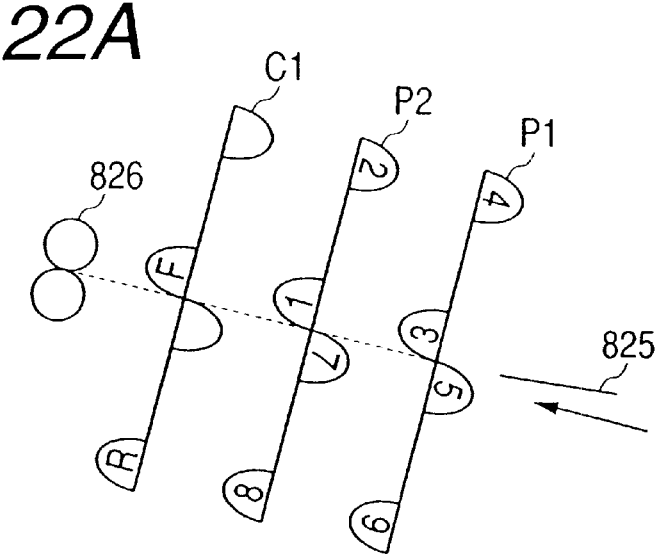
FIGS. 22A and 22B are views for explaining the flow of the sheets from the inserter and the printer unit to the holding guide within the finisher.
Figure 22B:
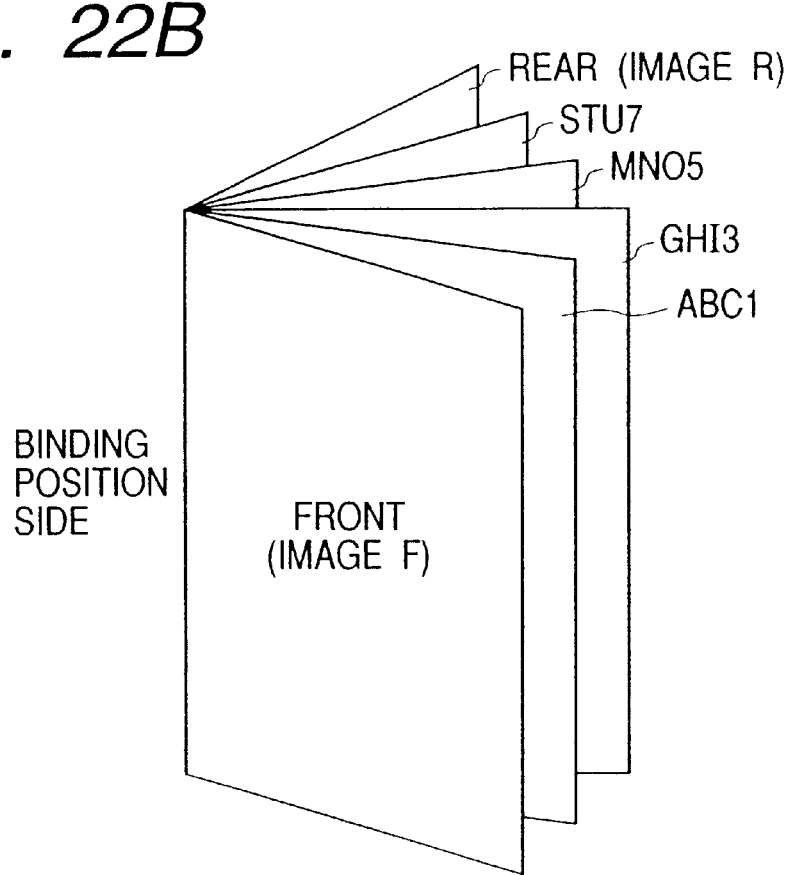

Next, the sheet carrying from the inserter 900 and the printer unit 300 to the holding guide 820 of the finisher in the bookbinding mode will be explained with reference to FIGS. 15A, 15B, 16, 17, 18, 19, 20 and 21. FIGS. 15A to 21 are the views for explaining the flow of the sheets from the inserter 900 and the printer unit 300 to the holding guide 820 within the finisher 500 in the bookbinding mode. FIGS. 22A and 22B are views for explaining an example that the binding processing, the folding processing and the bookbinding processing are performed in the finisher of FIG. 5.

Figure 15A:
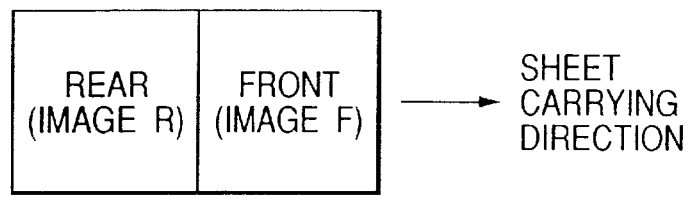
FIGS. 15A and 15B are views for explaining a flow of sheets from the inserter and the printer unit to a holding guide within the finisher.
Figure 15B:
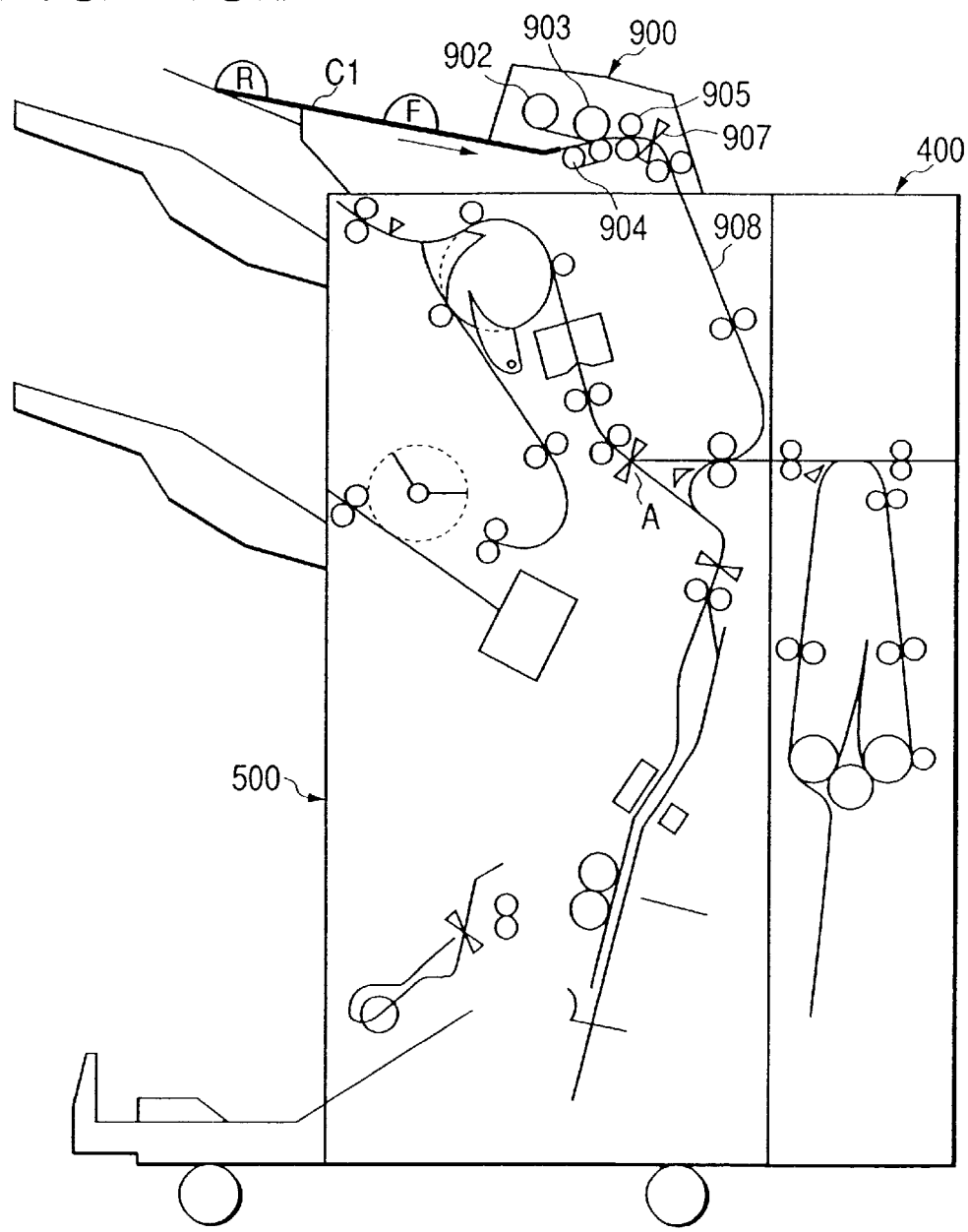

When a sheet C1 is inserted as the cover in the sheets on which the images were respectively formed and the obtained sheets are subjected to the bookbinding processing, as shown in FIG. 15B, the sheet C1 is set on the tray 901 of the inserter 900 by the user. As shown in FIG. 15A, the face on which images R and F were formed is turned faceup, the sheet is set on the tray 901, and the sheet is fed in the state that the image F leads.

Namely, the sheet C1 is set in the erect state and in the faceup state from the user's viewpoint, and the sheet setting state (i.e., the sheet stacking direction for the tray 901) is identical with the original setting state (i.e., the original stacking direction for the original tray 1001) in the original feeding unit 100. Therefore, it is possible to increase the operability when the sheet is set to the inserter 900.

Figure 16:
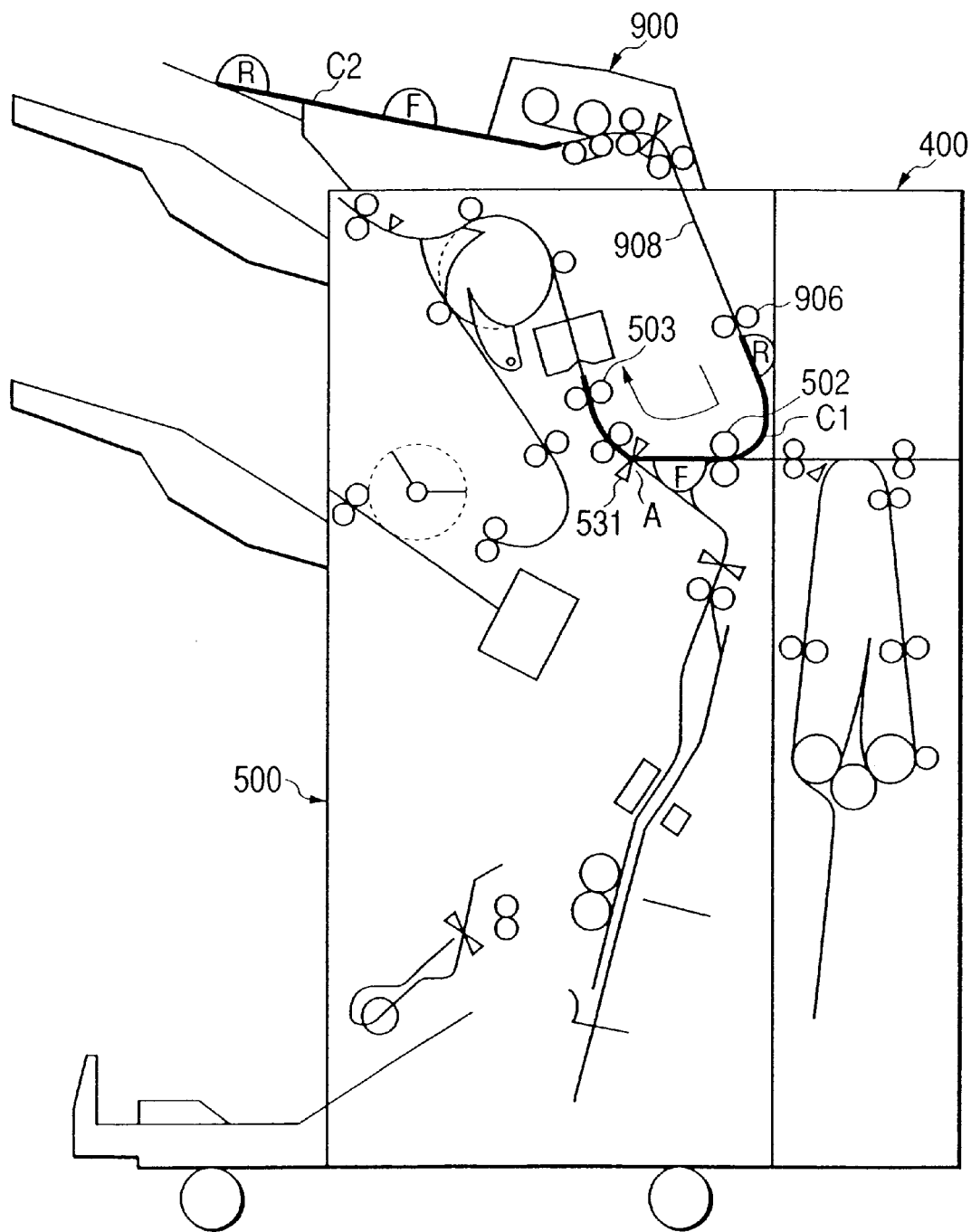
FIG. 16 is a view for explaining the flow of the sheets from the inserter and the printer unit to the holding guide within the finisher.

If the user selects the "bookbinding" key and the "inserter" key on the display panel of the operation unit 1, sets the sheaf composed of the sheet C1 on the tray 901, and depresses the not-shown start key on the operation unit 1, then, as shown in FIG. 16, the feeding of the uppermost sheet C1 of the sheaf starts. At this time, the change flapper 551 is changed to the side of the finisher path 552. The sheet C1 is guided to the finisher path 552 from the carrying path 908 through the inlet roller 502. If the leading edge of the sheet C1 is detected by the inlet sensor 531, the feeding of the sheet (a sheet P1 shown in FIG. 17) from the printer unit 300 starts.

Figure 17:
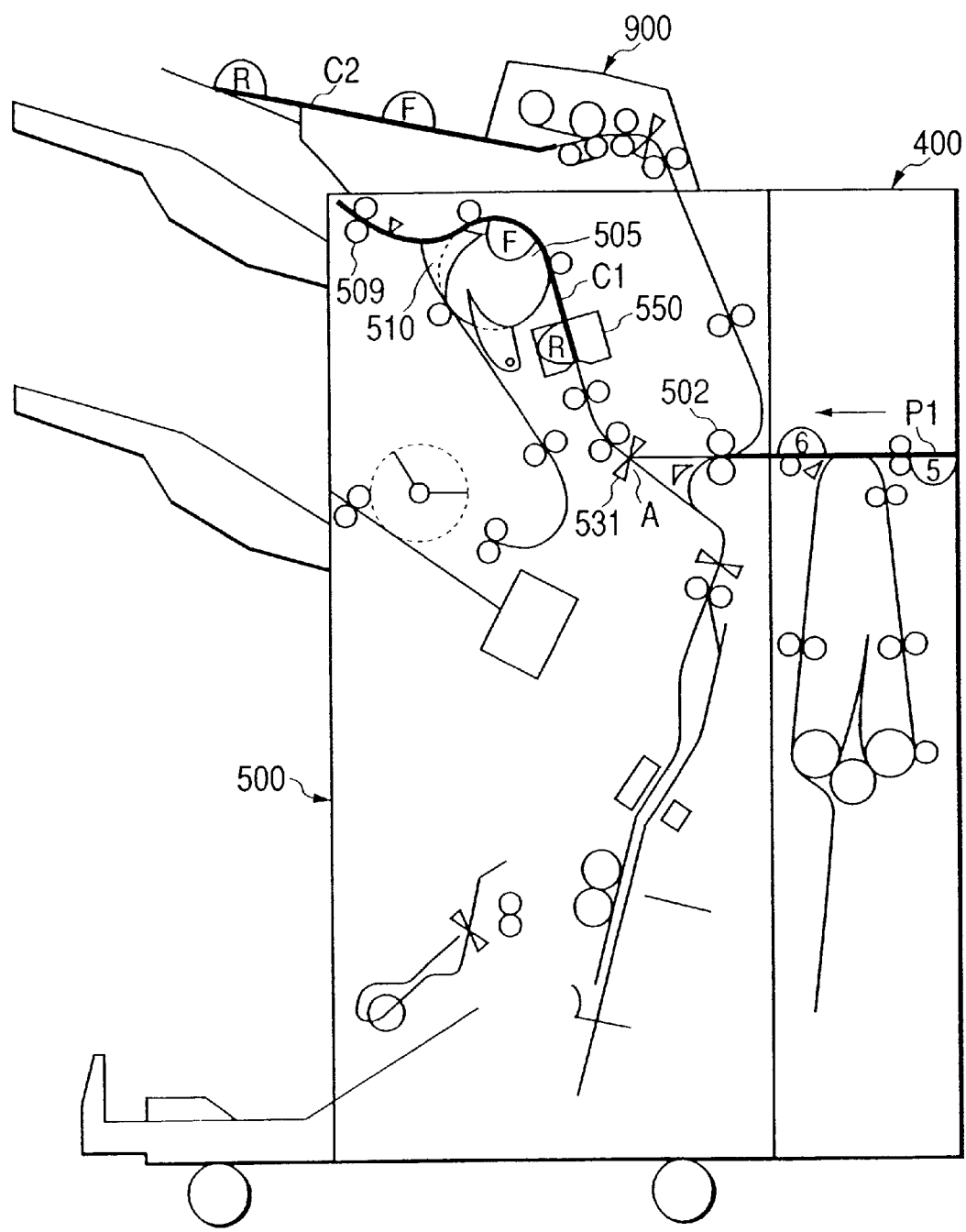
FIG. 17 is a view for explaining the flow of the sheets from the inserter and the printer unit to the holding guide within the finisher.

Next, as shown in FIG. 17, the change flapper 510 has been changed to the side of the nonsort path 521. Thus, the sheet C1 is guided to the side of the nonsort path 521 through the buffer roller 505, and the sheet P1 carried from the printer unit 300 is guided into the finisher 500.

If the sheet C1 is guided to the side of the nonsort path 521 and its trailing edge is carried until it passes the inlet sensor 531, as shown in FIG. 17, the carrying of the sheet C1 is once stopped. The position at which the sheet C1 is stopped is the position which is not influenced at least by the driving from the inlet roller 502.

Figure 18:
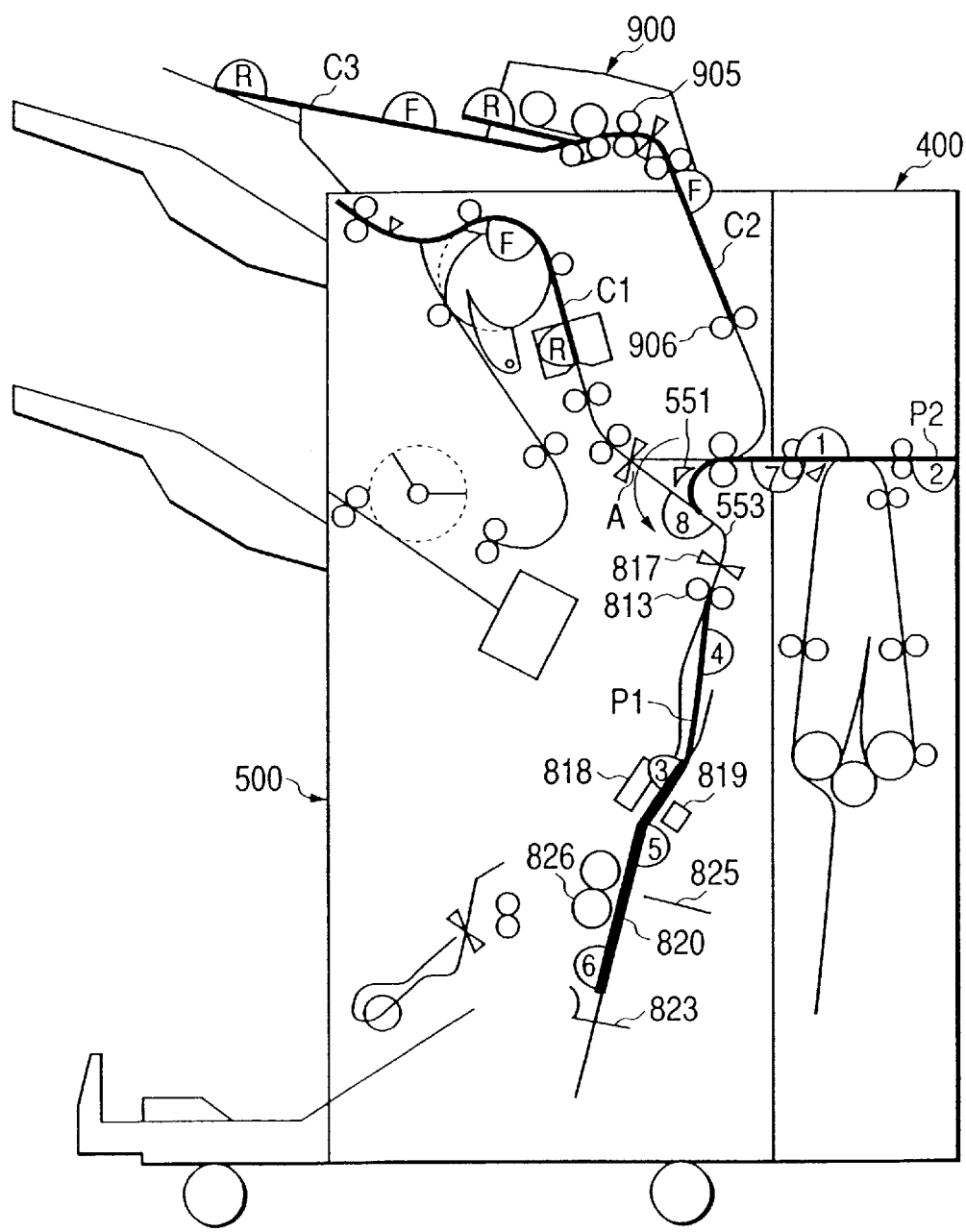
FIG. 18 is a view for explaining the flow of the sheets from the inserter and the printer unit to the holding guide within the finisher.

On the other hand, the sheet P1 from the printer unit 300 has been guided into the finisher 500. Thus, as shown in FIG. 18, in the state that the carrying of the sheet C1 was stopped, the sheet P1 is guided to the first bookbinding path 553 by the change flapper 551 and held in the holding guide 820. Subsequent to the sheet P1, a sheet P2 is guided to the first bookbinding path 553.

In the present embodiment, the case where the three sheets composed of the sheet C1 from the inserter 900 and the two sheets P1 and P2 from the printer unit 300 are subjected to the bookbinding processing as one copy was explained by way of example. On the other hand, when the second copy is output, at this time the sheet C2 following the sheet C1 is separated from the sheaf on the tray 901 of the inserter 900, and the separated sheet C2 is carried up to the immediate-front position of the carrying roller 906 and on standby at this position until the sheets P1, P2 and C1 are all held in the holding guide 820.

According as the sheets P1 and P2 are held in the holding guide 820, the carrying of the sheet C1 restarts. As shown in detail in FIG. 19, the sheet C1 is reversed and fed to the side of the holding tray 820, and then guided into the holding guide 820 through the branch point A and the second bookbinding path 554. It should be noted that the sheets P1 and P2 are held in the holding guide 820 in the state shown in FIG. 14D. Thus, at the time when all the sheets of one job discharged from the body of the image formation apparatus are held in the holding guide 820, the carrying of the sheet from the inserter 900 restarts.

Figure 20:
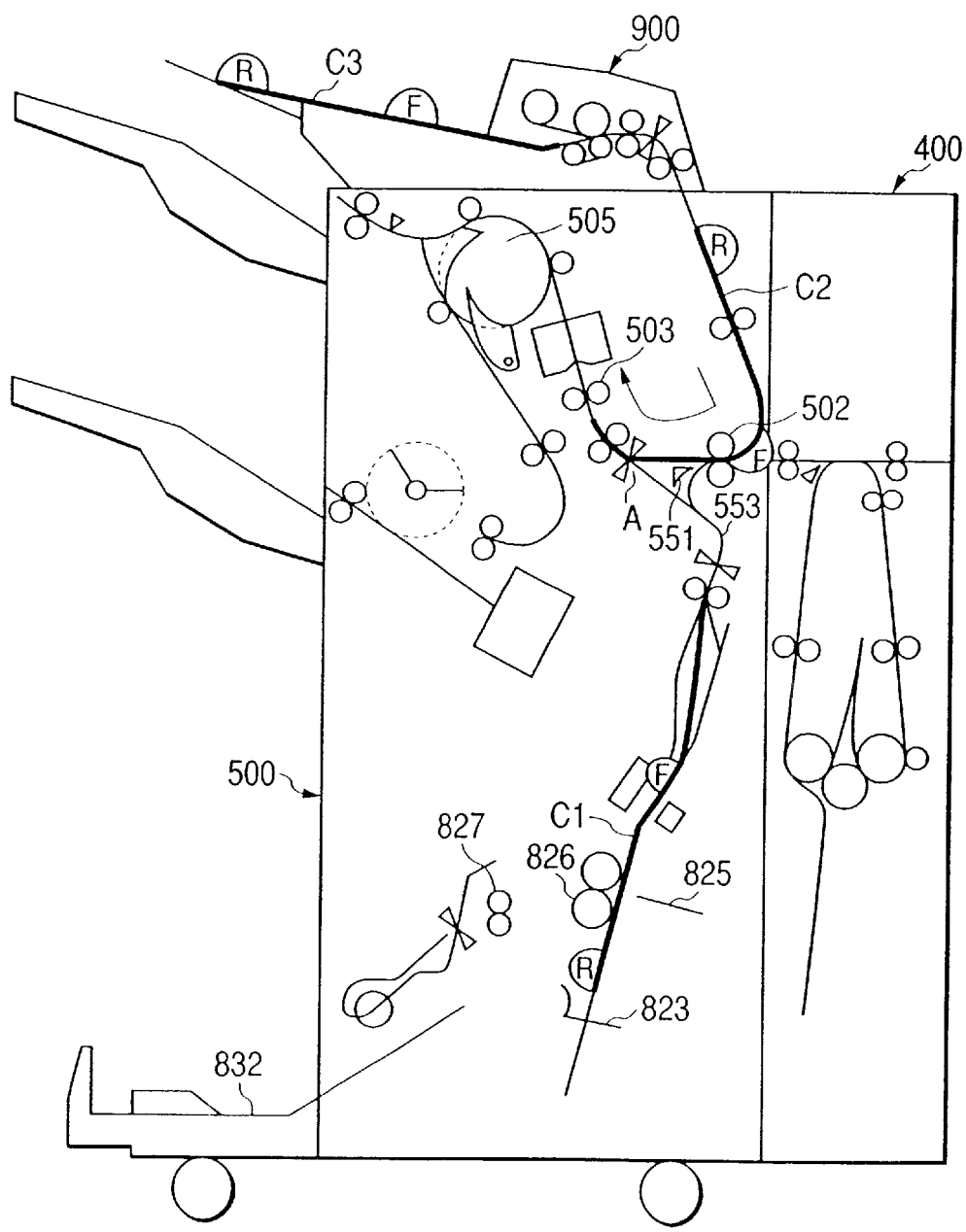
FIG. 20 is a view for explaining the flow of the sheets from the inserter and the printer unit to the holding guide within the finisher.

At this time, since the sheet C1 is reversed and fed, as shown in FIG. 20, the sheet C1 is fed in the state that the image R leads, and stacked or laid on the sheaf of the sheets P1 and P2 already held in the holding guide 820.

When the second copy is output, the carrying of the sheet C2 following the sheet C1 restarts such that the sheet C2 is guided to the side of the buffer roller 505, according as the sheet C1 is held in the holding guide 820. Further, for example, if the sheet C2 is an inappropriate sheet because its size is different from the predetermined size, as shown in FIG. 21, the sheet C2 is discharged onto the sample tray 701 as it is. In this case, in the state shown in FIG. 18, the carrying of the sheet C2 is not stopped, and the sheet C2 is discharged onto the sample tray 701 through the buffer roller 505 as it is.

After the sheet C1 is held in the holding guide 820, as shown in FIG. 22A, the extrusion member 825 is extruded toward the sheaf of the sheets C1, P1 and P2, whereby the sheaf is protruded toward the folding roller 826. Thus, the sheaf is folded along the central position (i.e., the image boundary on the image-formed face) by the folding roller 826, and discharged onto the sheet discharge tray 832.

If the finisher 500 is structured such that the extrusion member 825 is extruded from the inside of the finisher 550 toward the outside thereof (i.e., the side of the sheet discharge direction), the finisher 500 can be made compact in size as compared with the structure which holds the sheaf toward the inside of the apparatus, whereby it is possible to prevent that the structure of the apparatus becomes complicated.

In the sheaf of the sheets which was folded as above, as shown in FIG. 22B, the image F of the sheet C1 is formed on the cover page, and the image R of the sheet C1 is formed on the final page. Further, since the images of the sheets P1 and P2 are disposed in the page order, the directions of the images on the sheets C1, P1 and P2 are conformed to others.

Thus, when the bookbinding processing is performed to the sheaf of the plural sheets, the sheet feeding from the inserter 900 and the sheet carrying from the printer unit 300 are controlled. When the mode using the inserter 900 is set and the sheaf is folded in the bookbinding mode, the images (F and R in this case) of the sheet (C1 in this case) from the inserter 900 are thus disposed or formed on the head page and the final page, respectively. Therefore, it is possible to obtain the output result in which the images of the plural sheets (P1 and P2 in this case) from the printer unit 300 are disposed in the page order, and the directions of these images are conformed to others.

In the state that the sheet C1 is held in the holding guide 820, the sheaf of the sheets C1, P1 and P2 can be bound in its center part by the stapler 818. In this case, as shown in FIG. 22B, the binding position is located at the left end part of the book-bound sheaf of the sheets.

Next, the processing (i.e., control procedures) concerning the driving control of the finisher 500 will be explained with reference to FIGS. 23, 24, 25, 26, 27, 28, 29 and 30. The control procedures are performed by the CPU circuit unit 510 in the finisher control unit 501 in accordance with instructions from the CPU circuit unit 150 on the side of the body of the image formation apparatus. It should be noted that programs for these control procedures have been stored in the ROM 512.

Figure 23:
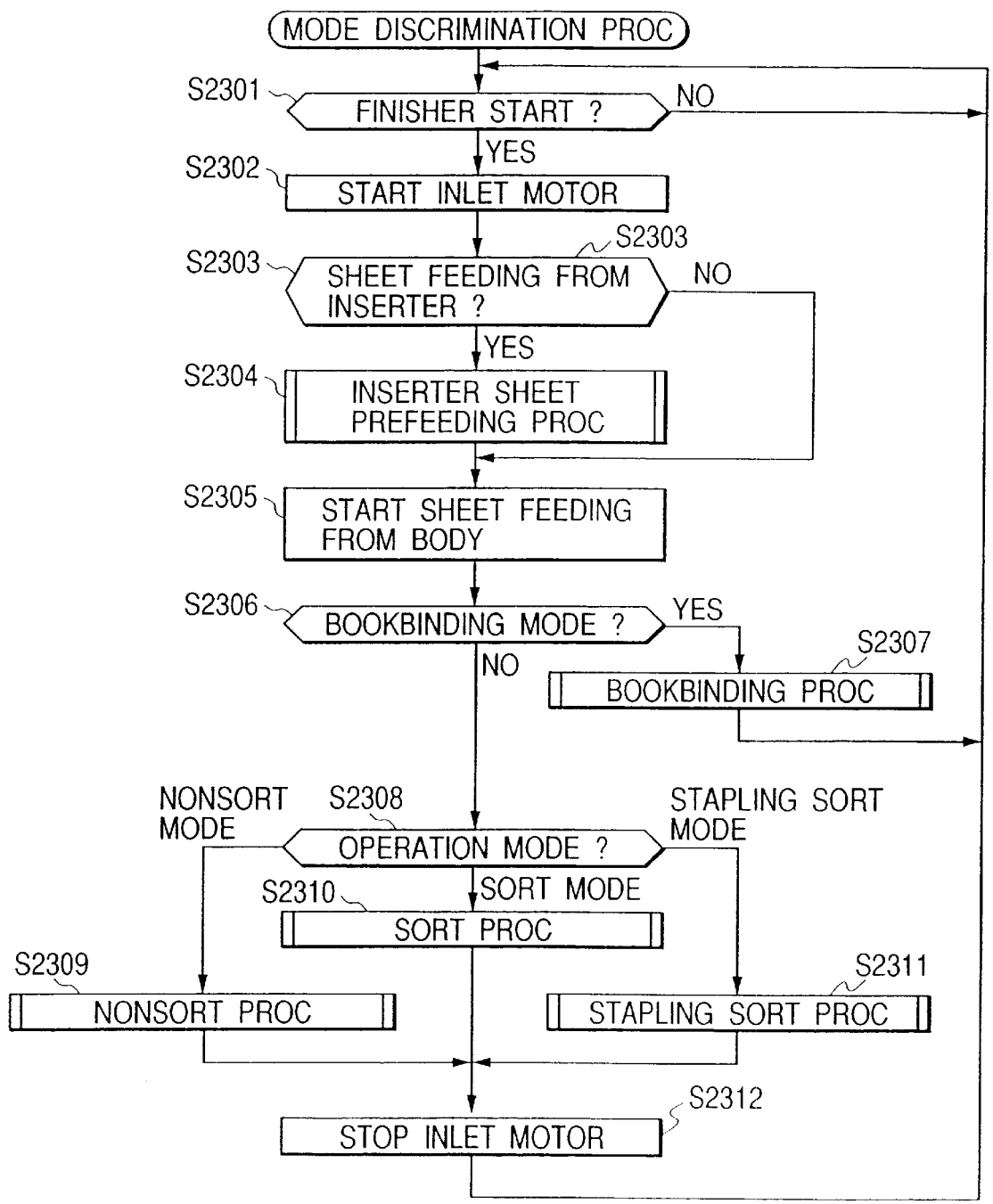
FIG. 23 is a flow chart showing operation mode discrimination processing.

FIG. 23 is the flow chart showing operation mode discrimination processing for the finisher 500. The operation mode discrimination processing is performed by the CPU circuit unit 510 in the finisher control unit 501 in accordance with the instruction from the CPU circuit unit 150.

First, it is judged whether or not a finisher start signal to instruct the finisher 500 to start the operation is input to the finisher control unit 501 (step S2301). The processing in the step S2301 is repeated until the start key for instructing start of the copying is depressed on the control unit 1 by the user and thus the finisher start signal is input from the CPU circuit 150 to the finisher control unit 501.

If judged in the step S2301 that the finisher start signal is input to the finisher control unit 501, driving of the inlet motor M1 starts (step S2302). Next, it is judged whether or not there is a sheet feeding request for the inserter 900 on the basis of the data from the communication IC 514 (step S2303). The sheet feeding request command to the inserter 900 is transferred to the finisher control unit 501, if the "inserter" key is selected by the user on the setting screen displayed on the display panel of the control unit 1 (FIG. 7B).

If judged in the step S2303 that there is the sheet feeding request for the inserter 900, inserter sheet prefeeding processing is performed (step S2304). The inserter sheet prefeeding processing in the step S2304 will be later explained in detail with reference to FIG. 24.

If judged in the step S2303 that there is no sheet feeding request for the inserter 900, of if the inserter sheet prefeeding processing ends in the step S2304, a sheet feeding signal (i.e., the signal to urge permission of the image formation operation) is output from the CPU circuit unit 510 of the finisher 500 to the CPU circuit unit 150 of the body of the image formation apparatus (i.e., the copying machine 1000) through the communication IC 514 (step S2305). The CPU circuit unit 150 which received the sheet feeding signal starts the image formation processing.

Next, based on postprocessing mode data received from the CPU circuit unit 150 through the communication IC 514, it is judged whether or not the operation mode set by the operation unit 1 is the bookbinding mode (step S2306). It should be noted that the operation mode is set on the operation mode setting screen displayed on the display panel of the control unit 1 (FIG. 7A) by the user.

If judged in the step S2306 that the set operation mode is the bookbinding mode, the bookbinding processing is performed (step S2307). The bookbinding processing in the step S2307 will be later explained in detail with reference to FIG. 28. If the bookbinding processing in the step S2307 ends, the flow returns to the step S2301.

If judged in the step S2306 that the set operation mode is not the bookbinding mode, then it is judged whether or not the set operation mode is any of the nonsort mode, the sort mode and the stapling sort mode (step S2308).

If judged in the step S2308 that the set operation mode is the nonsort mode, then the nonsort processing is performed (step S2309). The nonsort processing in the step S2309 will be later explained in detail with reference to FIG. 25.

If judged in the step S2308 that the set operation mode is the sort mode, then the sort processing is performed (step S2310). The sort processing in the step S2310 will be later explained in detail with reference to FIG. 26.

If judged in the step S2308 that the set operation mode is the stapling sort mode, then stapling sort processing is performed (step S2311). The stapling sort processing in the step S2311 will be later explained in detail with reference to FIG. 27.

If the nonsort processing ends in the step S2309, if the sort processing ends in the step S2310, or if the stapling sort processing ends in the step 2311, the driving of the inlet motor M1 is stopped (step S2312), and the flow returns to the step S2301 to wait for the input of the finisher start signal.

When the processing in any of the steps S2307, S2309, S2310 and S2311 is performed, if it is judged in the step S2303 that there is the sheet feeding request for the inserter 900, the inserter sheet prefeeding processing in the step S2304 is primarily performed.

Figure 24:
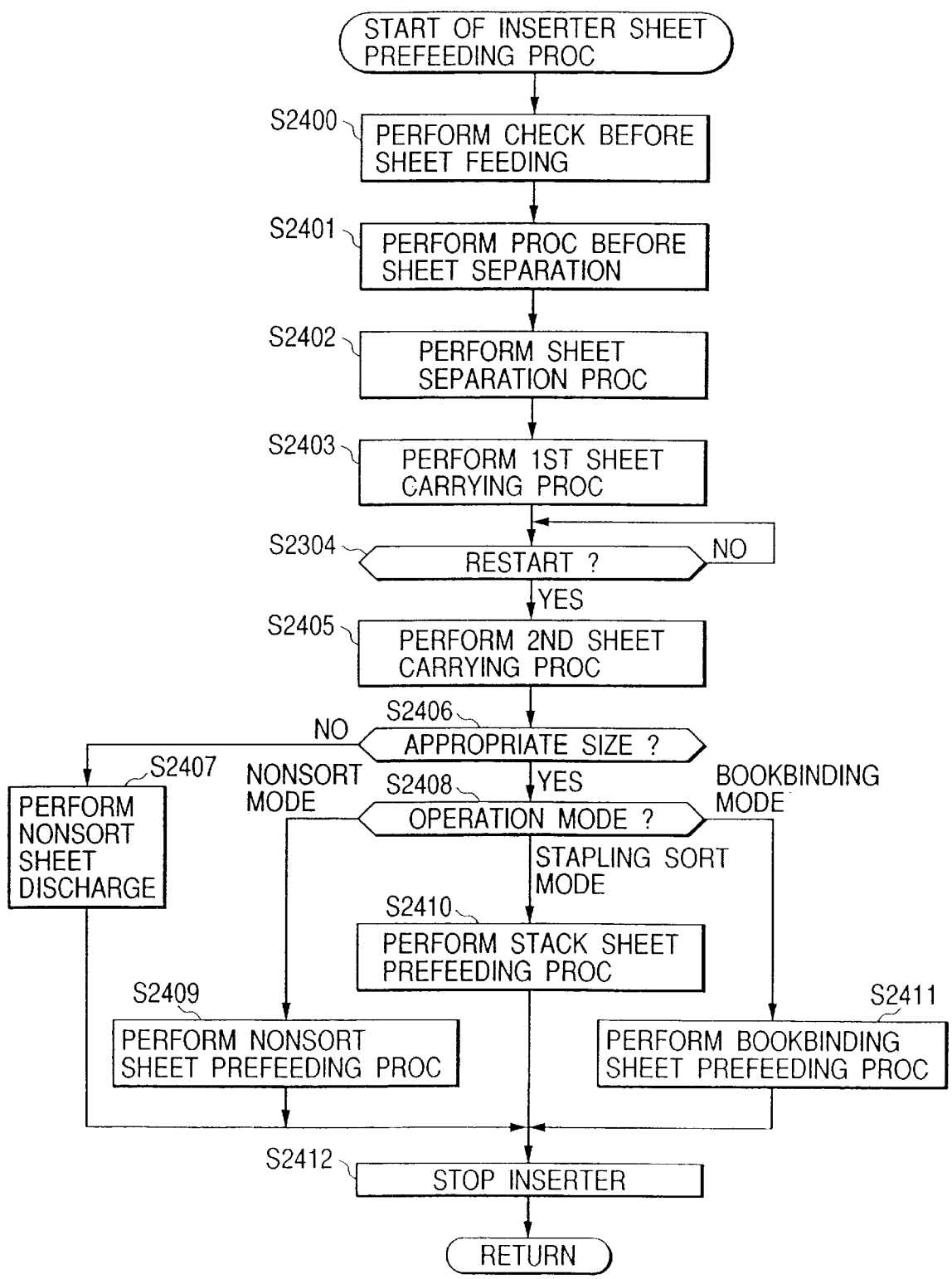
FIG. 24 is a flow chart showing inserter sheet prefeeding processing.

Next, the inserter sheet prefeeding processing in the step S2304 will be explained in detail with reference to FIG. 24. FIG. 24 is the flow chart for explaining in detail the inserter sheet prefeeding processing in the step S2304 of FIG. 23. The inserter sheet prefeeding processing which is performed by the CPU circuit unit 510 in the finisher control unit 501 is the processing which is performed in the step S2303 of FIG. 23 when it is judged that there is the sheet feeding request for the inserter 900.

In the inserter sheet prefeeding processing, a check is first performed before the sheet feeding (step S2400). In the step S2400, it is confirmed whether or not the sheet exists on the tray 901 of the inserter 900, and it is confirmed whether or not information such as sheet designation data or the like is transferred from the operation unit 1. Then an image formation inhibition signal is transferred to the CPU circuit unit 150 in the body of the copying machine 1000.

If the check before the sheet feeding is performed in the step S2400, and if it is confirmed that sheet feeding conditions to feed the sheet from the inserter 900 were established, then processing before the sheet separation is performed (step S2401). In the processing before the sheet separation, the shutter solenoid SL20 (FIG. 6) is turned on to open a sheet feeding shutter (not shown) of the inserter 900, and the pickup solenoid SL21 is turned on to lower the sheet feeding roller 902 such that the roller 902 lands on the sheet on the tray 901. Further, the clutch CL10 is turned on to transmit driving of the sheet feeding motor M20 to the sheet feeding roller 902.

If the processing in the step S2401 ends, the driving of the sheet feeding motor M20 is started after a predetermined time to rotate the separation roller 903, the separation belt 904 and the extraction roller 905 in the inserter 900 (step S2402). By the processing in the step S2402, the uppermost sheet (the sheet C1 in the present embodiment) of the sheaf (the sheaf C in the present embodiment) is separated and carried toward the carrying path 908.

Next, first carrying processing is performed (step S2403). In the processing of the step S2403, the carrying condition of the sheet C1 is observed by the sheet feeding sensor 907. If the leading edge of the sheet C1 is detected by the sheet feeding sensor 907, the clutch CL10 is turned off, and the number of clocks from a clock sensor disposed in the sheet feeding motor M20 is counted. Then if the counted value reaches a predetermined value N1, the driving of the sheet feeding motor M20 is stopped. The counting operation is performed until the trailing edge of the sheet C1 is detected by the sheet feeding sensor 907.

The processing in the step S2403 is to once stop the sheet carried from the inserter 900 through the extraction roller 905, at the immediate-front position of the carrying roller 906 (FIG. 18).

Next, it is judged whether or not a sheet refeeding request for refeeding the sheet C1 to the inserter 900 is received from the CPU circuit unit 150 on the side of the body of the copying machine 1000 (step S2404). The processing in the step S2404 is repeated until the sheet refeeding request for the sheet C1 is transferred from the CPU circuit unit 150 of the body of the copying machine 1000 to the CPU circuit unit 510 of the finisher control unit 501.

If the sheet refeeding request for the sheet C1 is received in the step S2404, second carrying processing is performed (step S2405). In the processing of the step S2405, the driving of the sheet feeding motor M20 is restarted to guide the sheet C1 stopped at the at the immediate-front position of the carrying roller 906 to the side of the inlet roller 502. Besides, the buffer motor M2 and the sheet discharge motor M3 are driven. If the trailing edge of the sheet C1 is detected by the sheet feeding sensor 907, the counting operation in the step S2403 ends, and the length of the sheet C1 in the carrying direction is calculated on the basis of the value obtained from the counting start to the counting end.

Next, it is judged whether or not the sheet C1 from the inserter 900 has an appropriate size, on the basis of the length of the sheet C1 in the carrying direction calculated in the step S2405 and designation size data obtained in the step S2400 (step S2406).

If judged in the step S2406 that the sheet C1 does not have the appropriate size, then the change flapper 510 is changed to the side of the nonsort path 521 to discharge the sheet C1 onto the sample tray 701 through the nonsort path 521. Besides, the CPU circuit unit 150 of the body of the copying machine 1000 is informed that the sheet having an inappropriate size was carried from the inserter 900 (step S2407). Next, inserter stop processing is performed (step S2412). After the processing in the step S2412 ends, the flow returns to the step S2305 of FIG. 23.

In the step S2412, the image formation inhibition signal transferred to the CPU circuit unit 150 in the step S2400 is released, and the driving of the sheet feeding motor M20 is stopped. Besides, it is detected by the sheet setting sensor 910 whether or not the sheet exists on the tray 901 of the inserter 900. If the sheet still exists on the tray 901, the shutter solenoid SL20 is kept on.

Conversely, if judged in the step S2406 that the sheet C1 from the inserter 900 has the appropriate size, then the operation mode set from the operation unit 1 is discriminated (step S2408).

If the operation mode discriminated in the step S2408 is the nonsort mode, nonsort sheet prefeeding processing is performed (step S2409). In the processing of the step S2409, the sheet C1 from the inserter 900 is discharged onto the sample tray 701. If the processing in the step S2408 ends, the flow advances to the step S2412.

If the operation mode discriminated in the step S2408 is the sort mode or the stapling sort mode, stack sheet prefeeding processing is performed (step S2410), and the flow advances to the step S2412.

In the processing of the step S2410, the change flappers 510 and 511 are changed to the side of the sort path 522 to guide the sheet C1 to the processing tray 630. It should be noted that the sheet C1 from the inserter 900 is stacked or laid on the processing tray 630 with its image-formed face facedown. The sheets are aligned on the processing tray 630. Besides, by performing the binding processing to the sheaf composed of the plural sheets stacked on the processing tray 630 with use of the stapler 601, it is possible to perform the bookbinding processing.

If the operation mode discriminated in the step S2408 is the bookbinding mode, bookbinding sheet prefeeding processing is performed (step S2411). In the processing of the step S2411, the change flapper 510 is changed to the side of the nonsort path 521, and the sheet C1 is carried to the position at which its leading edge reaches the nonsort path 521 (FIG. 17). If it is detected that the trailing edge of the sheet C1 passes the carrying roller 503, the driving of the buffer motor M2 and the driving of the sheet discharge motor M3 are stopped, whereby the sheet C1 is on standby within the nonsort path 521. In the present embodiment, the sheet C1 from the inserter 900 is once on standby within the nonsort path 521 in the bookbinding mode. In this case, it is assumed that the position where the sheet C1 from the inserter 900 is once stopped is the position where the trailing edge of the sheet C1 which passed the carrying roller 503 is not influenced by carrying power of the carrying roller 503. If the processing of the step S2411 ends, the flow advances to the step S2412.

The inserter sheet prefeeding processing shown in FIG. 24 is the processing which is to carry the sheet from the inserter 900 to the finisher 500 before the sheet is carried from the printer unit 300 to the finisher 500. Particularly, in the cover mode, it is possible by the processing of the step S2406 or the like to previously know a cover size. Thus, it is possible to minimize system down when the size of the sheet from the inserter 900 is not coincident with the size of the sheet from the printer unit 300.

Figure 25:
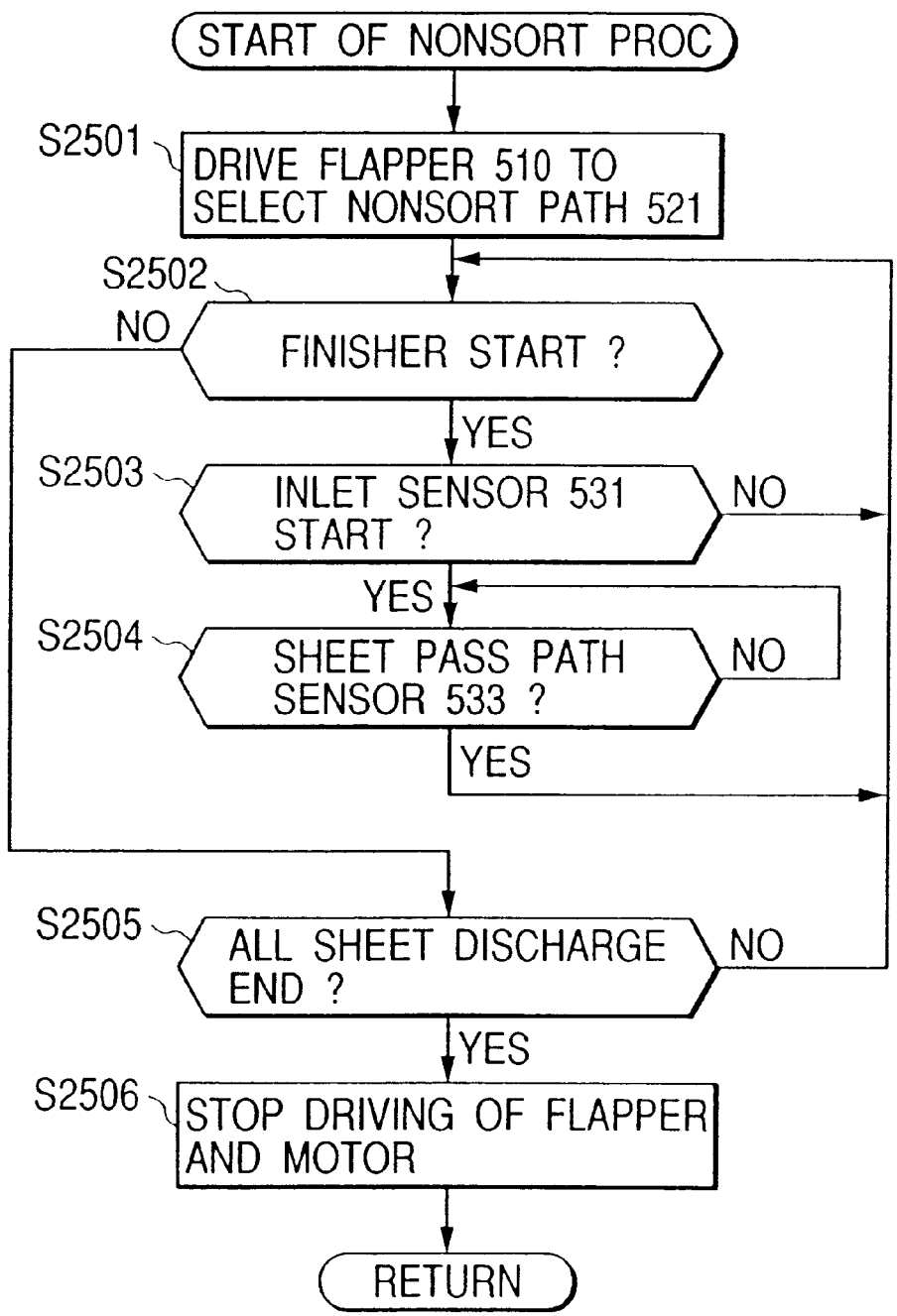
FIG. 25 is a flow chart showing nonsort processing.

Next, the nonsort processing in the step S2309 of FIG. 23 will be explained with reference to the flow chart of FIG. 25. The nonsort processing is performed when the operation mode discriminated in the step S2308 of FIG. 23 is the nonsort mode.

In the nonsort processing, the change flapper 510 is first driven to discharge the sheet onto the sample tray 701 (FIG. 5), whereby the change flapper 510 is changed to the side of the nonsort path 521 (step S2501). At this time, the change flapper 551 has been changed to the side of the finisher path 552.

Next, it is judged whether or not the finisher start signal for the finisher 500 is on (step S2502). The processing in the step S2502 is to confirm whether or not the sheet is carried from the printer unit 300 to the finisher 500. If judged in the step S2502 that the finisher start signal is on, then it is judged whether or not the inlet sensor 531 is on (step S2503).

The processing in the step S2503 is to detect whether or not the sheet was carried from the printer unit 300 into the finisher 500. If the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2503 that the inlet sensor 531 is not on, the flow returns to the step S2502. Conversely, if judged in the step S2503 that the inlet sensor 531 is on, it is considered that the leading edge of the sheet carried into the finisher 500 reaches the inlet sensor 531. Thus, the buffer motor M2 and the sheet discharge motor M3 are started, and the flow advances to a step S2504 to wait until the sheet passes the inlet sensor 531. If the inlet sensor 531 becomes off, it is considered that the sheet passed the sensor 531, and the flow returns to the sep S2502.

If judged in the step S2502 that the finisher start signal is off, then it is judged whether or not all the sheets to be discharged from the printer unit 300 are discharged onto the sample tray 701 (step S2505). If judged in the step S2505 that all the sheets from the printer unit 300 are not discharged onto the sample tray 701, the flow returns to the step S2502.

Conversely, if judged in the step S2505 that all the sheets discharged from the printer unit 300 are discharged onto the sample tray 701, the driving of the change flapper 510 is stopped, and the driving of the buffer motor M2 and the driving of the sheet discharge motor M3 are also stopped (step S2506). Then the processing ends, and the flow returns to the step S2312 in FIG. 23.

Figure 26:
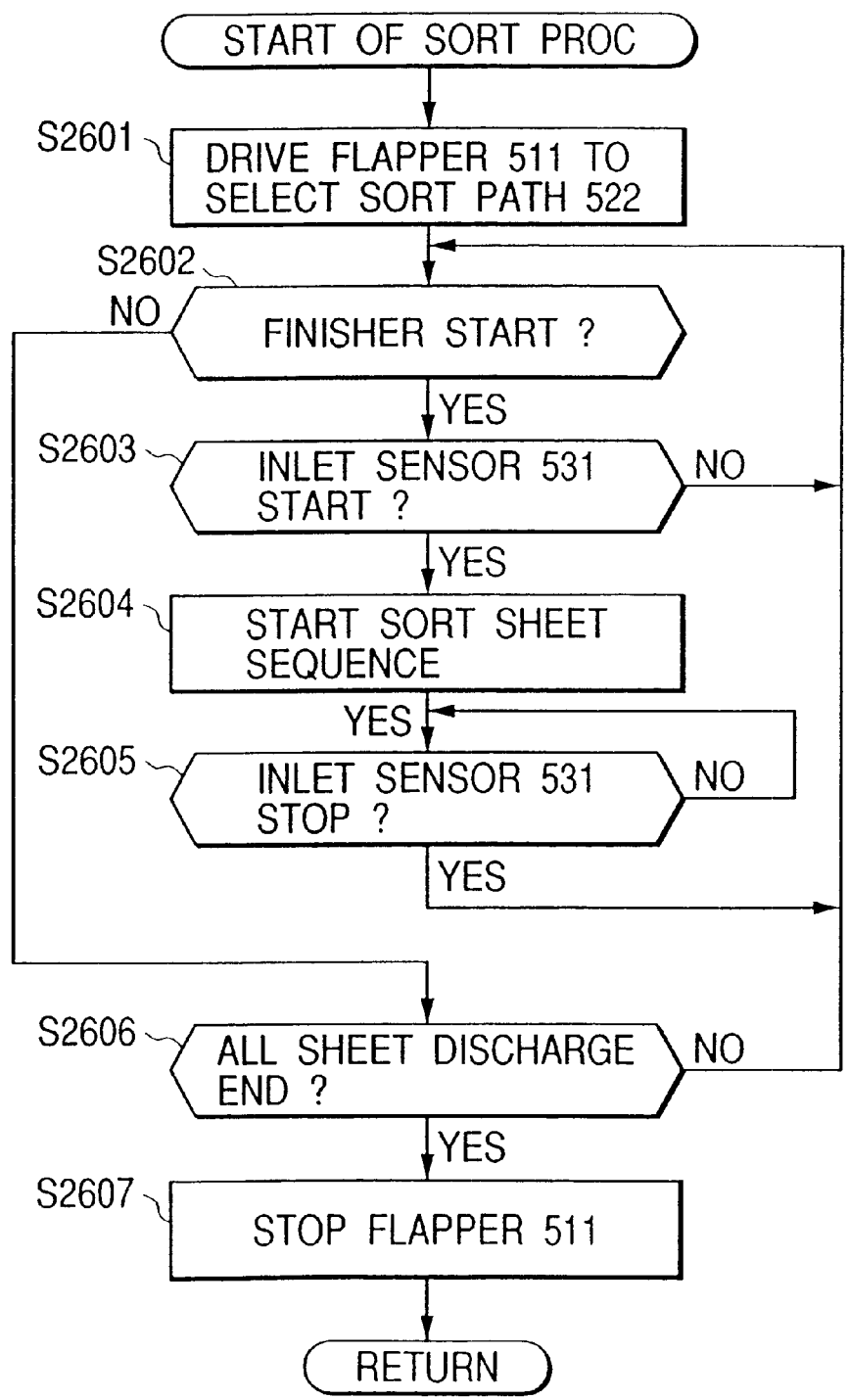
FIG. 26 is a flow chart showing sort processing.

Next, the sort processing in the step S2310 of FIG. 23 will be explained with reference to the flow chart shown in FIG. 26. The sort processing is performed when the operation mode discriminated in the step S2308 of FIG. 23 is the sort mode.

In the sort processing, the change flapper 511 is first driven to carry the sheet onto the processing tray 630 (FIG. 5), whereby the change flapper 511 is changed to the side of the sort path 522 (step S2601). At this time, the change flapper 551 has been changed to the side of the finisher path 552.

Next, it is judged whether or not the finisher start signal for the finisher 500 is on (step S2602). The processing in the step S2602 is to confirm whether or not the sheet is carried from the printer unit 300 to the finisher 500. If judged in the step S2602 that the finisher start signal is on, then it is judged whether or not the inlet sensor 531 is on (step S2603).

The processing in the step S2603 is to detect whether or not the sheet was carried from the printer unit 300 into the finisher 500. If the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2603 that the inlet sensor 531 is not on, the flow returns to the step S2602. Conversely, if judged in the step S2603 that the inlet sensor 531 is on, a sort sheet sequence is started (step S2604).

In the sort sheet sequence of the step S2604, multitasking processing is performed by the CPU of the CPU circuit unit 150 to control the start and stop of the buffer motor M2 and the acceleration and deceleration of the sheet discharge motor M3. By such the processing, the distance between the sheet to be carried to the processing tray 630 and the subsequent sheet is adjusted, and the sheets are subjected to aligning processing by an aligning member (not shown) disposed on the processing tray 630 every time the sheet is stacked or laid on the tray 630. If the sheet stacking ends on the processing tray 630, then sheaf discharge processing to the stacking tray 700 is performed.

After the processing in the step S2604, the flow advances to a step S2605 to wait until the inlet sensor 531 becomes off. If the inlet sensor 531 becomes off, the flow returns to the step S2602.

If judged in the step S2602 that the finisher start signal is off, then it is judged whether or not all the sheaves to be discharged in the step S2604 are discharged onto the stacking tray 700 (step S2606).

If judged in the step S2606 that all the sheaves are not discharged onto the stacking tray 700, the flow returns to the step S2602. Conversely, if judged that all the sheaves are discharged onto the stacking tray 700, the driving of the change flapper 511 is stopped (step S2607). Then the processing ends, and the flow returns to the step S2312 in FIG. 23.

Figure 27:
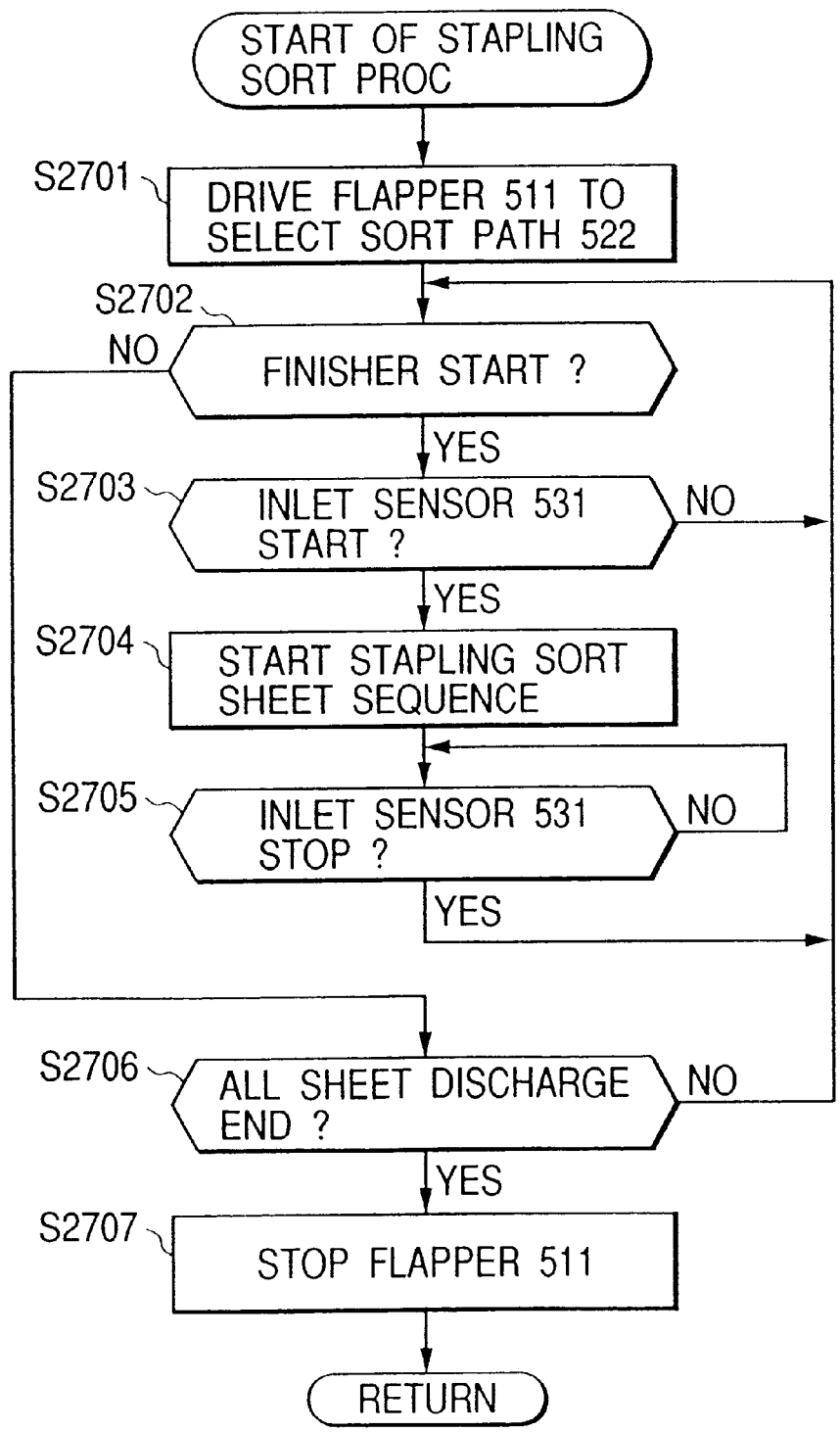
FIG. 27 is a flow chart showing stapling sort processing.

Next, the stapling sort processing in the step S2311 of FIG. 23 will be explained with reference to the flow chart shown in FIG. 27. The stapling sort processing is performed when the operation mode discriminated in the step S2308 of FIG. 23 is the stapling sort mode.

In the stapling sort processing, the change flapper 511 is first driven to carry the sheet onto the processing tray 630 (FIG. 5), whereby the change flapper 511 is changed to the side of the sort path 522 (step S2701). At this time, the change flapper 551 has been changed to the side of the finisher path 552.

Next, it is judged whether or not the finisher start signal for the finisher 500 is on (step S2702). The processing in the step S2702 is to confirm whether or not the sheet is carried from the printer unit 300 to the finisher 500. If judged in the step S2702 that the finisher start signal is on, then it is judged whether or not the inlet sensor 531 is on (step S2703).

The processing in the step S2703 is to detect whether or not the sheet was carried from the printer unit 300 into the finisher 500. If the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2703 that the inlet sensor 531 is not on, the flow returns to the step S2702. Conversely, if judged in the step S2703 that the inlet sensor 531 is on, a stapling sort sheet sequence is started (step S2704).

In the stapling sort sheet sequence of the step S2704, multitasking processing is performed by the CPU of the CPU circuit unit 150 to control the start and stop of the buffer motor M2 and the acceleration and deceleration of the sheet discharge motor M3. By such the processing, the distance between the sheet to be carried to the processing tray 630 and the subsequent sheet is adjusted, and the sheets are subjected to the aligning processing by the aligning member (not shown) disposed on the processing tray 630 every time the sheet is stacked or laid on the tray 630. If the sheet stacking ends on the processing tray 630, then the stapling processing to the sheaf of the sheets is performed by the stapler 601, and the sheaf subjected to the stapling processing is discharged onto the stacking tray 700.

After the processing in the step S2704, the flow advances to a step S2705 to wait until the inlet sensor 531 becomes off. If the inlet sensor 531 becomes off, the flow returns to the step S2702.

If judged in the step S2702 that the finisher start signal is off, then it is judged whether or not all the sheaves to be discharged in the step S2704 are discharged onto the stacking tray 700 (step S2706).

If judged in the step S2706 that all the sheaves are not discharged onto the stacking tray 700, the flow returns to the step S2702. Conversely, if judged that all the sheaves are discharged onto the stacking tray 700, the driving of the change flapper 511 is stopped (step S2707). Then the processing ends, and the flow returns to the step S2312 in FIG. 23.

Figure 28:
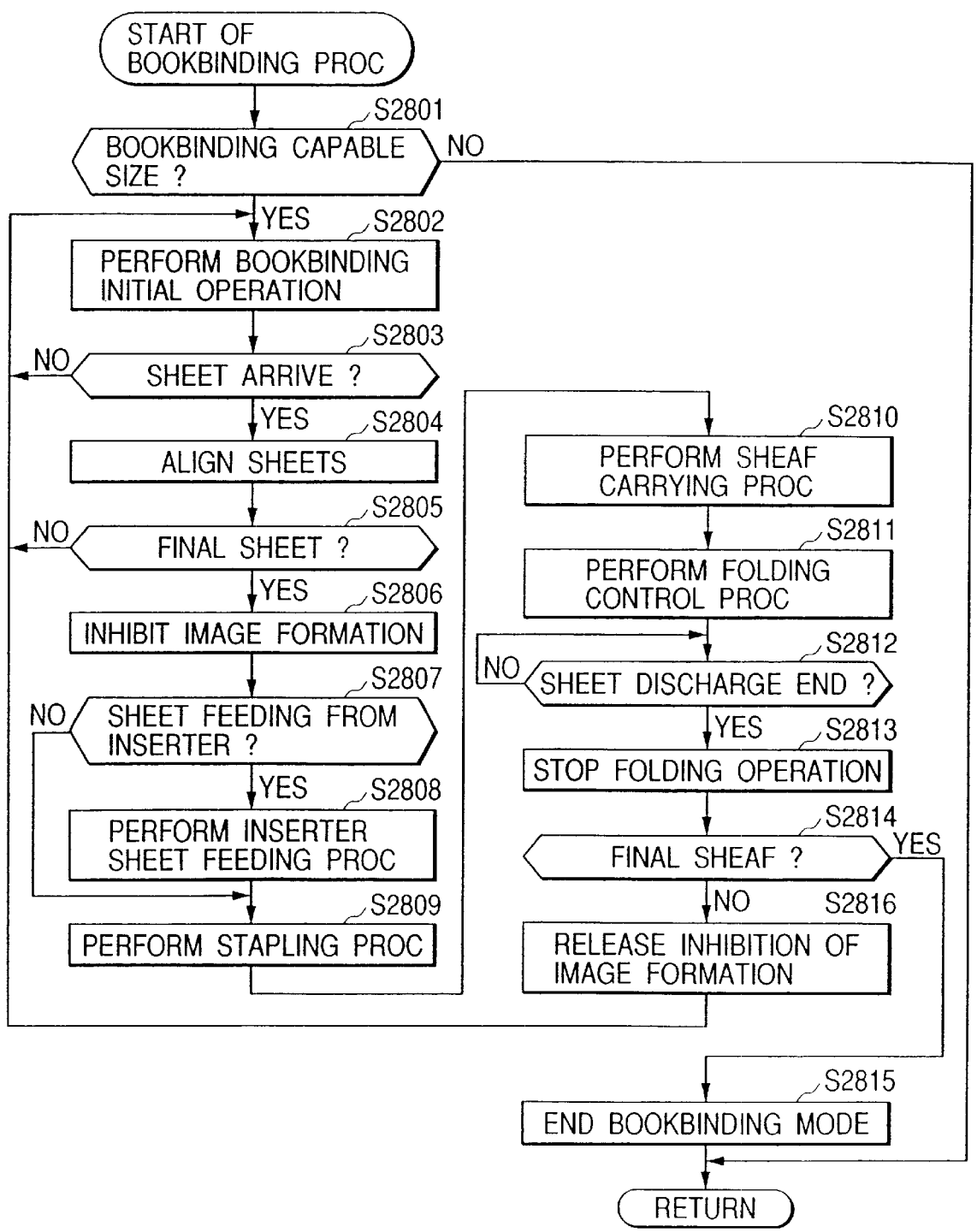
FIG. 28 is a flow chart showing the bookbinding processing.

Next, the bookbinding processing in the step S2307 of FIG. 23 will be explained with reference to the flow chart shown in FIG. 28. The bookbinding processing is performed when the operation mode judged in the step S2306 of FIG. 23 is the bookbinding mode.

In the bookbinding processing, it is judged based on size information whether or not the size of the sheet carried from the printer unit 300 to the finisher 500 is suitable for the bookbinding (step S2801). If judged in the step S2801 that the sheet size is not suitable for the bookbinding, the processing ends, and the flow returns to the step S2301 of FIG. 23.

Conversely, if judged in the step S2801 that the sheet size is suitable for the bookbinding, a bookbinding initial operation is performed (step S2802). In the bookbinding initial operation of the step S2802, the carrying motor M10 is driven to rotate a bookbinding roller (i.e., the carrying roller 813), thereby setting a sheet carriable state. Besides, the change solenoid SL10 is driven to change the flapper 551 to the side of the first bookbinding path 553, such that the sheet from the printer unit 300 is guided to the holding guide 820. Further, a narrowing member (not shown) is positioned to have a width by which predetermined-quantity room is given to the width of the sheet. Further, the positioning motor M11 is rotated by the predetermined number of steps such that the distance between the sheet positioning member 823 and the stapling position of the stapler 818 becomes half of the length of the sheet carrying direction.

Next, in response to the signal from the bookbinding inlet sensor 817, it is judged whether or not the sheet from the printer unit 300 is carried into the holding guide 820 (step S2803). If judged that the sheet is not carried into the holding guide 820, the flow returns to the step S2802.

Conversely, if judged in the step S2803 that the sheet from the printer unit 300 is carried into the holding guide 820, the narrowing member (not shown) is driven after a predetermined time elapses, thereby aligning the sheets held in the holding guide 820 in the sheet width direction (step S2804).

Next, it is judged whether or not the sheet processed in the step S2804 is the final one of the plural sheets to be subjected to the bookbinding processing as one sheaf (step S2805). If the sheet in question is not the final sheet of one job, the flow returns to the step S2802. Conversely, if judged in the step S2805 that the sheet in question is the final sheet, the image formation inhibition signal is transferred to the CPU circuit unit 150 not to carry the sheet from the printer unit 300 to the finisher 500 (step S2806).

Next, it is judged whether or not the sheet feeding from the inserter 900 is designated by the user on the screen of the operation unit 1 of FIG. 7B (step S2807). If judged that the sheet feeding from the inserter 900 is designated, inserter sheet feeding processing is performed (step S2808). The inserter sheet feeding processing in the step S2808 will be explained later with reference to the flow chart shown in FIG. 29.

Conversely, if judged in the step S2807 that the sheet feeding from the inserter 900 is not designated, the stapling processing is performed to the sheaf of the sheets aligned in the holding guide 820, by using the stapler 818 (step S2809).

After the processing in the step S2809, sheaf carrying processing is performed (step S2810). In the sheaf carrying processing of the step S2810, the positioning motor M1 is driven to lower the sheet positioning member 823 and the carrying motor M10 is driven to rotate the carrying roller 813, so as to move the sheaf of the sheet by the distance between the stapling position of the stapler 818 and the nip position of the folding roller 826.

After the processing in the step S2810, folding control processing is performed (step S2811). In the folding control processing of the step S2811, the clutch CL1 and the folding motor M12 are driven to move the extrusion member 825 toward the folding roller 826 (in the direction indicated by the arrow of FIG. 22A).

By the folding control processing, the center of the sheaf of the sheets (i.e., the stapling position on the sheets) is guided to the nip point of the folding roller 826, and the sheaf is folded double by the folding roller 826. It should be noted that the extrusion member 825 can be reciprocated by a camshaft mechanism. Thus, if one reciprocation motion of the extrusion member 825 is detected by a sensor (not shown), the driving of the clutch CL1 is stopped.

After the processing of the step S2811, in response to the detection signal from the bookbinding sheet discharge sensor 830, it is judged whether or not the folded sheaf of the sheets is discharged to the sheet discharge tray 832 (step S2812). It should be noted that the bookbinding sheet discharge sensor 830 detects the trailing edge of the folded sheet. The processing in the step S2812 is repeated until it is confirmed that the sheaf of the sheets is discharged to the sheet discharge tray 832.

Conversely, if judged in the step S2812 that the sheaf of the sheets is discharged to the sheet discharge tray 832, then the driving of the folding motor M12 is stopped (step S2813). Next, it is judged whether or not the discharge sheaf of the sheets is the final sheaf to be subjected to the bookbinding processing (step S2814).

If judged in the step S2814 that the discharge sheaf is the final sheaf to be subjected to the bookbinding processing, then end processing of the bookbinding mode is performed (step S2815). In the end processing of the bookbinding mode of the step S2815, the narrowing member and the sheet positioning member 823 are moved respectively to predetermined standby positions. Besides, the change flapper 551 is changed to the side of the finisher path 552. Then the processing in the bookbinding mode ends. After the processing in the step S2815, the flow returns to the step S2301 in the flow chart of FIG. 23.

Conversely, if judged in the step S2814 that the discharged sheaf is not the final sheaf to be subjected to the bookbinding processing, then the image formation inhibition signal is released, and such a release of the image formation inhibition signal is informed to the CPU circuit unit 150 (step S2818). Then the flow returns to the step S2802.

Figure 29:
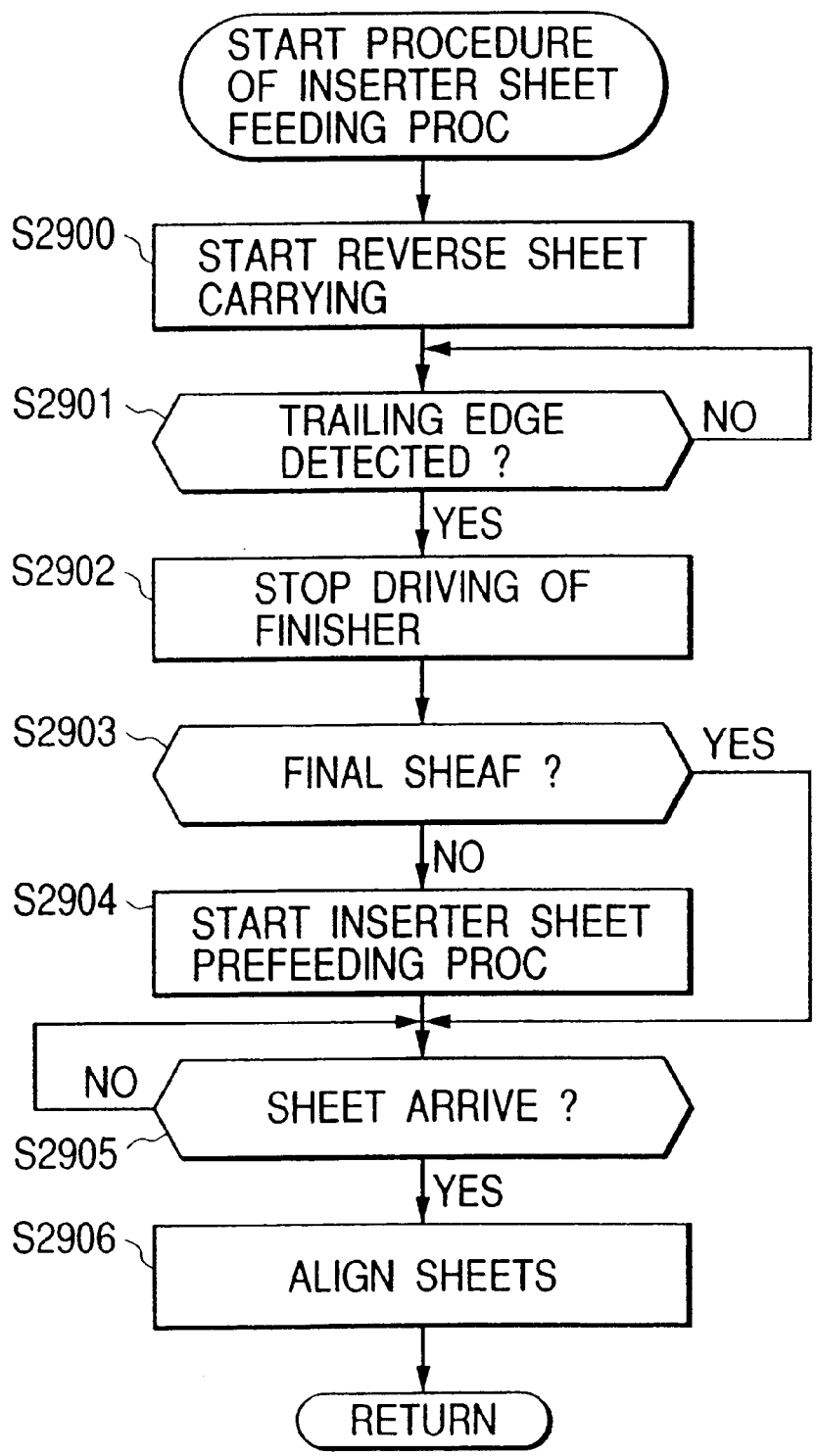
FIG. 29 is a flow chart showing inserter sheet feeding processing.

Next, the inserter sheet feeding processing in the step S2808 of FIG. 28 will be explained with reference to the flow chart of FIG. 29. The inserter sheet feeding processing is performed when it is judged in the step S2807 of FIG. 28 that the sheet feeding from the inserter 900 is designated, and is to guide the sheet from the inserter 900 to the holding guide 820.

In the present embodiment, before the inserter sheet feeding processing is performed, the inserter sheet prefeeding processing shown in FIG. 24 is performed. By the bookbinding sheet prefeeding processing of the step S2411 in the inserter sheet prefeeding processing of FIG. 24, the sheet C1 from the inserter 900 is on standby in the nonsort path 521 (FIG. 17).

Figure 19:
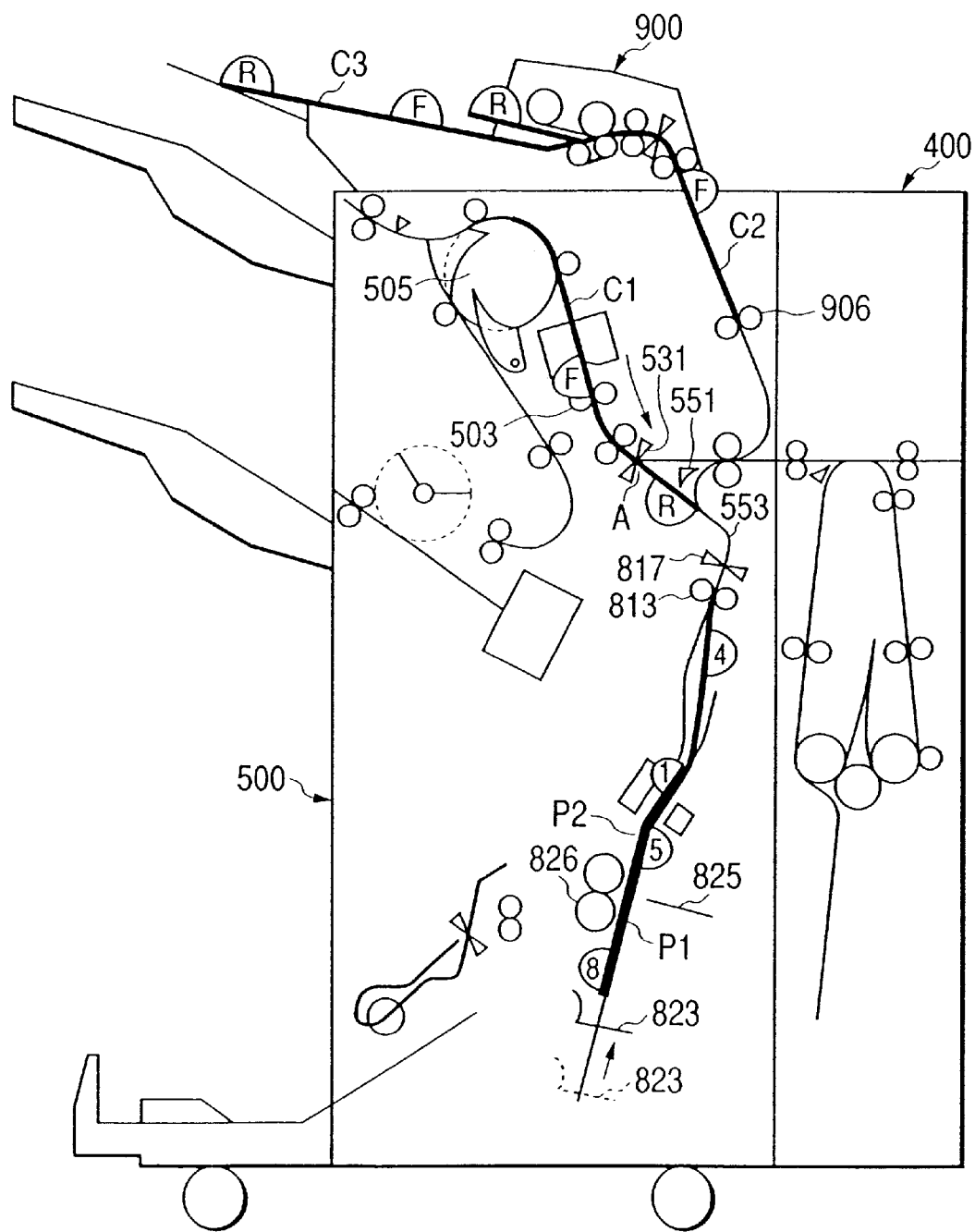
FIG. 19 is a view for explaining the flow of the sheets from the inserter and the printer unit to the holding guide within the finisher.

In the inserter sheet feeding processing, the sheet which is fed from the inserter 900 and on standby in the nonsort path 521 is first reversed and carried (step S2900). In the processing of the step S2900, the rotational direction of the inlet motor M1 is set to be opposite to the rotational direction of the buffer motor M2, and the driving of the motors M1 and M2 is started, such that the sheet C1 fed from the inserter 900 and on standby in the nonsort path 521 is guided to the second bookbinding path 554. At the same time, the driving of the carrying motor M10 is started. Thus, as shown in FIG. 19, the sheet C1 is guided into the second bookbinding path 554 through the carrying roller 503.

Next, it is judged whether or not the trailing edge of the sheet C1 from the inserter 900 which sheet C1 is carried from the side of the nonsort path 521 to the side of the second bookbinding path 554 is detected by the inlet sensor 531 (step S2901). The processing in the step S2901 is repeated until the trailing edge of the sheet C1 is detected by the inlet sensor 531.

If the trailing edge of the sheet C1 from the inserter 900 is detected by the inlet sensor 531 in the step S2901, finisher driving stop processing is performed (step S2902). In the finisher driving stop processing of the step S2902, the driving of the inlet motor M1 and the buffer motor M2 is stopped. Namely, the carrying of the sheet C1 from the inserter 900 is continued until the trailing edge of the sheet C1 is detected in the step S2901.

Next, it is confirmed whether or not the sheaf of the sheets currently processed is the final sheaf to be subjected to the bookbinding processing (step S2903). If judged that the currently processed sheaf is not the final sheaf, the command to start the above inserter sheet prefeeding processing is emitted (step S2904). If such the start command is emitted, the inserter sheet prefeeding processing is performed besides the above bookbinding processing.

Next, in response to the detection signal from the bookbinding inlet sensor 817, it is judged whether or not the sheet C1 from the inserter 900 is carried into the holding guide 820 (step S2905). The processing in the step S2905 is repeated until the sheet C1 from the inserter 900 is carried into the holding guide 820. the bookbinding inlet sensor 817 detects the trailing edge of the sheet. If judged in the step S2903 that the currently processed sheaf is the final sheaf to be subjected to the bookbinding processing, the flow advances to the step S2905.

If judged in the step S2905 that the sheet C1 from the inserter 900 is carried into the holding guide 820, the narrowing member (not shown) is driven after the predetermined time elapses, thereby aligning the sheets held in the holding guide 820 in the sheet width direction (step S2906). After the processing in the step S2906 ends, the flow advances to the step S2809.

In the present embodiment, the case where the image formation processing is performed in the original running reading mode when the inserter 900 is used was explained. However, it is possible to conform the direction of the image on the sheet from the inserter 900 with the direction of the image on the sheet discharged from the body of the image formation apparatus even in the case where the copying apparatus 1000 can perform the image formation in the original standing reading mode. The operation in this case will be explained with reference to FIG. 2C.

The direction of the output image in the original standing reading mode is ordinarily that as shown in the state (3) of FIG. 2A. Namely, the sheet on which the image obtained by rotating the original image on the original tray 1001 of the original feeding unit 100 by 180° is formed is output from the printer unit 300.

On the other hand, the image formation processing which is performed when the original standing reading mode is set and the cover mode is designated will be explained with reference to FIG. 2C.

A state (1) of FIG. 2C is the state of the original which is stacked or laid on the original tray 1001 of the original feeding unit 100. The original is first fed in the direction indicated by the arrow, reversed by the curved path, and then carried to the reading position on the platen glass 102.

A state (2) of FIG. 2C is the state of the original which is put on the platen glass 102. Like FIG. 2A, the reading scan is performed to the original image in the main scan direction Sy and the sub scan direction Sx by moving (i.e., scanning) the scanner unit 104 from the left to the right.

A state (3) of FIG. 2C represents the image data which is read by the image sensor 109. In this state, the image data is sequentially stored in the page memory 205 from the coordinates (0, 0) as the starting point. At the time when the original image reading ends, as shown in a state (4) of FIG. 2C, the data-stored order is inverted for each of the main and scan directions to convert the image data representing the read image into the image data representing the 180° rotated image. This operation is called 180° conversion processing.

The image data converted by the 180° conversion processing becomes identical with the data in the state (3) of FIG. 2B (i.e., the data after the mirror image correction processing). Finally, as shown in a state (6) of FIG. 2C, when the image is actually formed on the sheet, the output image identical with that in the state (4) of FIG. 2B can be obtained. Namely, even in the original standing reading mode, if such the mode is the mode in which the inserter is used, the image the direction of which is identical with the direction of the original image is formed on the sheet.

Next, such the image-formed sheet is reversed to turn its image-formed face facedown, and discharged from the body of the image formation apparatus (the state (6) of FIG. 2C). Even in this case, like the above, the binding position is located on the side of the trailing edge of the sheet (a state (7) of FIG. 2C). The operation which is performed when the sheet thus obtained and the sheet for the cover carried from the inserter 900 are mixedly stacked is the same as that in the original running reading mode. Thus, even in the original standing reading mode, it is possible to bind the sheet from the inserter and the image-formed sheet as one sheaf. As a result, it is possible to obtain the output result in which the page order and the image directions of the respective sheets are conformed to others and the binding position is located at the left of the sheet from the viewpoint of the image-formed face (a state (8) of FIG. 2C).

Figure 30:
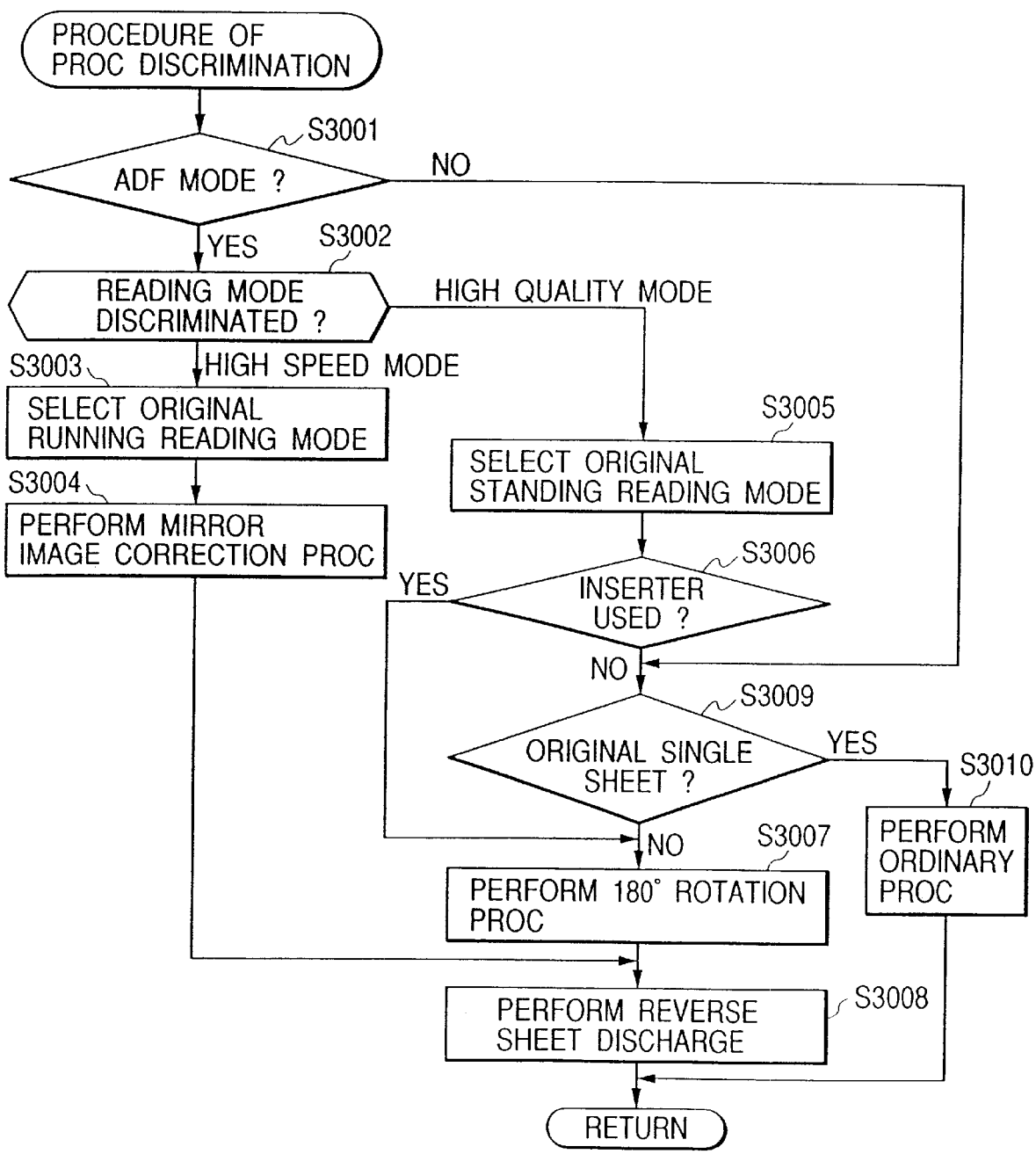
FIG. 30 is a flow chart showing the image formation processing in a case where the original can be read in either an original standing reading mode or an original running reading mode.

Next, in the case where the image formation processing can be performed by the copying machine 1000 in either the above original running reading mode or the original standing reading mode, processing discrimination which is to change the processing between the image formation processing and sheet reverse discharge control processing will be explained with reference to the flow chart shown in FIG. 30. It should be noted that the processing discrimination is performed by the CPU circuit unit 150 (or 510), and a program to perform the processing discrimination has been stored in the ROM 151 (or 512).

First, it is judged whether or not the mode (i.e., an ADF (automatic document feeder) mode) in which the original feeding unit 100 is used is set (step S3001). In this step, concretely, it is judged whether or not the start key of the operation unit 1 is depressed in the state that the original is set on the tray 1001 of the original feeding unit 100. If the original is set on the tray 1001 of the original feeding unit 100, it is judged that the ADF mode (i.e., the original feeding mode) is set.

Next, the reading mode is discriminated (step S3002). If the high seep mode is discriminated, then the original image is read in the original running reading mode (step S3003), and the above mirror image processing (i.e., the processing to change the data of the main scan direction in the read image data) is performed (step S3004).

It should be noted that, in the step S3002, the reading mode is discriminated according as the "high speed mode" key or the "high quality mode" key is selected by the user on the panel of the operation unit 1 (FIG. 7C).

If the high quality mode is discriminated in the step S3002, then the original is read in the original standing reading mode (step S3005). After the processing in the step S3005 ends, it is judged whether or not the cover mode which uses the inserter is selected (step S3006). If judged in the step S3006 that the cover mode using the inserter is selected, the above mirror image correction processing is not performed (i.e., the mirror image correction processing is inhibited). Instead, the 180° conversion processing of the read image explained in FIG. 2C is performed (step S3007).

In the step S3006, it is actually judged whether or not the "inserter" key is selected by the user on the panel of the operation unit 1 (FIG. 7B).

If the mirror image correction processing is performed in the step S3004 and the image subjected to the mirror image correction is formed on the sheet, of if the 180° conversion processing of the read image is performed in the step S3007 and the image subjected to such the rotation processing is formed on the sheet, such the reverse sheet discharge processing described as above is performed to turn the image-formed face facedown (step S3008).

If judged in the step S3001 that the ADF mode is not set or selected, and if judged in the step S3006 that the mode using no inserter is selected, the flow advances to a step S3009. In the step S3009, the number of originals corresponding to one job is counted. If the number of originals is larger than one (i.e., two or more originals), or if judged in the step S3006 that the mode using the inserter is selected, the flow advances to the step S3007 to perform the 180° conversion processing. Conversely, in the step S3009, if the number of originals is equal to one, then the ordinary processing shown in FIG. 2A is performed (step S3010).

Like the above, it should be noted that the original reading is performed from the head page in due order irrespective of the selected reading mode. Further, in the case where the mode using the inserter is selected, the operation to feed the sheet from the inserter 900, the operation to carry the sheet from the body of the image formation apparatus, the operation to mixedly stack the sheet from the inserter 900 and the sheet from the body of the image formation apparatus, and the postprocessing such as the stapling processing or the like are the same as those in the original running reading mode (FIGS. 23 to 29). Therefore, the explanation of these operations and processing will be omitted.

Thus, it is judged whether the original reading mode is the original running reading mode or the original standing reading mode, it is judged whether or not the job to be processed is the job in the mode using the inserter 900, the mirror image correction processing or the rotation processing is performed to the image data according to the results of the above judgments, the image data representing the image identical with the original image is formed on the sheet, the front and rear faces of the obtained sheet are reversed to turn the image-formed face facedown, the reversed sheet is discharged from the body of the image formation apparatus, and the discharged sheet is carried into the finisher 500. Therefore, in the case where the original reading mode is either the original running reading mode or the original standing reading mode, it is possible to bind the sheet from the inserter and the sheet from the image formation apparatus as one sheaf, and also it is possible for the user to obtain the output result in which the page order and the image directions of the respective sheets are conformed to others and the binding position is located at the left of the sheet from the viewpoint of the image-formed face. Besides, even if the inserter 900 is used, the user can select either the output result counting on productivity or the output result counting on high image quality, on the basis of the notion of himself.

It is needless to say that the object of the present invention can be achieved in a case where a storage medium storing the program codes of a software for realizing the function of the above-described embodiment is supplied to a system or an apparatus and then a computer (or CPU or MPU) in the system or the apparatus reads and executes the program codes stored in the memory medium.

In this case, the program codes themselves read from the storage medium realize the function of the embodiment, and the storage medium storing such the program codes constitute the present invention.

As the storage medium storing the program codes, for example, a floppy disk, a hard disk, an optical disk, a magnetooptical disk, a CD-ROM, a CD-R, a magnetic tape, a non-volatile memory card, a ROM, or the like can be used.

It is needless to say that the present invention also includes not only the case where the function of the embodiment is realized by executing the program codes read by the computer, but also a case where an OS (operating system) or the like functioning on the computer executes all or part of the processing according to instructions of the program codes, thereby realizing the function of the embodiment.

Further, it is needless to say that the present invention further includes a case where the program codes read from the storage medium are once stored in a memory provided in a function expansion board inserted in the computer or a function expansion unit connected to the computer, and then a CPU or the like provided in the function expansion board or the function expansion unit executes all or part of the processing according to instructions of such program codes, thereby realizing the functions of the embodiments.

Although in the present embodiment the example in which an electrophotographic system using a laser beam is applied to the part of the printing mechanism was explained, it is needless to say that the present invention is not limited to this. Namely, any printing system (e.g., an LED printer, a thermal transfer printer, or an ink jet printer) is of course applicable.

What is claimed is:

1. An image forming apparatus, comprising:

an original feeder for feeding an original set on an original tray from a first page in a state where an image containing surface on the original faces upward and for reversing the original so that the image containing surface of the original faces downward and for transporting the original to a reading position;

a scanner for scanning the image on the original fed to the reading position by said original feeder;

an image forming unit for forming the image scanned by said scanner on an image containing surface of a sheet and for discharging the sheet in a state where the image on the sheet faces downward;

a sheet feeder, which is provided downstream of said image forming unit, for feeding a cover sheet or an insert sheet set on a sheet tray from an uppermost sheet in a state where the image containing surface of the cover sheet or the insert sheet faces upward and for reversing the cover sheet or the insert sheet so that the image containing surface of the cover sheet or the insert sheet faces downward; and a discharger for discharging the cover sheet or the insert sheet fed by said sheet feeder and the sheet formed by said image forming unit to a discharge tray in a state where the image containing surfaces of the cover sheet or the insert sheet and the sheet face downward, wherein said image forming unit orients a top of the image toward a rear side of said image forming apparatus and orients a bottom of the image toward a front side of said image forming apparatus so that the image formed by said image forming unit corresponds to the image on the cover sheet or the insert sheet which is set on said sheet feeder in a state where a top of the image on the cover sheet or the insert sheet orients toward the rear side of said image forming apparatus and a bottom of the image on the cover sheet or the insert sheet orients toward the front side of said image forming apparatus.

2. An image forming apparatus according to claim 1, wherein said original feeder feeds the original on said original tray in a first direction and transports the sheet in a first direction opposite to the second direction after reversing the original.

3. An image forming apparatus according to claim 1, wherein said sheet feeder feeds the cover sheet or the insert sheet on said sheet tray in a second direction and transports the cover sheet or the insert sheet in a first direction opposite to the second direction after reversing the sheet.

4. An image forming apparatus according to claim 3, wherein said original feeder feeds the original on said original tray in the first direction and transports the original in the second direction after reversing the original.

5. An image forming apparatus according to claim 4, wherein said original tray is slanted with a lower end in the first direction and said sheet tray is slanted with a lower end in the second direction.

6. An image forming apparatus according to claim 1, wherein said sheet feeder feeds the cover sheet or the insert sheet on said sheet tray in a direction opposite to a direction in which said original feeder feeds the original on said original tray.

7. An image forming apparatus, comprising:

an original feeder for feeding an original set on an original tray from a first page in a state where an image containing surface of the original faces upward and for reversing the original so that the image containing surface of the original faces downward and for transporting the original to a reading position;

a scanner for scanning the image on the original fed to the reading position by said original feeder;

an image forming unit for forming the image scanned by said scanner on a sheet;

a reversing unit for reversing the sheet formed by said image forming unit so that the image containing surface of the sheet faces downward;

a sheet feeder, which is provided downstream of said image forming unit, for feeding a cover sheet or an insert sheet set on a sheet tray from an uppermost sheet in a state where the image containing surface of the cover sheet or the insert sheet faces upward and for reversing the cover sheet or the insert sheet so that the image containing surface of the cover sheet or the insert sheet faces downward; and a discharger for discharging the cover sheet or the insert sheet fed by said sheet feeder and the sheet reversed by said reversing unit to a discharge tray in a state where the image containing surfaces of the cover sheet or the insert sheet and the sheet face downward, wherein said image forming unit orients a top of the image toward a rear side of said image forming apparatus and orients a bottom of the image toward a front side of said image forming apparatus so that the image formed by said image forming unit corresponds to the image on the cover sheet or the insert sheet which is set on said sheet feeder in a state where a top of the image on the cover sheet or the insert sheet orients toward the rear side of said image forming apparatus and a bottom of the image on the cover sheet or the insert sheet orients toward the front side of said image forming apparatus.

8. An image forming apparatus according to claim 7, wherein said original feeder feeds the original on said original tray in a first direction and transports the original in a second direction opposite to the first direction after reversing the original.

9. An image forming apparatus according to claim 7, wherein said sheet feeder feeds the cover sheet or the insert sheet on said sheet tray in a second direction and transports the cover sheet or the insert sheet in a first direction opposite to the second direction after reversing the sheet.

10. An image forming apparatus according to claim 9, wherein said original feeder feeds the original on said original tray in the first direction and transports the original in the second direction after reversing the original.

11. An image forming apparatus according to claim 10, wherein said original tray is slanted with a lower end in the first direction and said sheet tray is slanted with a lower end in the second direction.

12. An image forming apparatus according to claim 7, wherein said sheet feeder feeds the cover sheet or the insert sheet on said sheet tray in a direction opposite to a direction in which said original feeder feeds the original on said original tray.

* * * * *

UNITED STATES PATENT AND TRADEMARK OFFICE
CERTIFICATE OF CORRECTION

PATENT NO.   : 6,603,951 B2
DATED        : August 5, 2003
INVENTOR(S)  : Chikara Sato et al.

It is certified that error appears in the above-identified patent and that said Letters Patent is hereby corrected as shown below:

Column 1,
Lines 23 and 60, "the" should read -- a --.
Line 34, "the" (1st occurrence) should read -- a --.
Line 55, "it" should read -- there --.

Column 2,
Line 3, "according" should read -- accordingly --.
Line 30, "generates" should read -- generate --.
Line 31, "the" (1st occurrence) should read -- an --.
Line 56, "the" should read -- a --.

Column 3,
Line 11, "an" should read -- a --.

Column 4,
Line 60, "the" should read -- an --.

Column 6,
Line 9, "ing" should read -- ingly --.

Column 7,
Lines 2 and 9, "the" (1st occurrence) should read -- a --.

Column 9,
Line 16, "the" (2nd occurrence) should read -- a --.
Line 42, "the" (1st occurrence) should read -- a --.

Column 12,
Line 20, "the" (1st occurrence) should read -- a --.

Column 13,
Line 19, "5101." should read -- 510'. --.

Column 14,
Line 24, "the" (2nd occurrence) should read -- a --.
Line 38, "the" (2nd occurrence) should read -- a --.
Line 53, "according" should read -- accordingly --.

UNITED STATES PATENT AND TRADEMARK OFFICE
CERTIFICATE OF CORRECTION

PATENT NO.    : 6,603,951 B2
DATED         : August 5, 2003
INVENTOR(S)   : Chikara Sato et al.

It is certified that error appears in the above-identified patent and that said Letters Patent is hereby corrected as shown below:

<u>Column 18,</u>
Lines 3 and 33, "the" (1$^{st}$ occurrence) should be deleted.
Line 63, "the" should read -- a --.

<u>Column 23,</u>
Line 64, "of" should read -- or --.

<u>Column 25,</u>
Line 43, "at the" (2$^{nd}$ occurrence) should be deleted.

<u>Column 28,</u>
Line 61, "the" (1$^{st}$ occurrence) should be deleted.

<u>Column 31,</u>
Line 46, "the" should read -- a --.

<u>Column 32,</u>
Line 51, "the" (1$^{st}$ occurrence) should read -- a --.
Line 55, "the" should read -- an --.

<u>Column 33,</u>
Line 51, "of" should read -- or --.
Lines 53 and 54, "the" (2$^{nd}$ occurrence) should read -- a --.

Signed and Sealed this

Thirtieth Day of December, 2003

JAMES E. ROGAN
*Director of the United States Patent and Trademark Office*